(12) United States Patent
Dirnfeld

(10) Patent No.: US 8,573,677 B2
(45) Date of Patent: Nov. 5, 2013

(54) FLOOR MAT AND METHOD FOR MANUFACTURING A FLOOR MAT

(76) Inventor: Josef Dirnfeld, Aventura, FL (US)

(*) Notice: Subject to any disclaimer, the term of this patent is extended or adjusted under 35 U.S.C. 154(b) by 279 days.

(21) Appl. No.: 12/880,897

(22) Filed: Sep. 13, 2010

(65) Prior Publication Data

US 2012/0061990 A1 Mar. 15, 2012

(51) Int. Cl.
*B60N 3/04* (2006.01)

(52) U.S. Cl.
USPC .................................................... 296/97.23

(58) Field of Classification Search
USPC .......... 296/97.23, 75, 39.1; 15/215, 216, 238; D12/203; 428/68, 88, 106, 138, 166, 428/167, 151, 82, 192
See application file for complete search history.

(56) References Cited

U.S. PATENT DOCUMENTS

| | | | |
|---|---|---|---|
| 3,856,610 A | 12/1974 | Bruneel | |
| 4,174,991 A * | 11/1979 | Reuben | 156/242 |
| 4,310,370 A | 1/1982 | Arai et al. | |
| 4,382,986 A * | 5/1983 | Reuben | 428/88 |
| 4,758,457 A * | 7/1988 | Altus | 428/82 |
| 5,362,544 A | 11/1994 | Reuben | |
| 5,876,825 A | 3/1999 | Daley | |
| D424,497 S * | 5/2000 | Barton | D12/203 |
| 6,103,333 A * | 8/2000 | Keith | 428/99 |
| 6,221,298 B1 * | 4/2001 | Ferreira et al. | 264/243 |
| 6,238,765 B1 * | 5/2001 | Bailey et al. | 428/95 |
| 6,261,667 B1 * | 7/2001 | Yang | 428/172 |
| 6,319,592 B1 * | 11/2001 | Ney et al. | 428/195.1 |
| 6,605,333 B2 * | 8/2003 | Ferreira et al. | 428/95 |
| 7,208,224 B2 | 4/2007 | Matsuura et al. | |
| D573,076 S * | 7/2008 | Muller | D12/203 |
| D610,958 S * | 3/2010 | Assil | D12/203 |
| 7,820,268 B2 * | 10/2010 | Luetgert et al. | 428/151 |
| 2002/0168503 A1 * | 11/2002 | Dong et al. | 428/195 |
| 2004/0067340 A1 | 4/2004 | Chiang | |
| 2008/0187710 A1 | 8/2008 | Stanchfield et al. | |
| 2010/0251883 A1 * | 10/2010 | Naroditsky | 89/36.02 |
| 2012/0061990 A1 * | 3/2012 | Dirnfeld | 296/97.23 |

FOREIGN PATENT DOCUMENTS

WO 2008/067350 6/2008

OTHER PUBLICATIONS

"Frontgate Woodgrain Anti-Fatigue Mat," http://www.frontgate.com/jump.jsp?ID=27719&itemType=PRODUCT&path=1,2,130,132,&iProductID=27719&k=XX23159.
"Ore Pet Green Wood Grain Pet Placemat," http://www.amazon.com/Pet-Green-Wood-Grain-Placemat/dp/B0032C1MQE/ref=sr_1_2?ie=UTF8&s=home-garden&qid=1280513494&sr=1-2.

* cited by examiner

*Primary Examiner* — Glenn Dayoan
*Assistant Examiner* — Gregory Blankenship
(74) *Attorney, Agent, or Firm* — The Concept Law Group, P.A.; Scott D. Smiley; Mark C. Johnson

(57) ABSTRACT

A vehicle floor mat that includes a flexible upper layer having a non-wood surface with a visible wood-grain pattern on substantially the entire non-wood surface, the non-wood surface being of a scratch-resistant and water-resistant material and able to repeatedly flex at least 70 degrees from planar at least 100 times without exhibiting a change in the visible wood-grain pattern. A flexible non-wood underlayer is coupled to an underside of the flexible upper layer and has a slip-resistant surface that is able to repeatedly flex at least 70 degrees from planar. The flexible upper layer and the flexible non-wood underlayer have a shared non-uniform outer-edge shape that corresponds to a non-planar foot area of a vehicle.

14 Claims, 56 Drawing Sheets

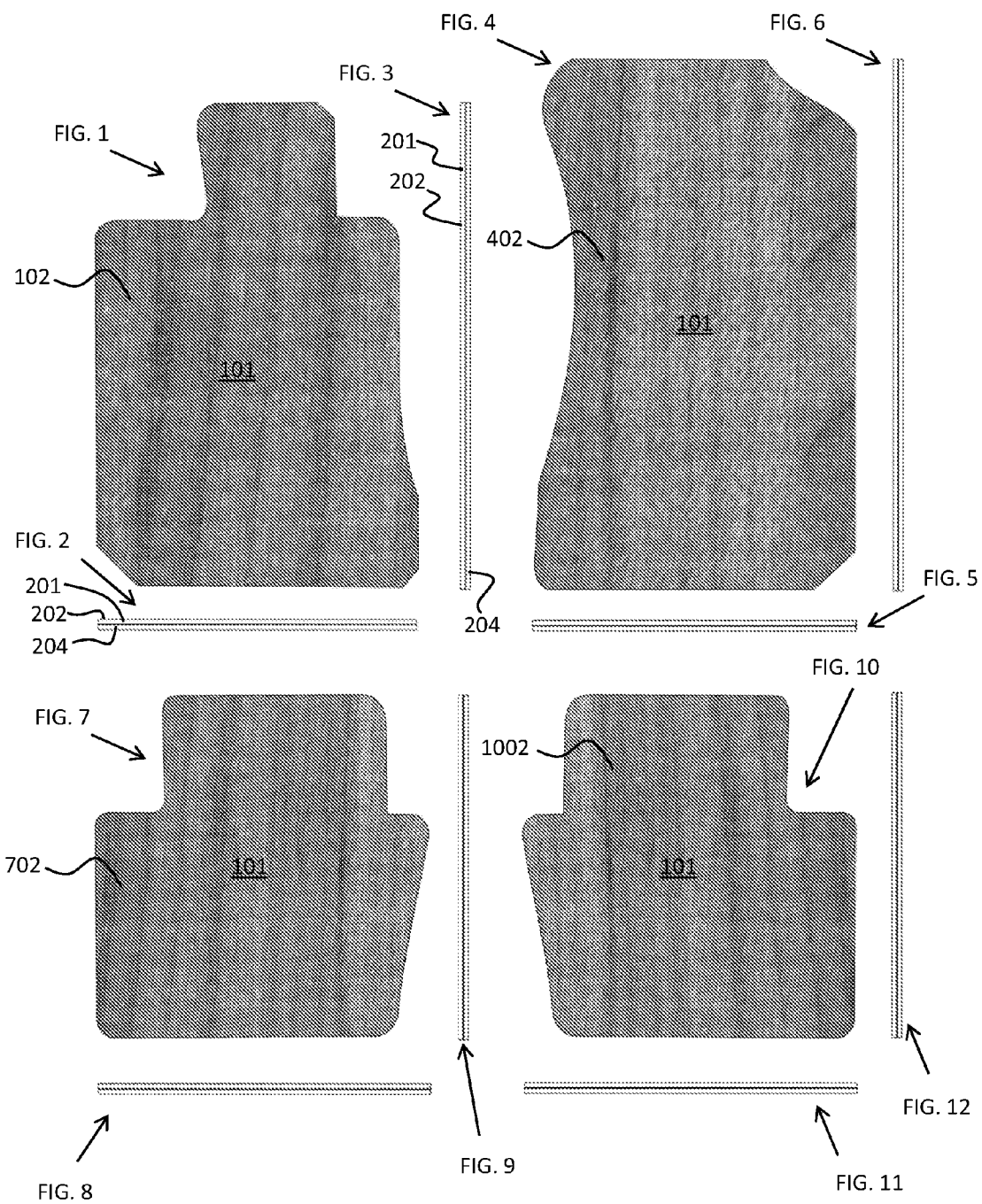

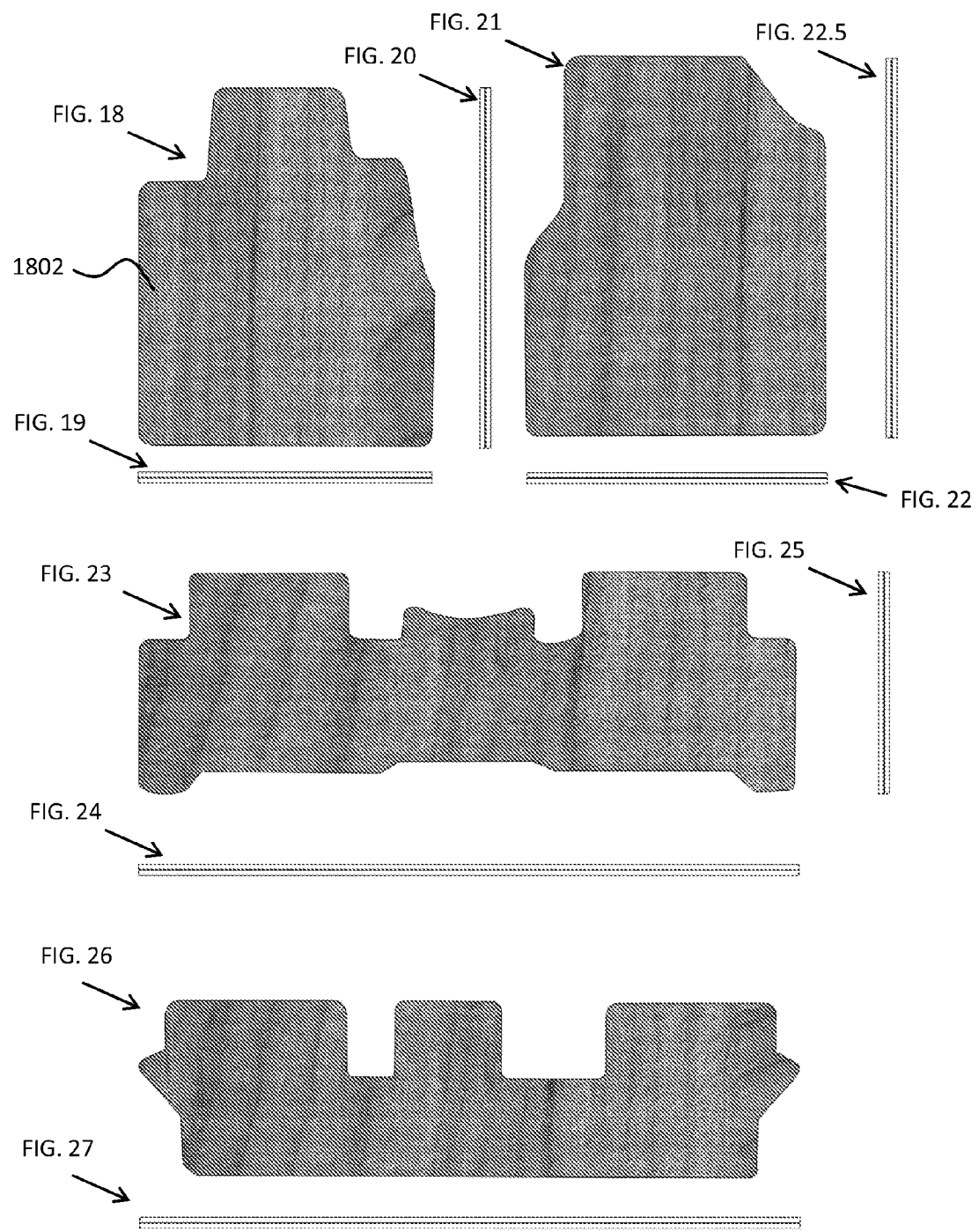

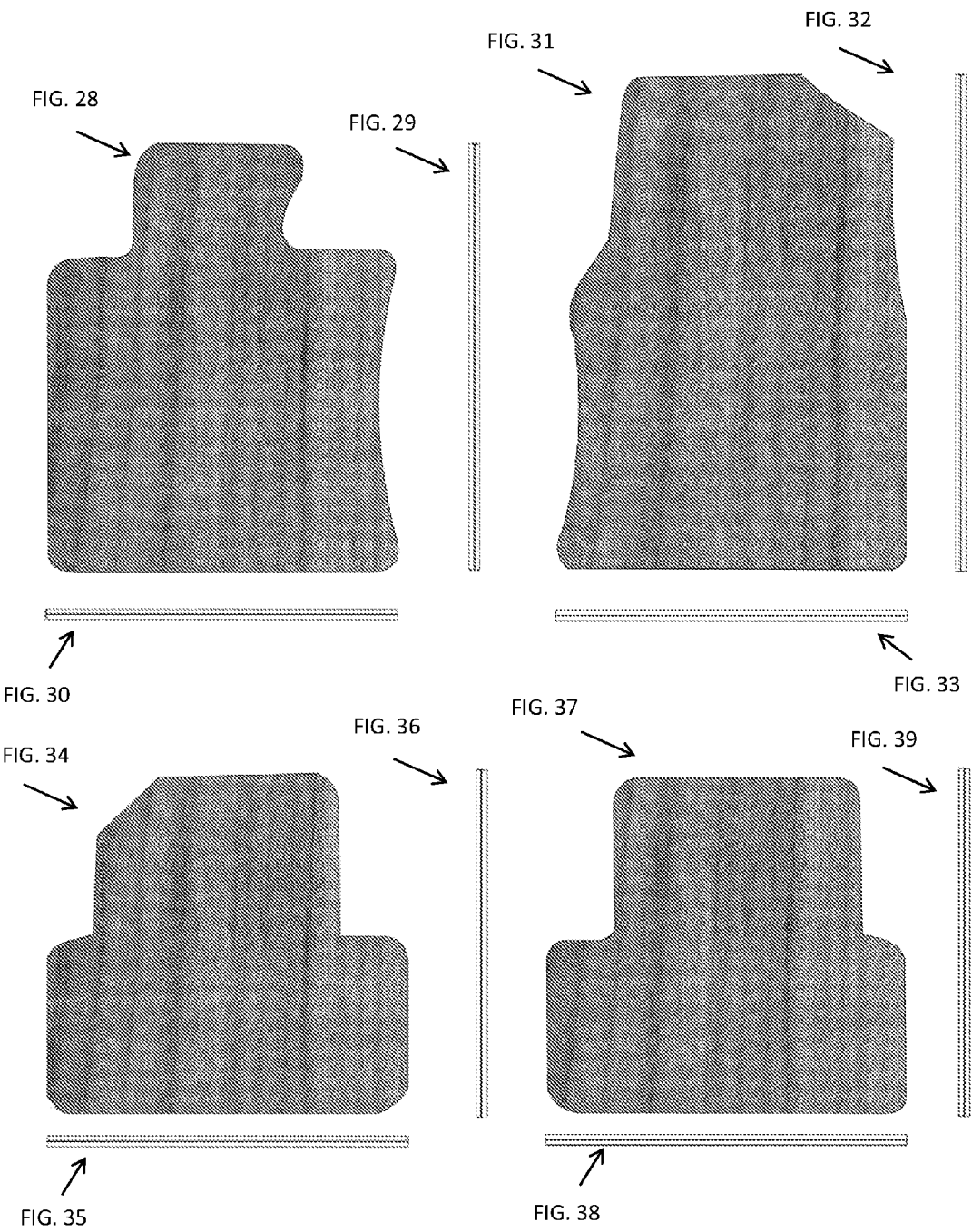

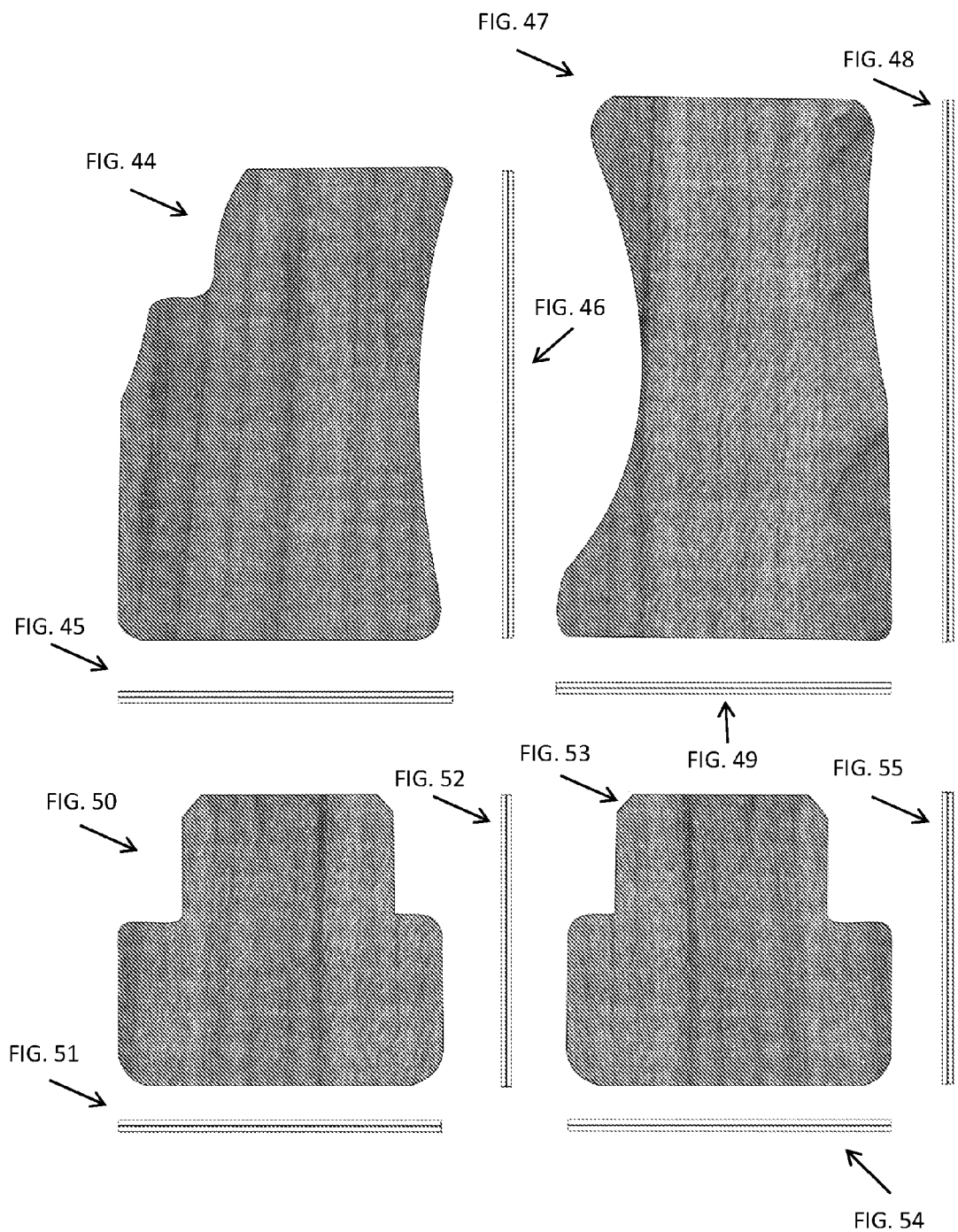

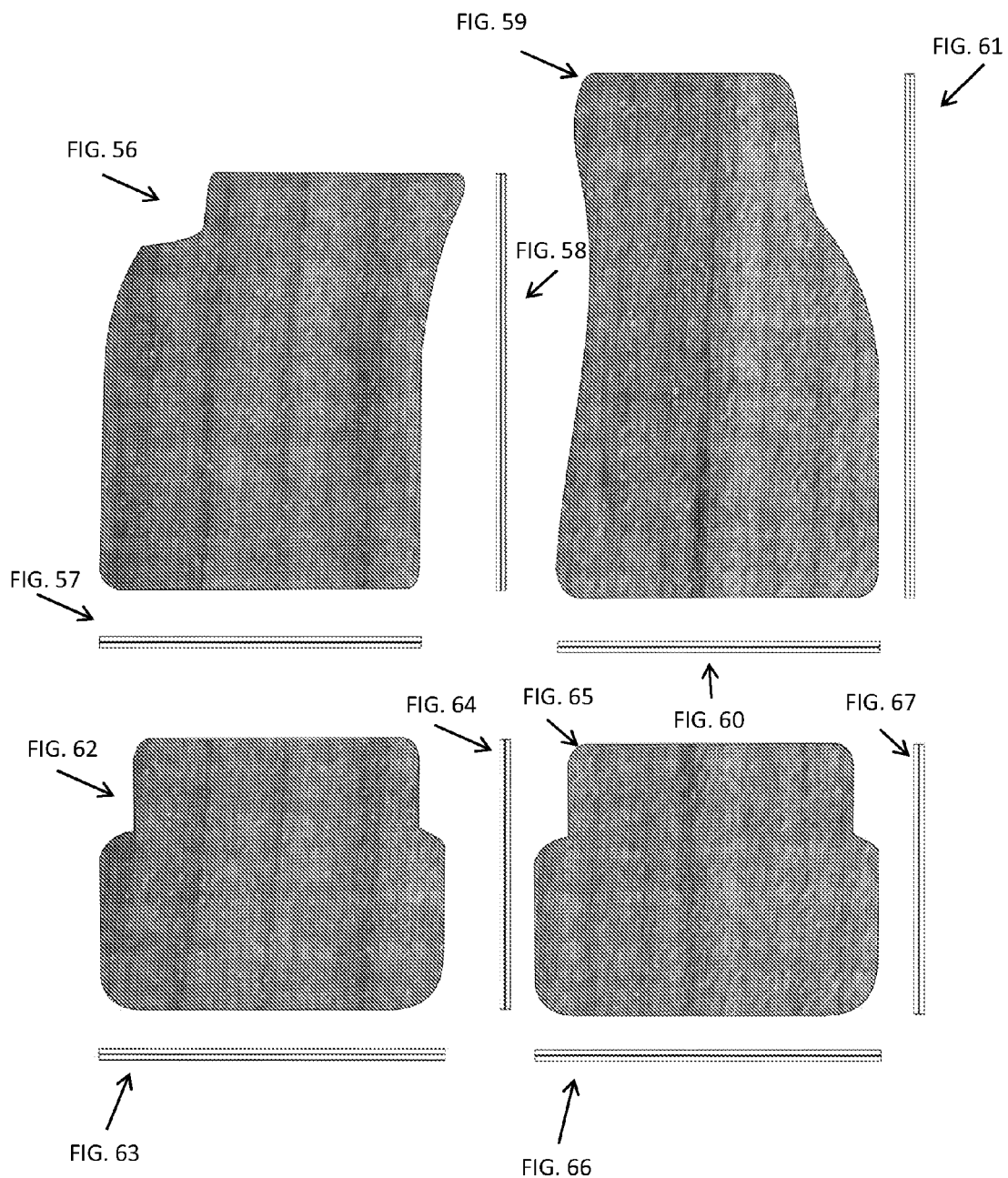

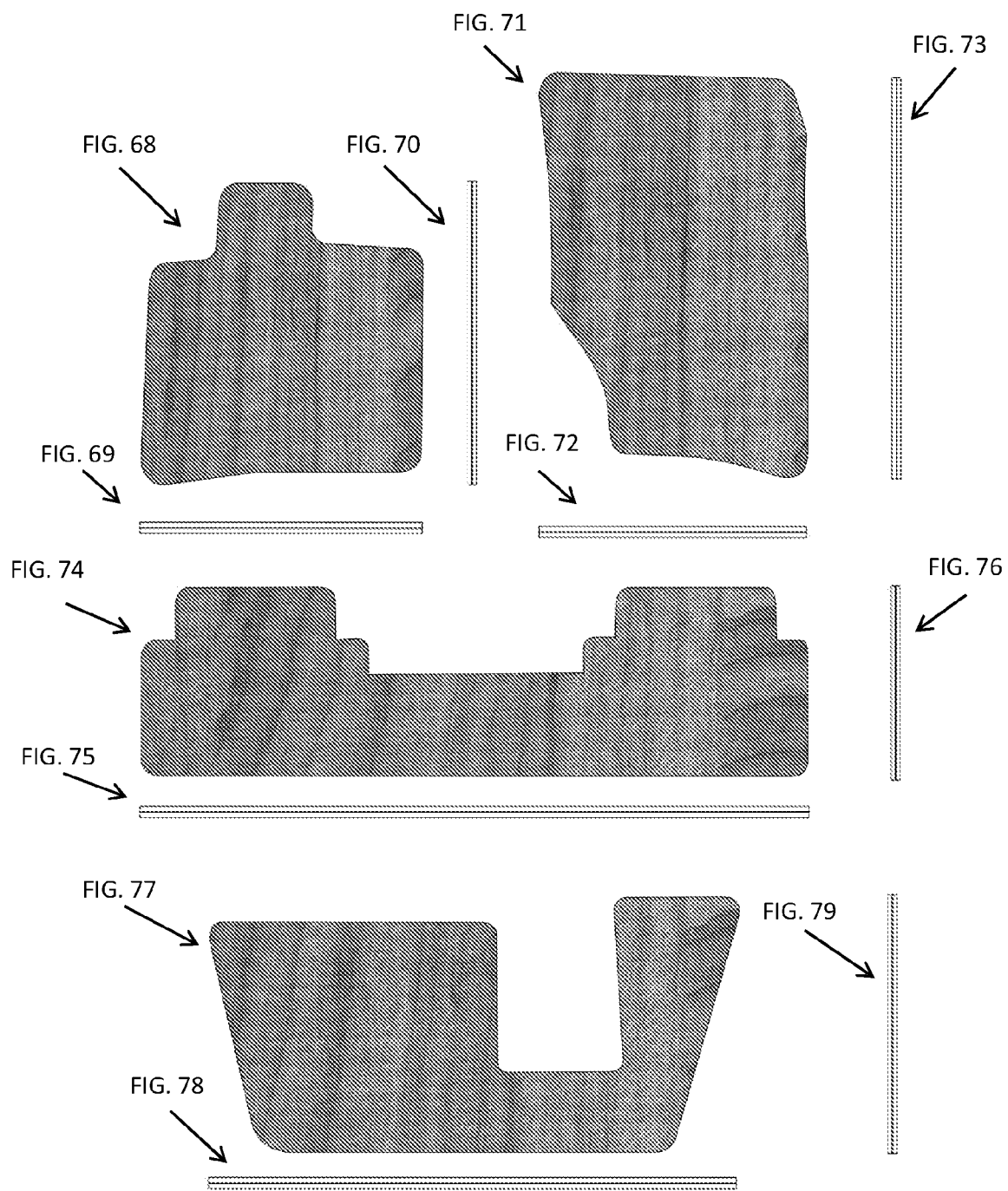

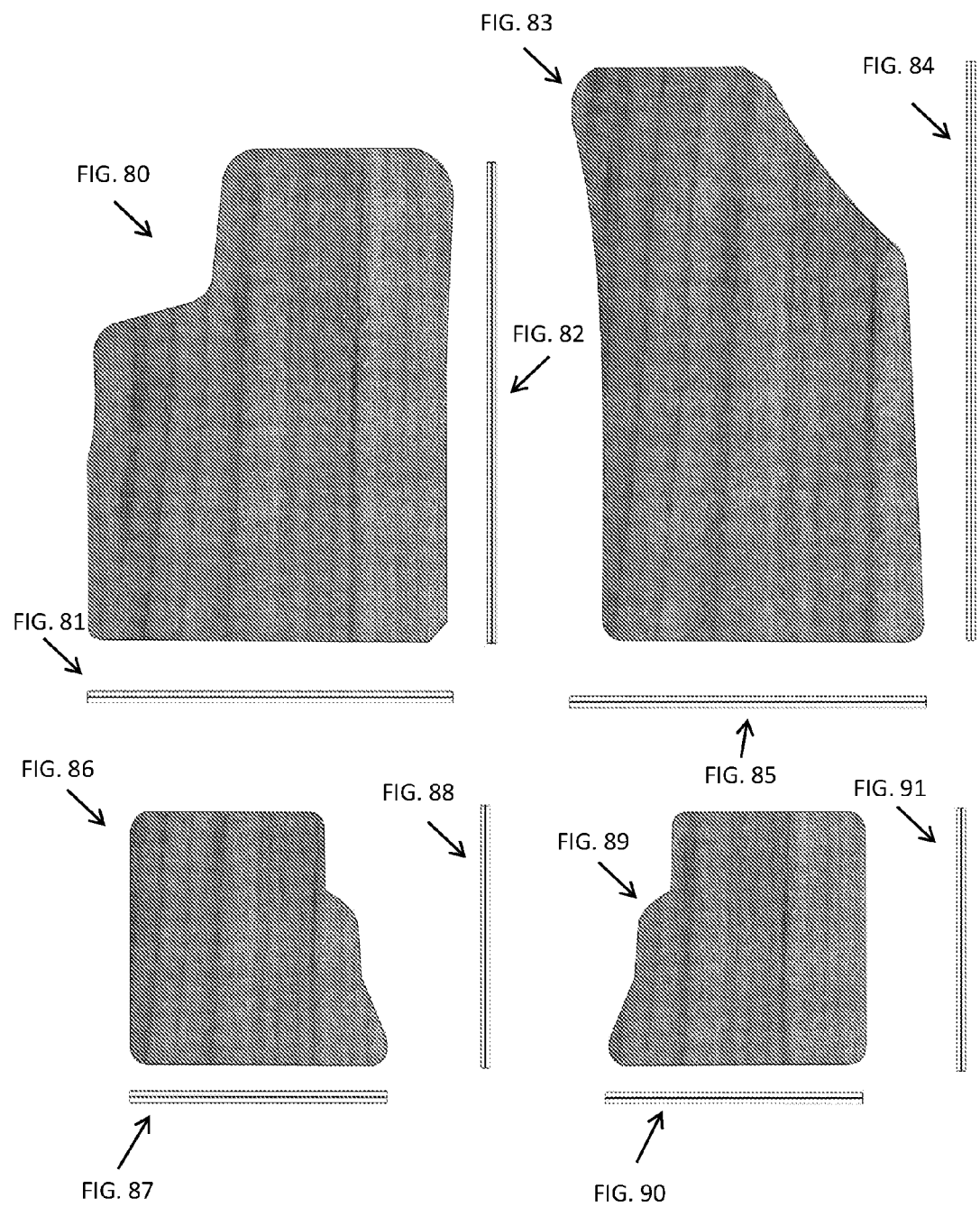

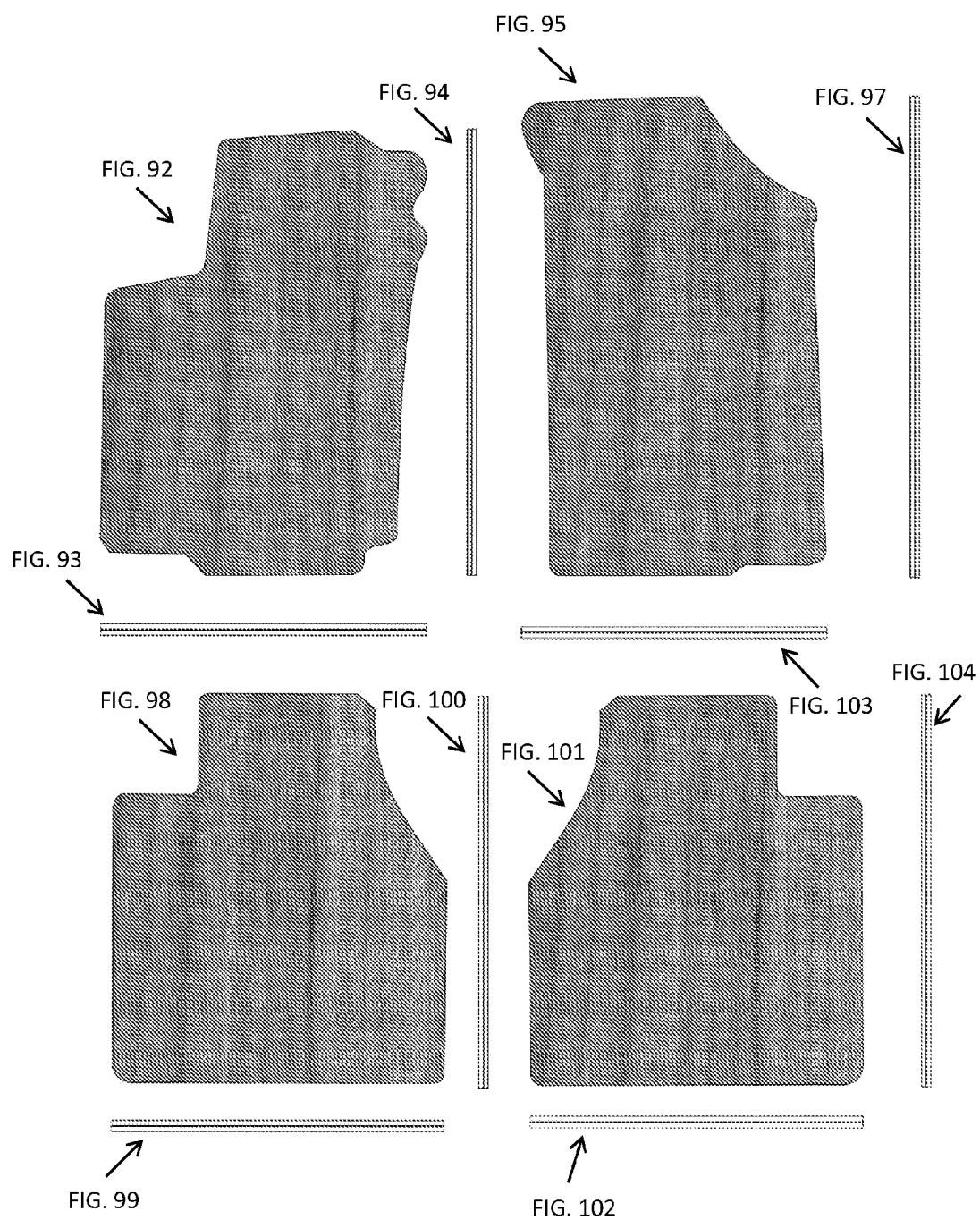

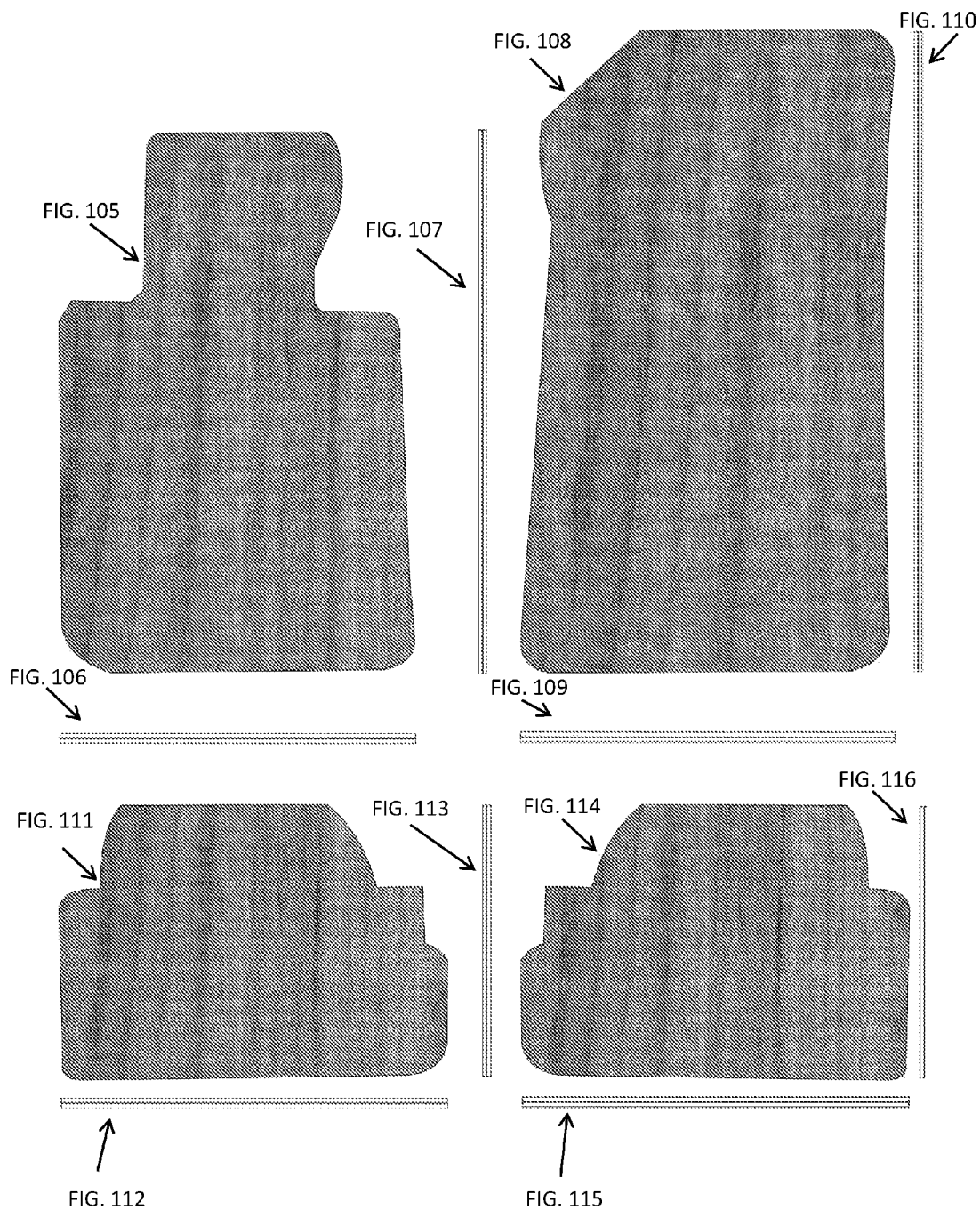

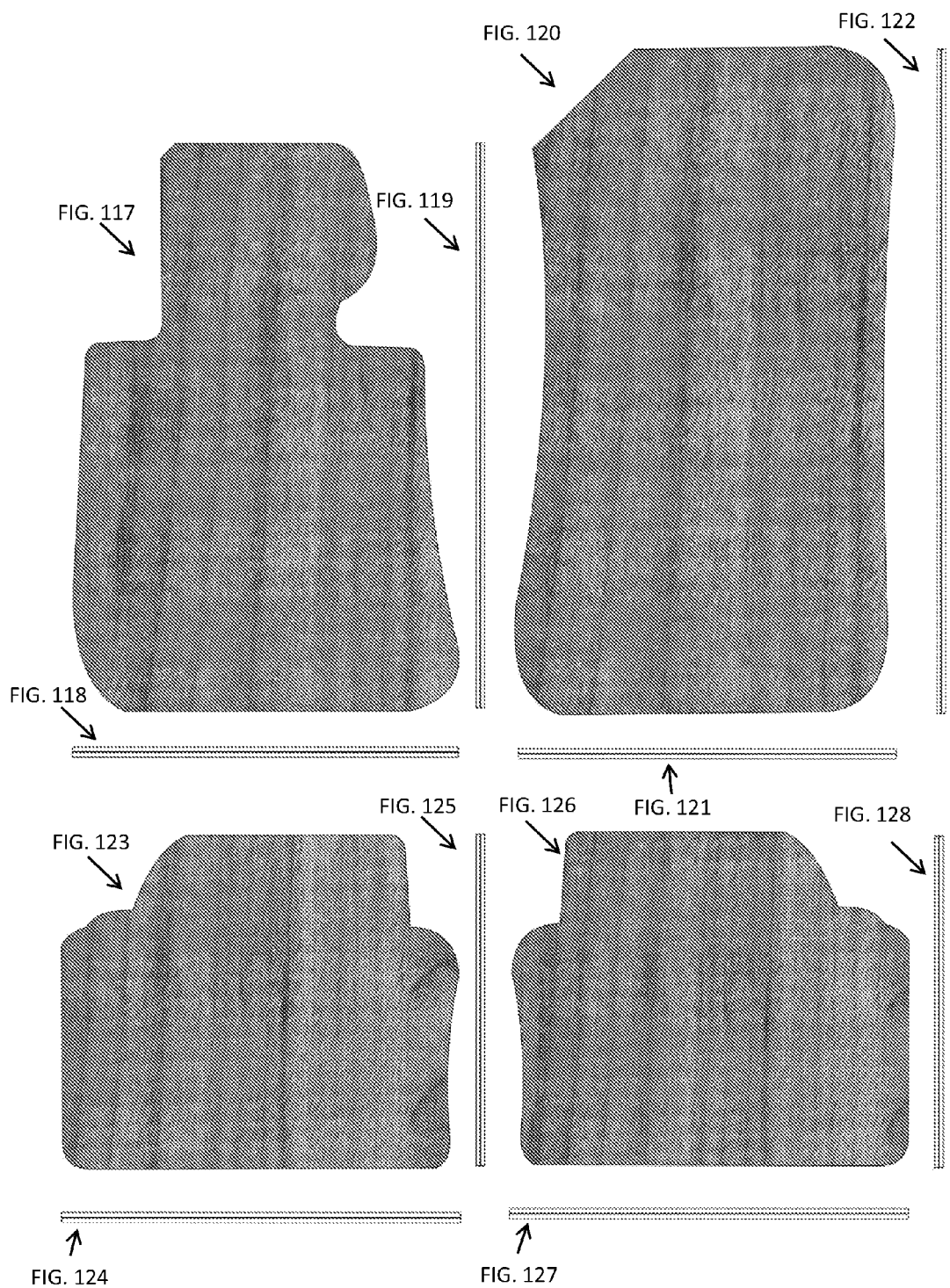

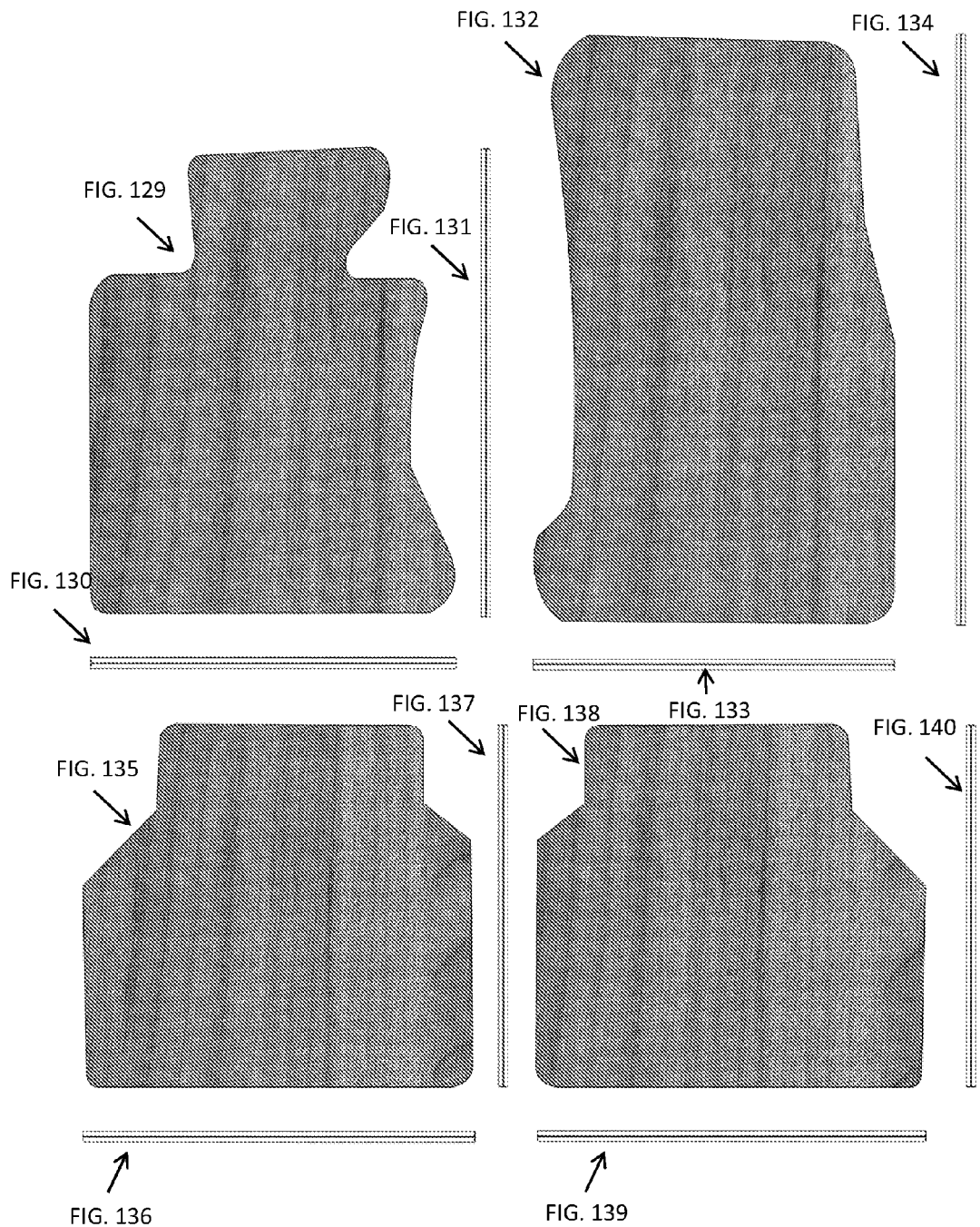

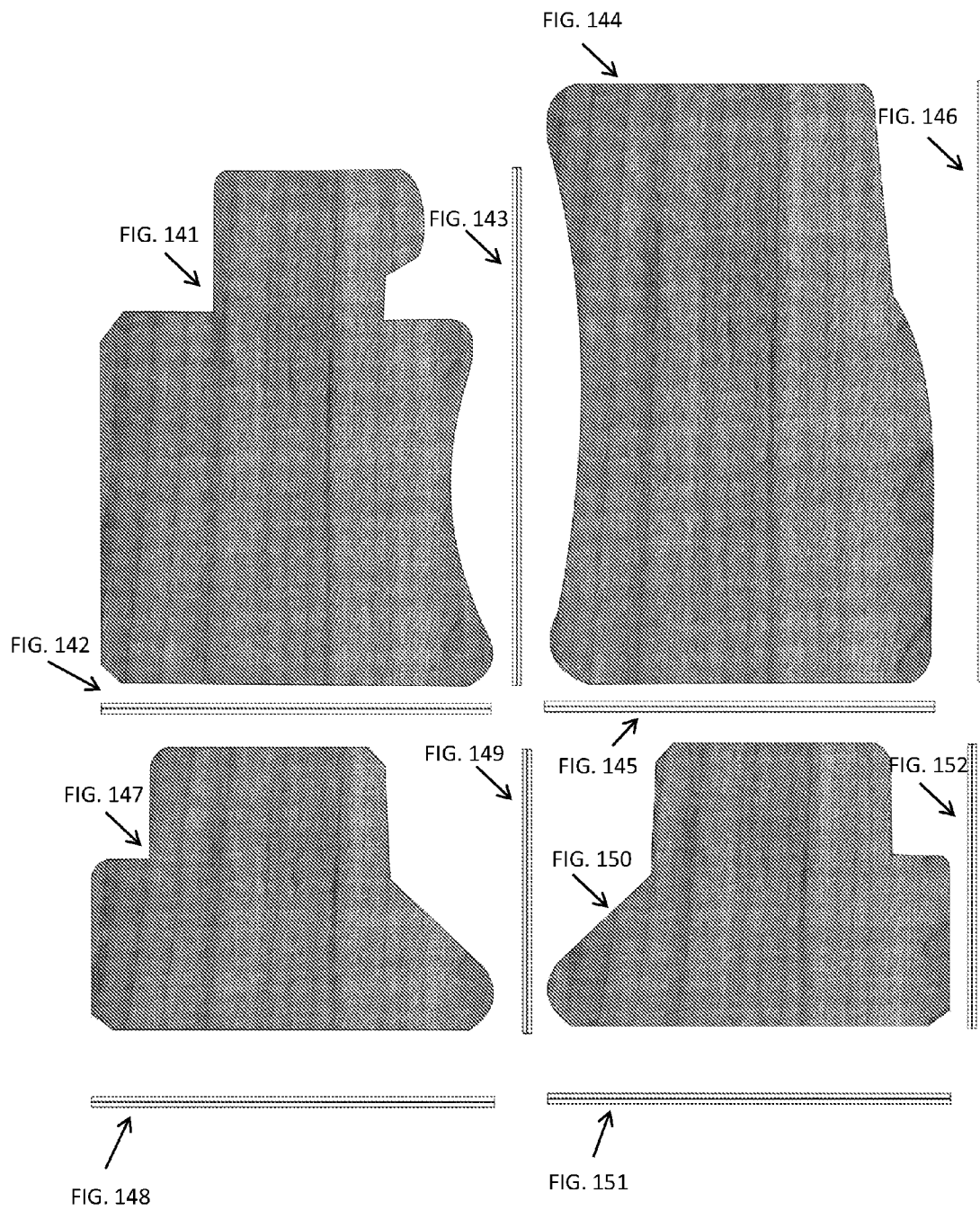

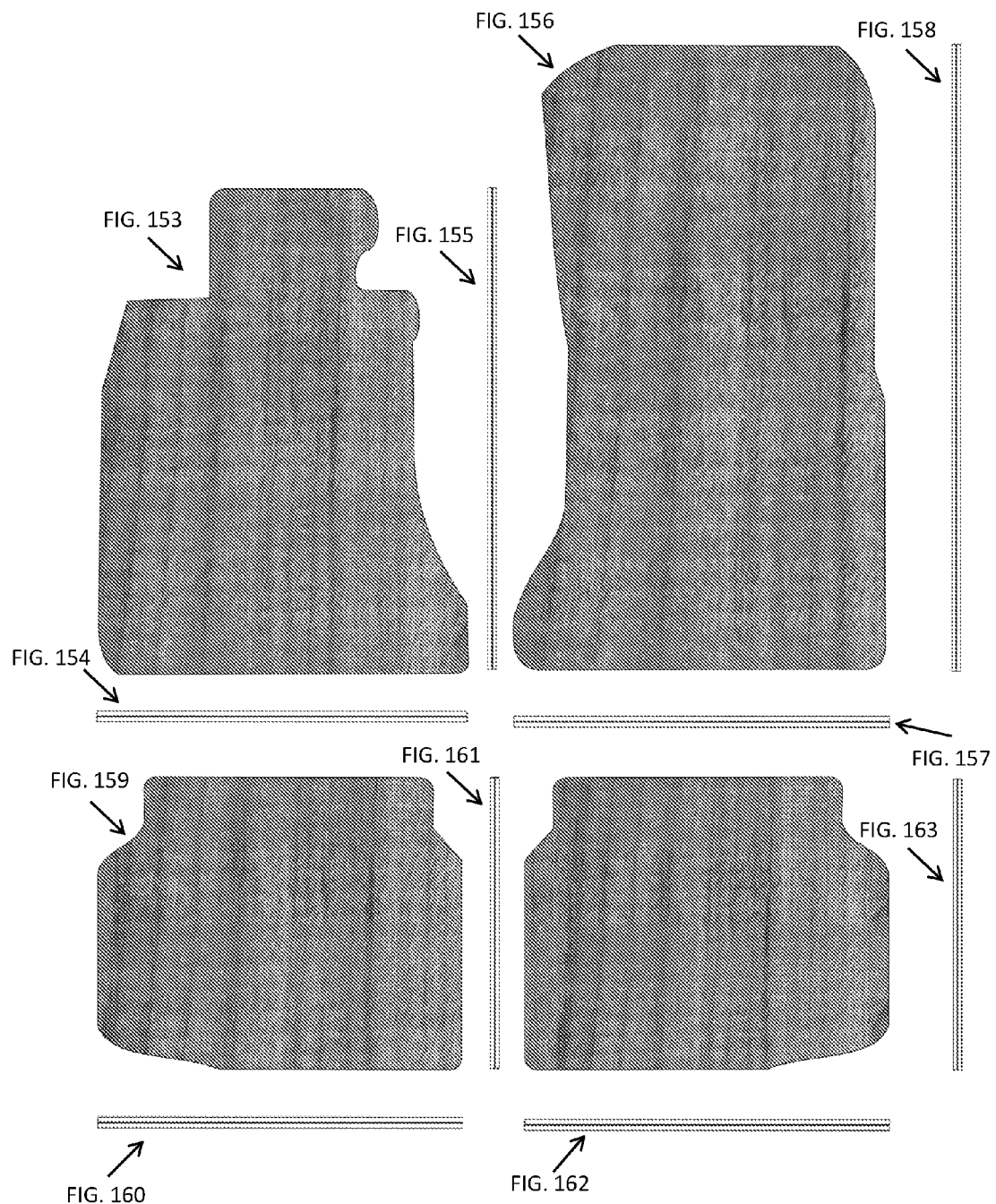

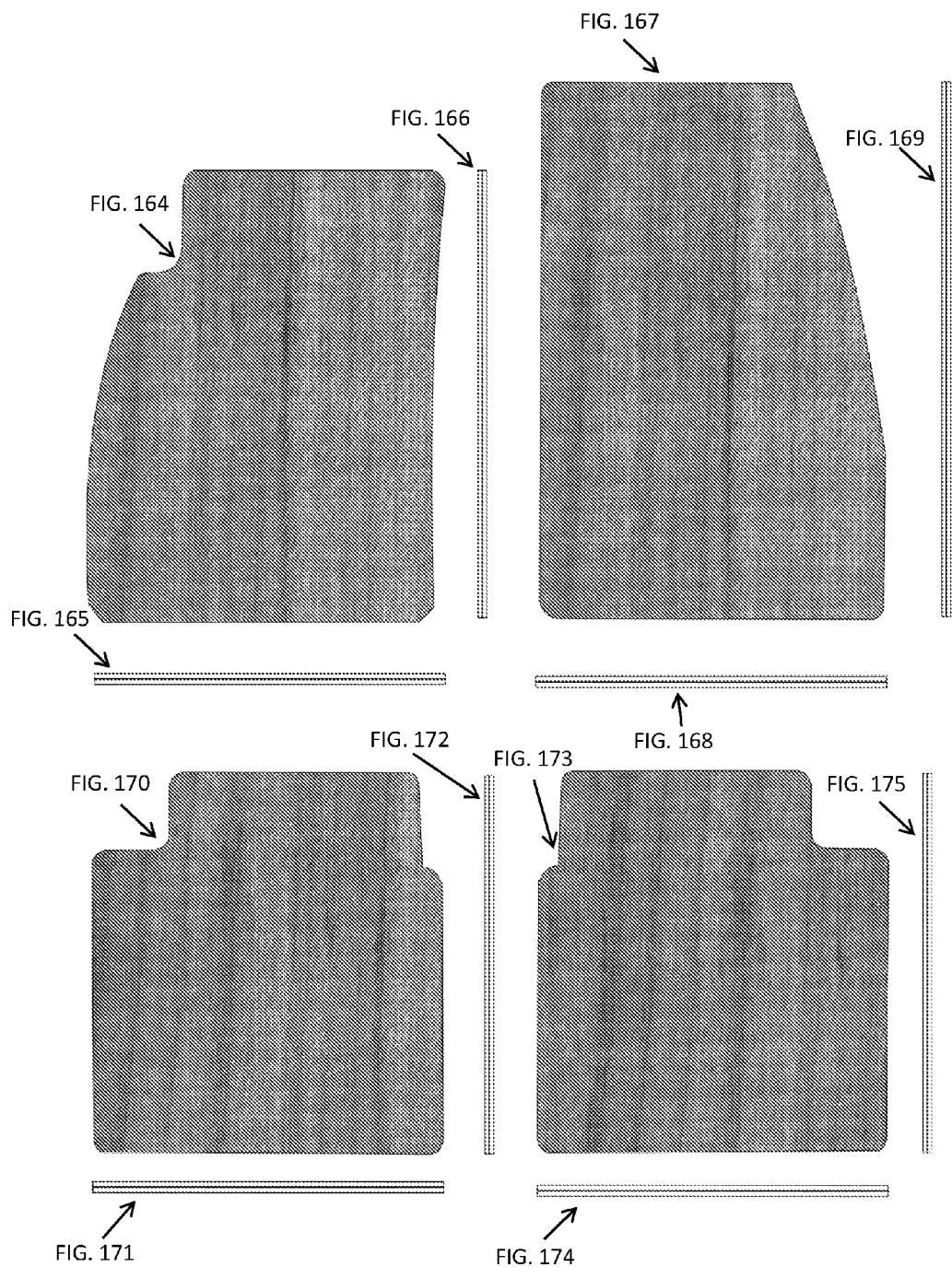

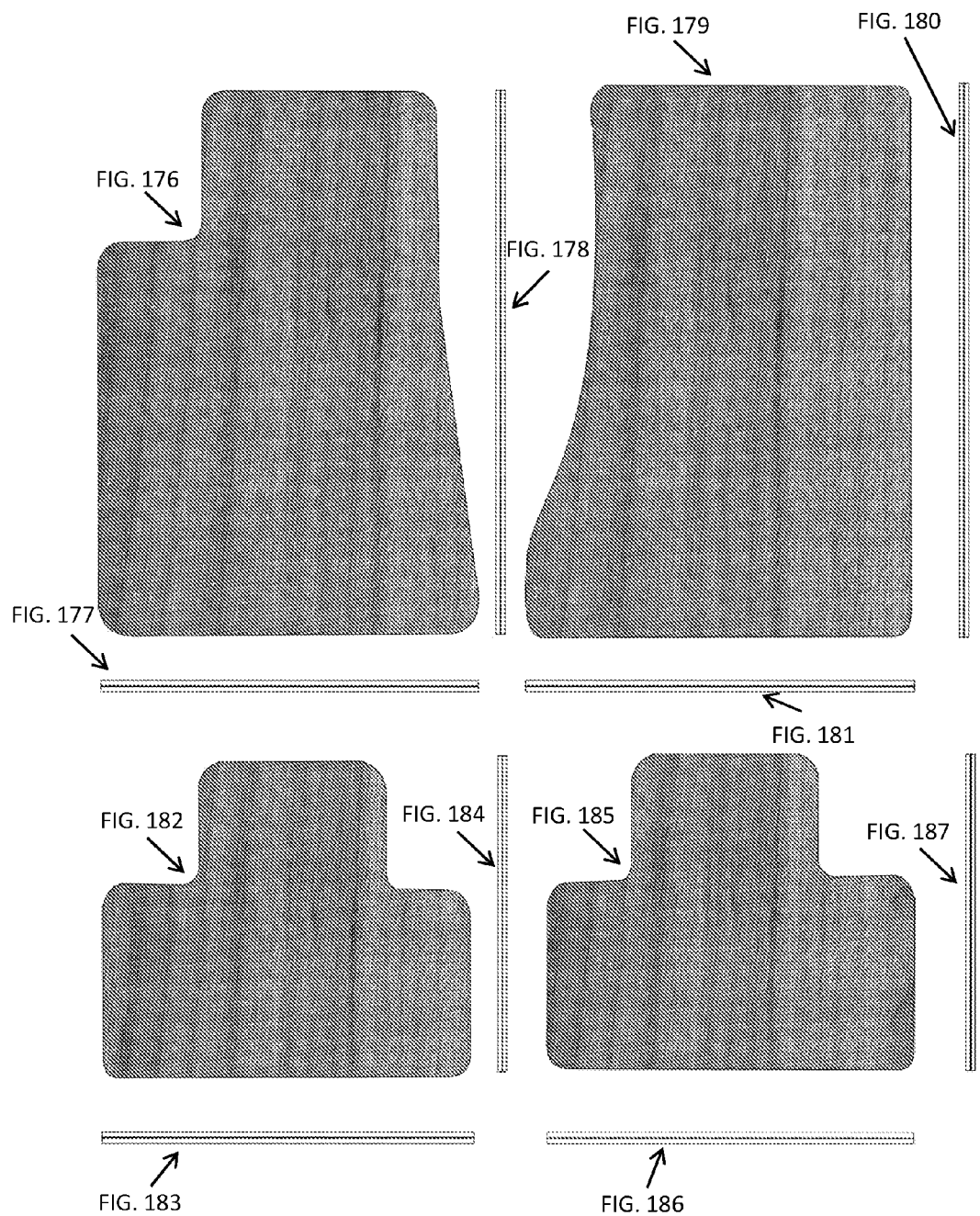

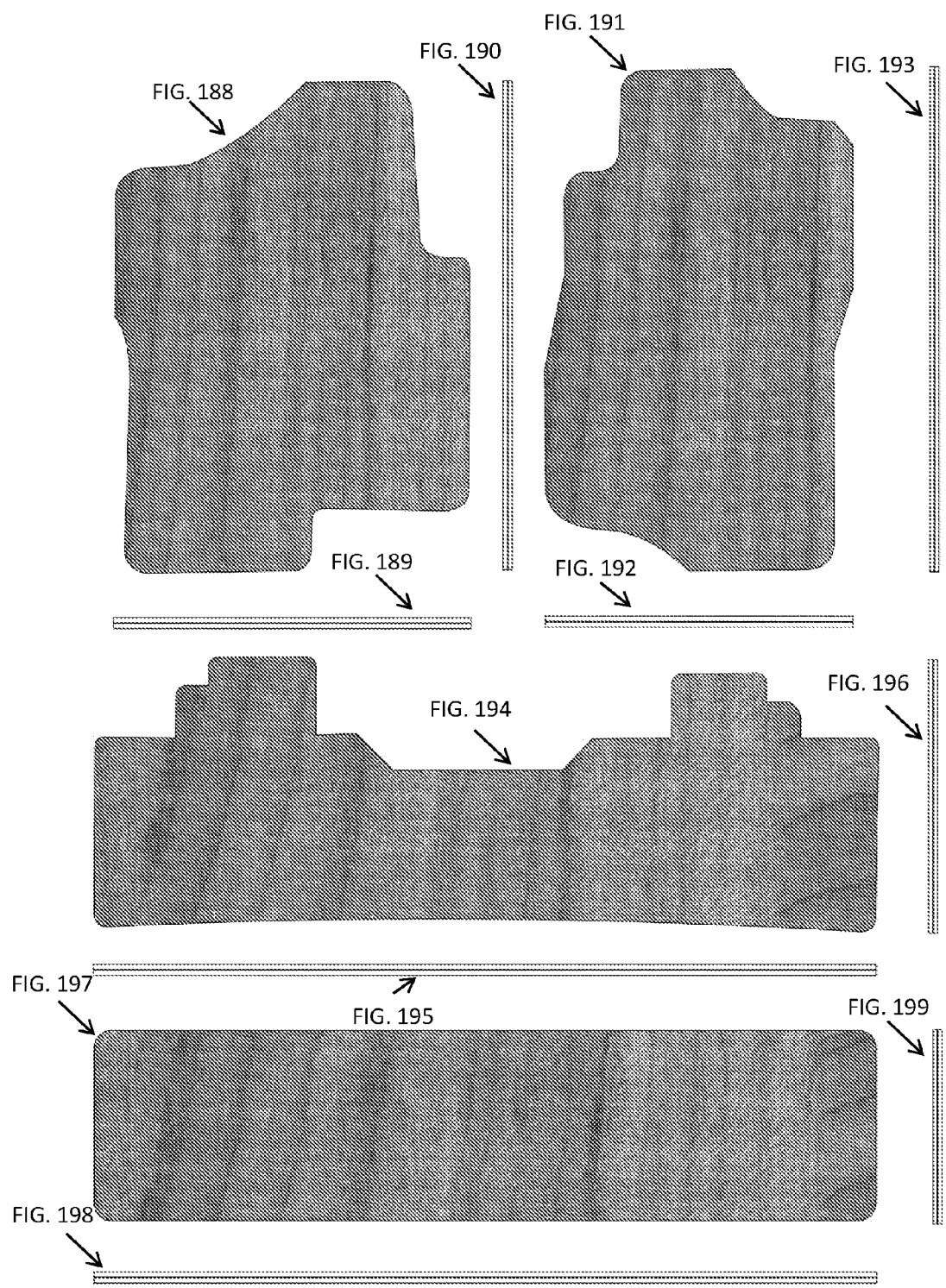

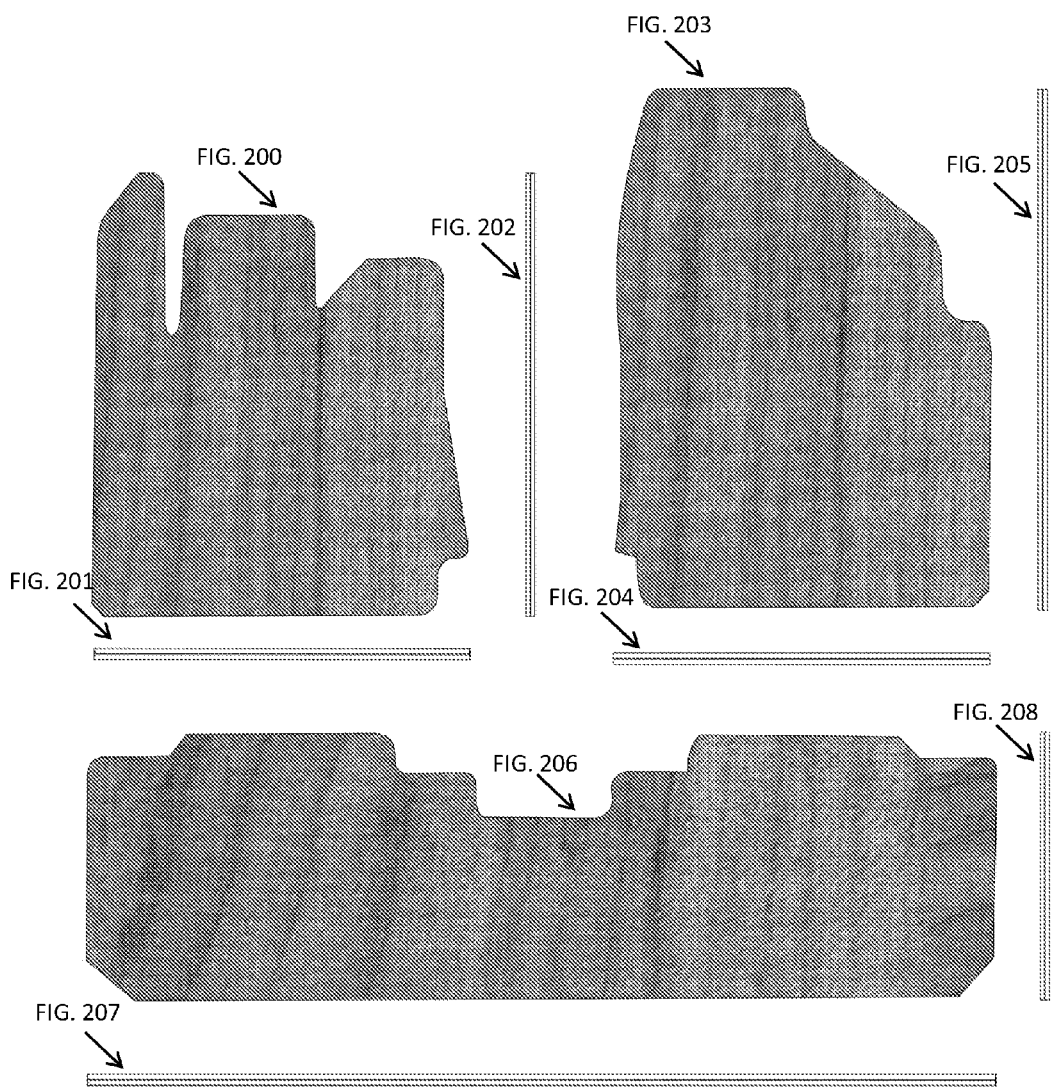

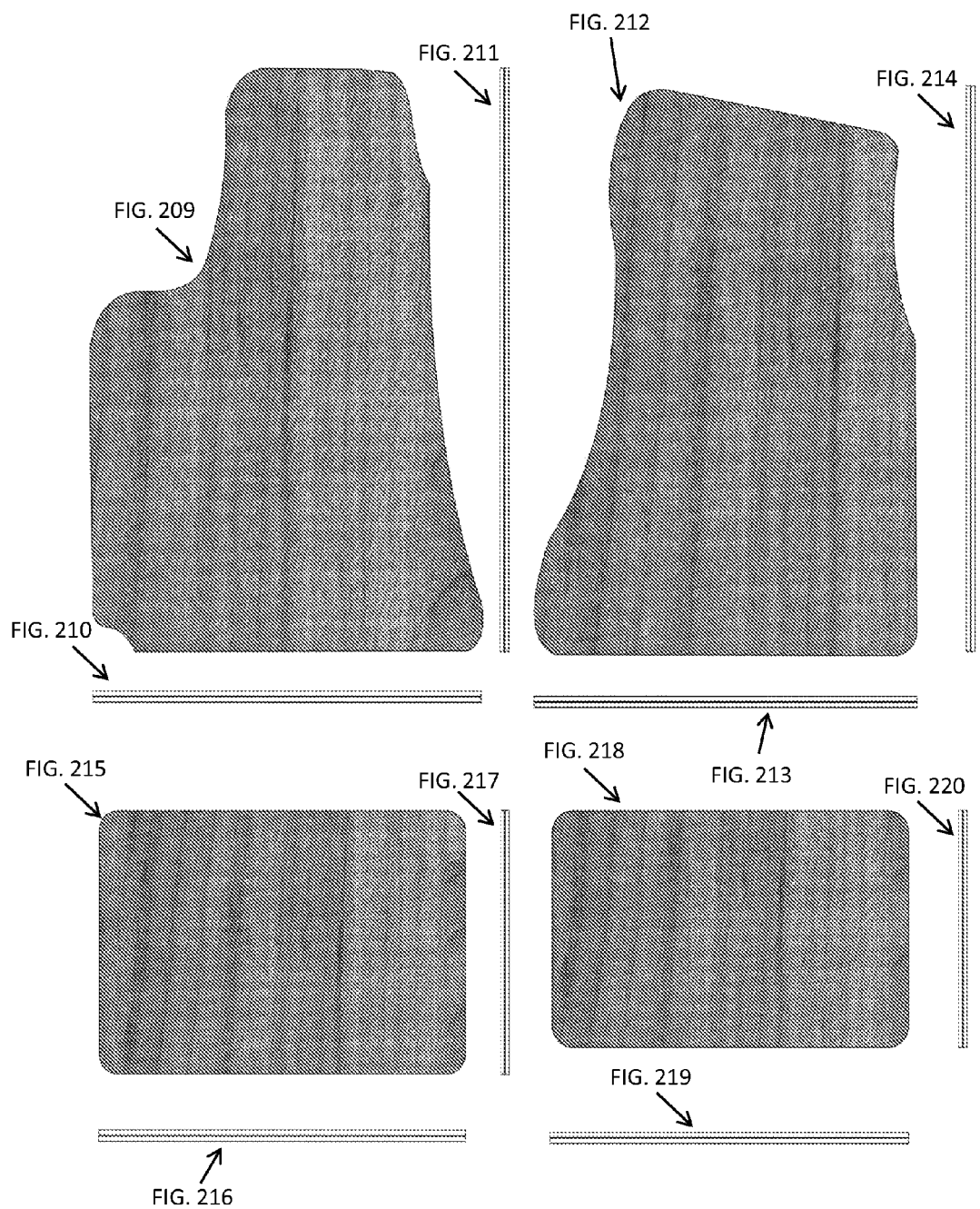

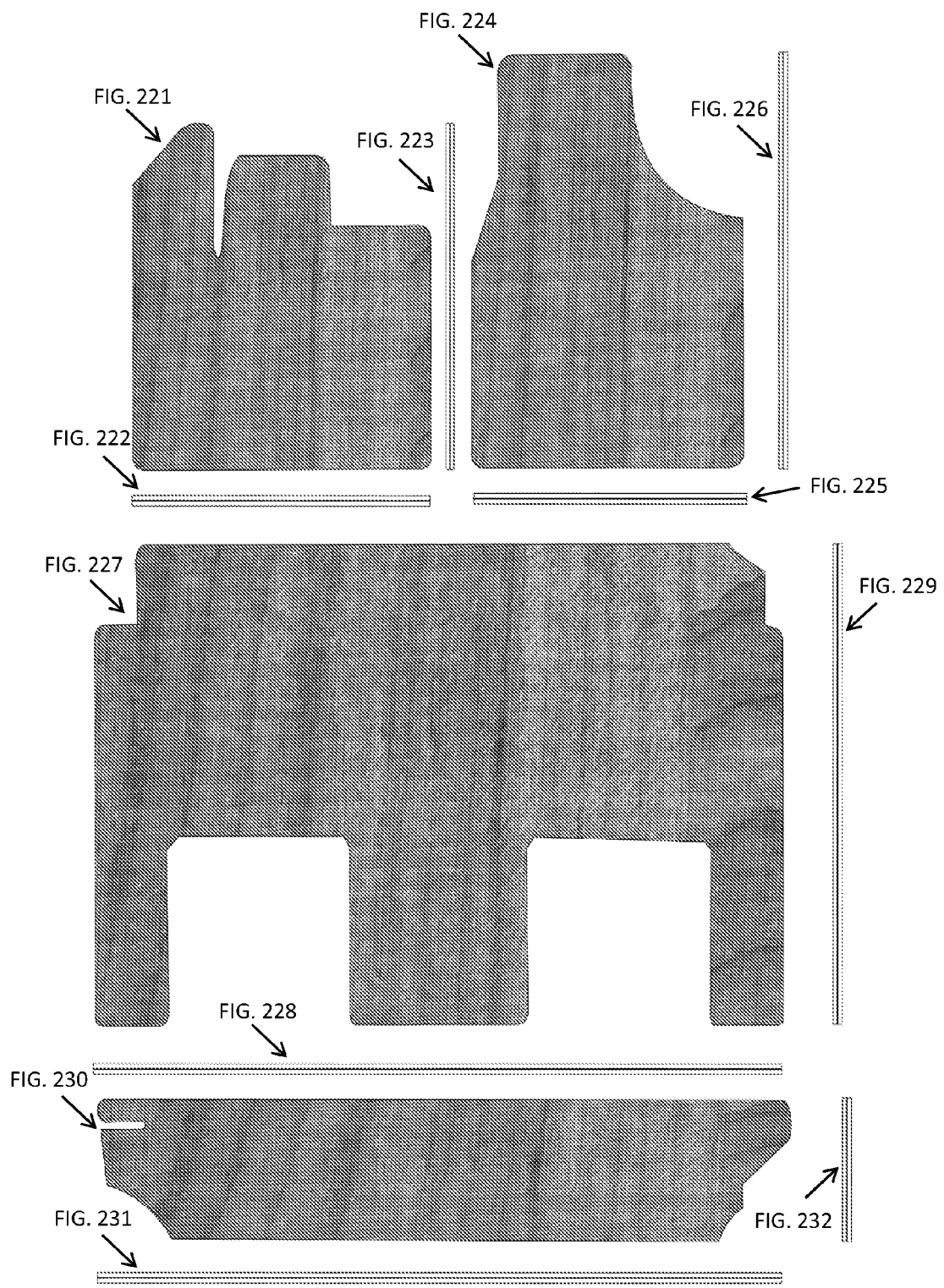

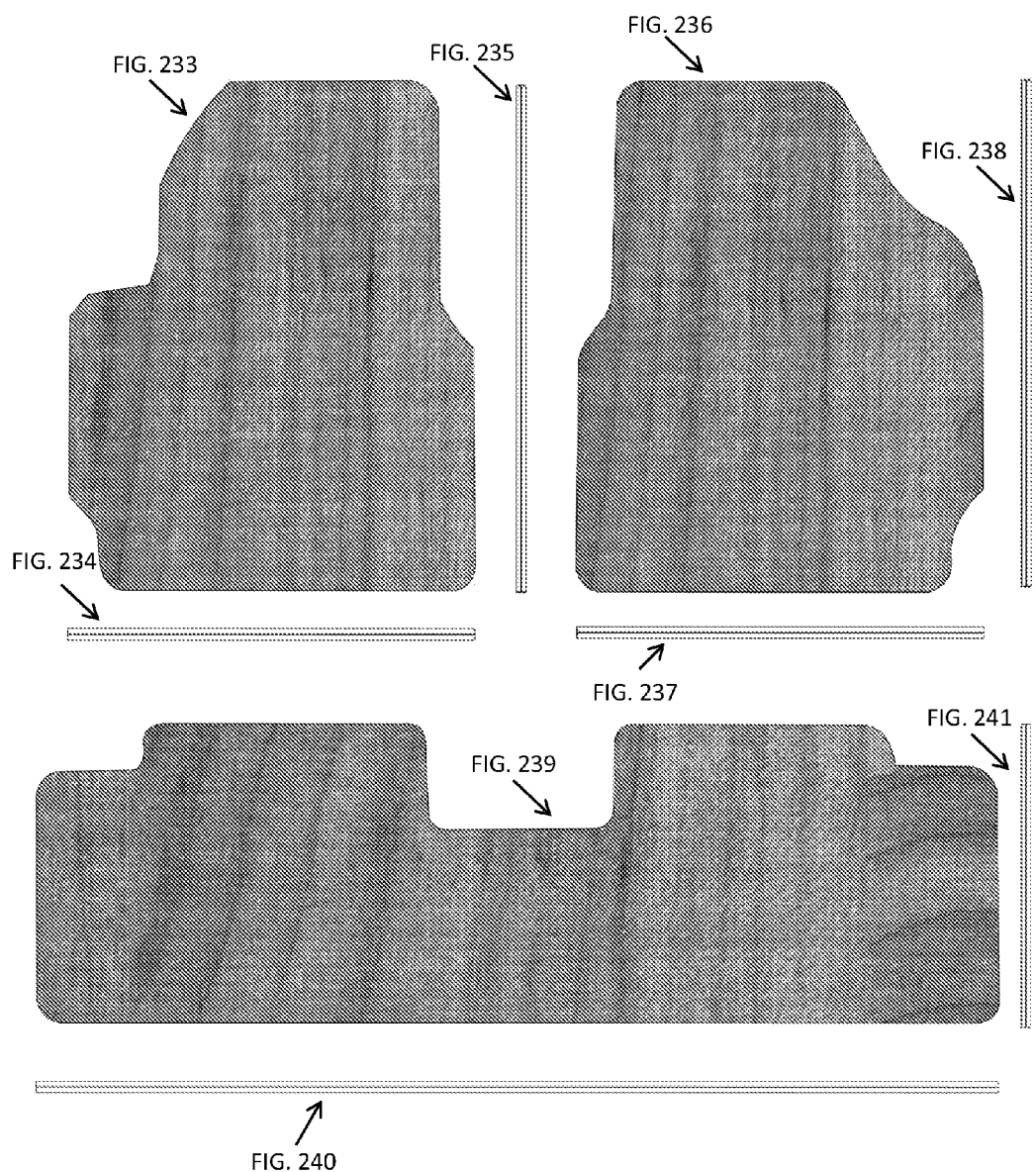

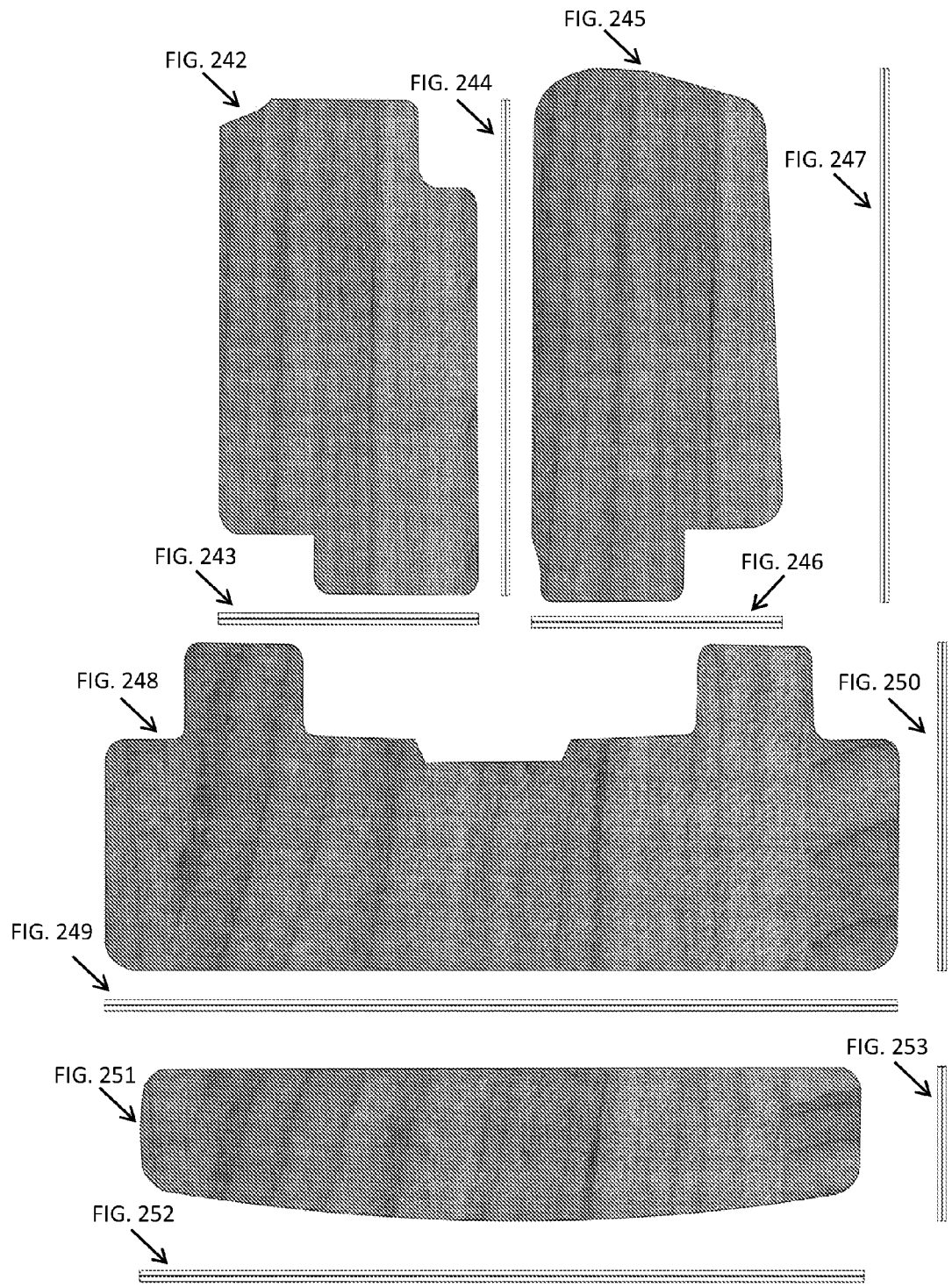

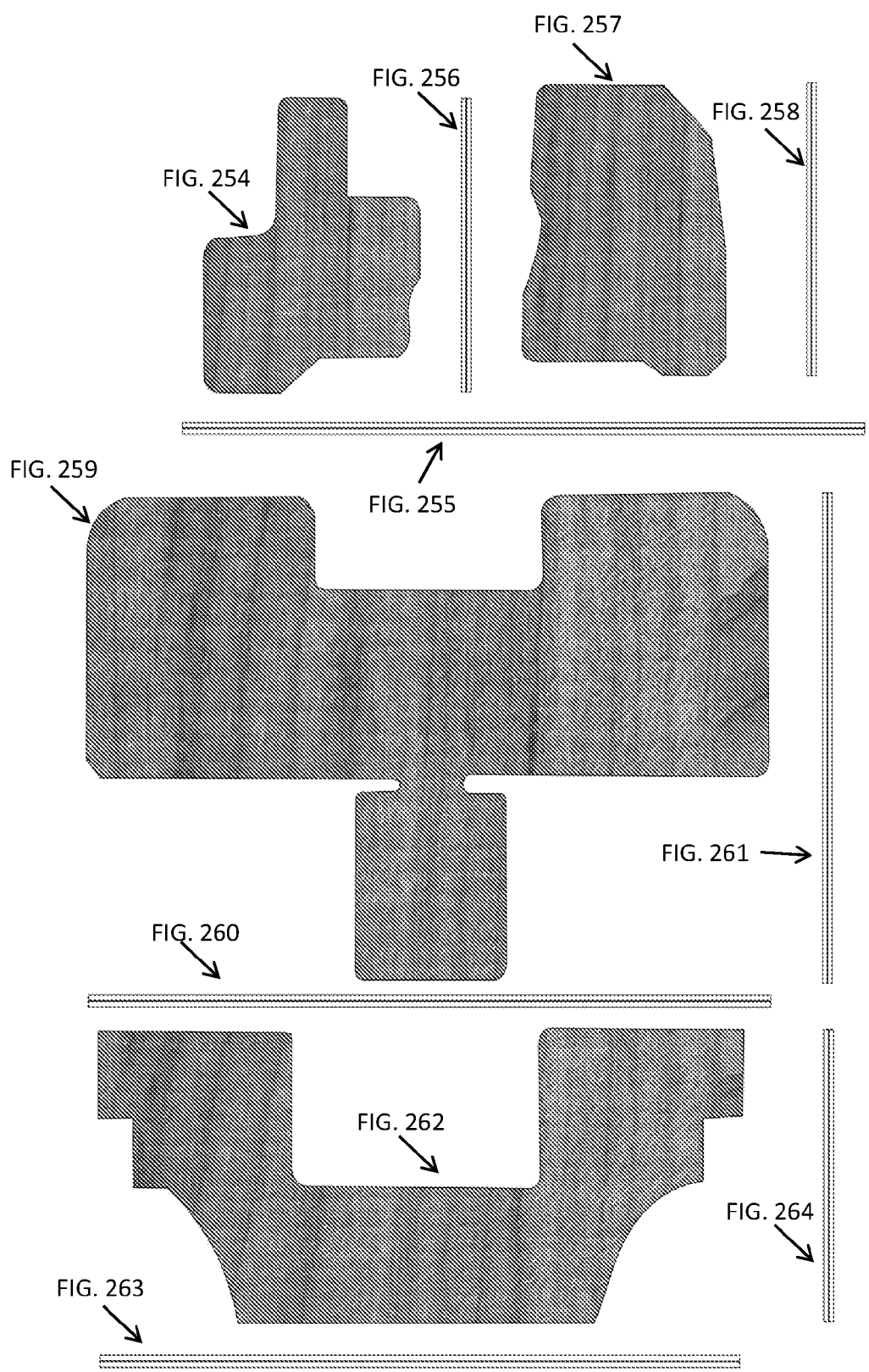

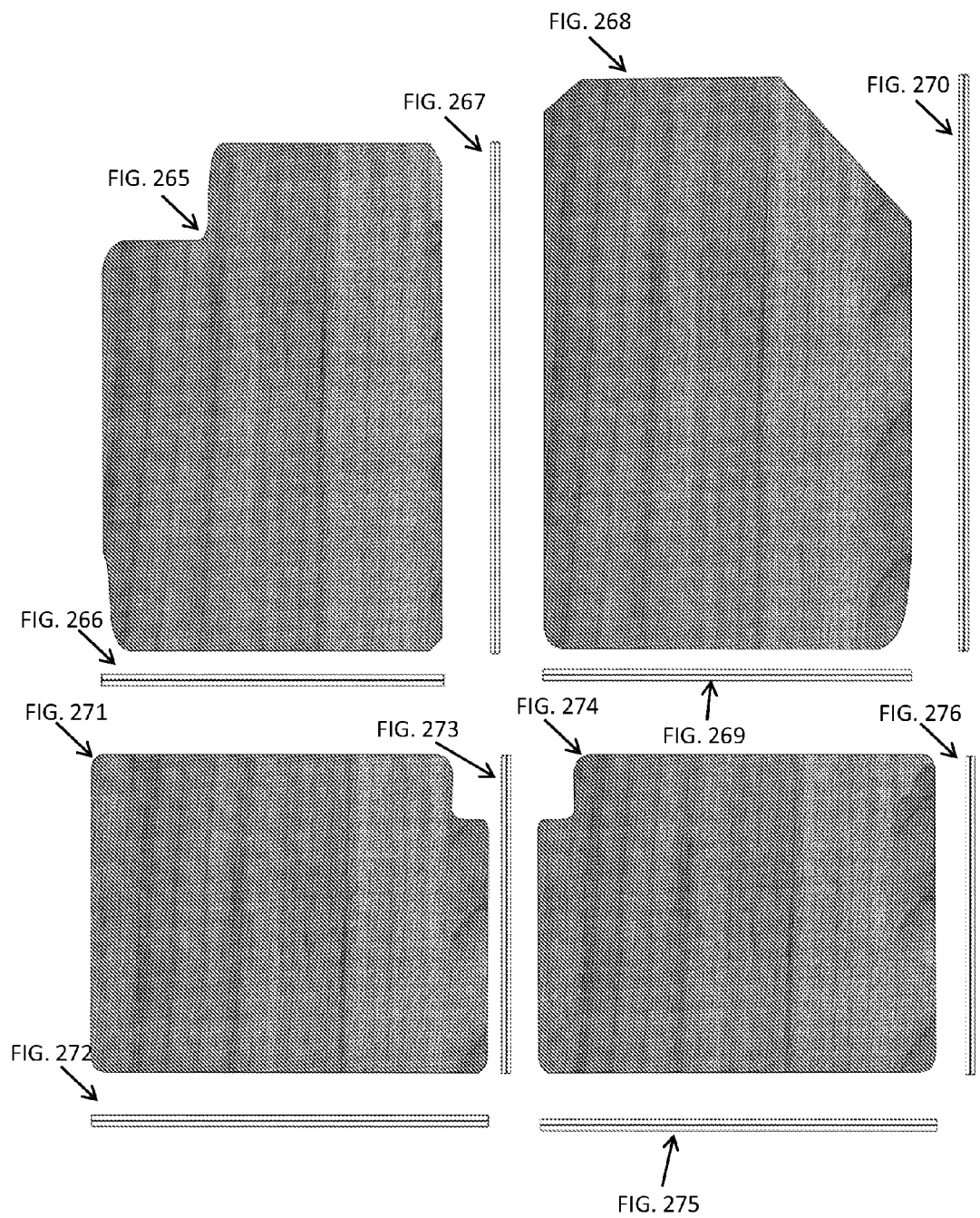

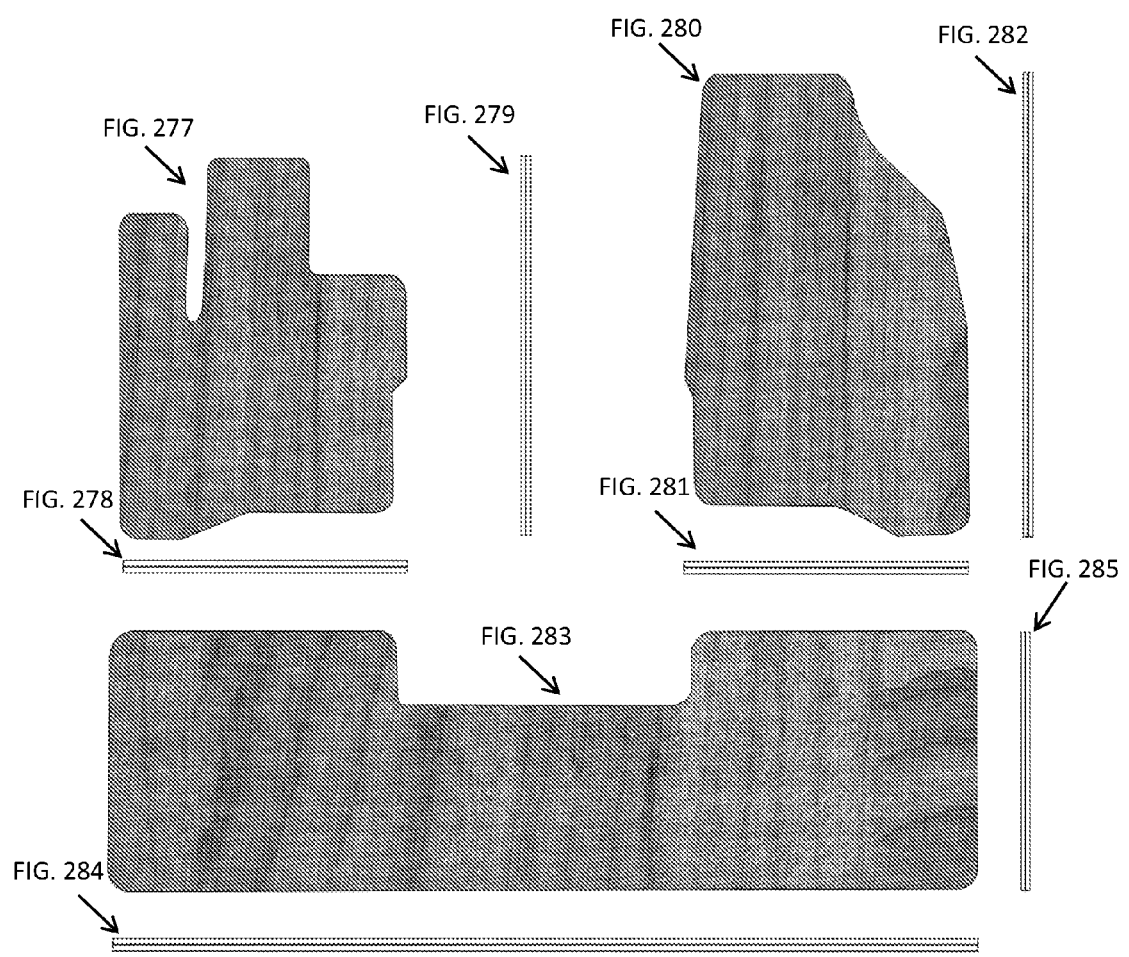

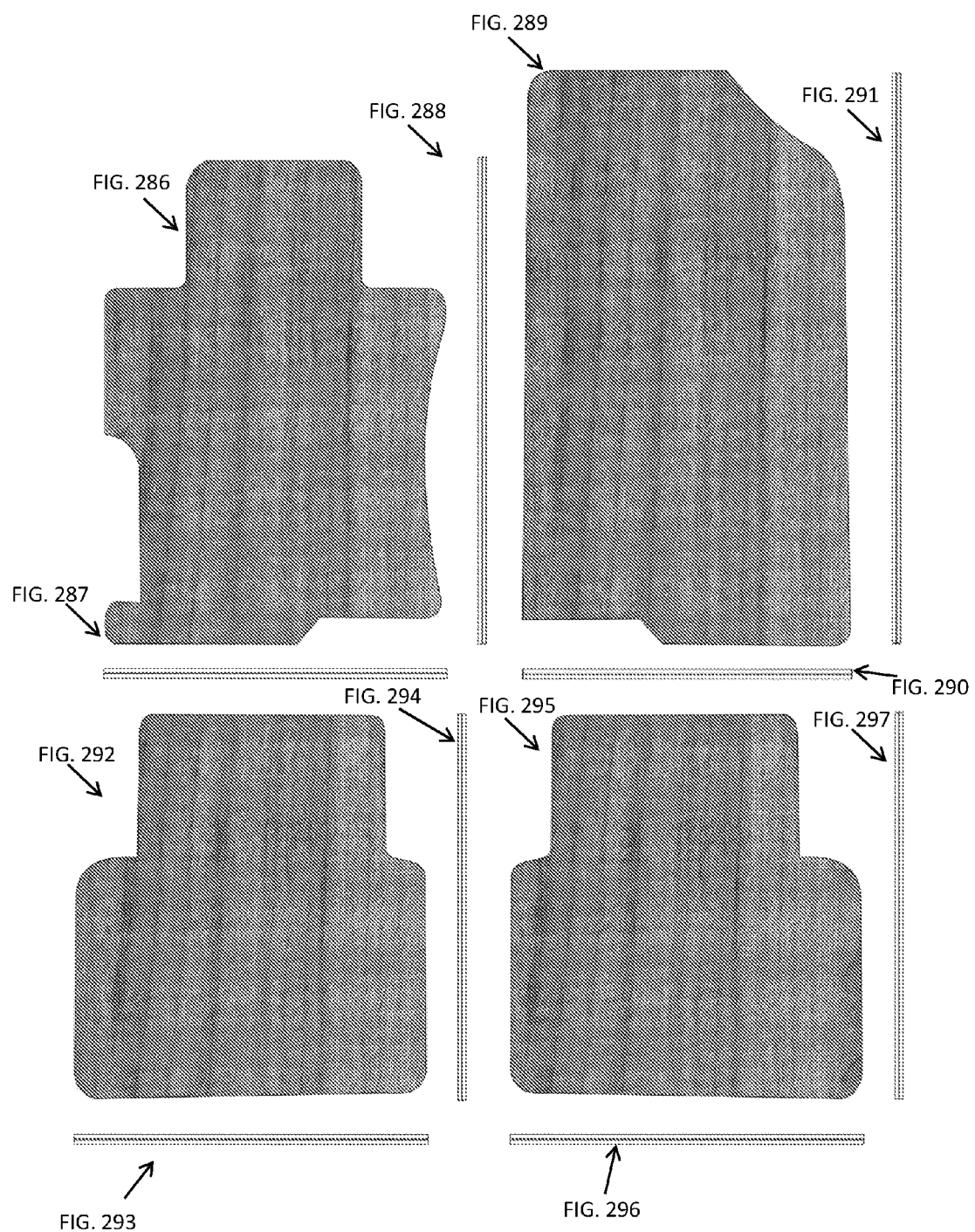

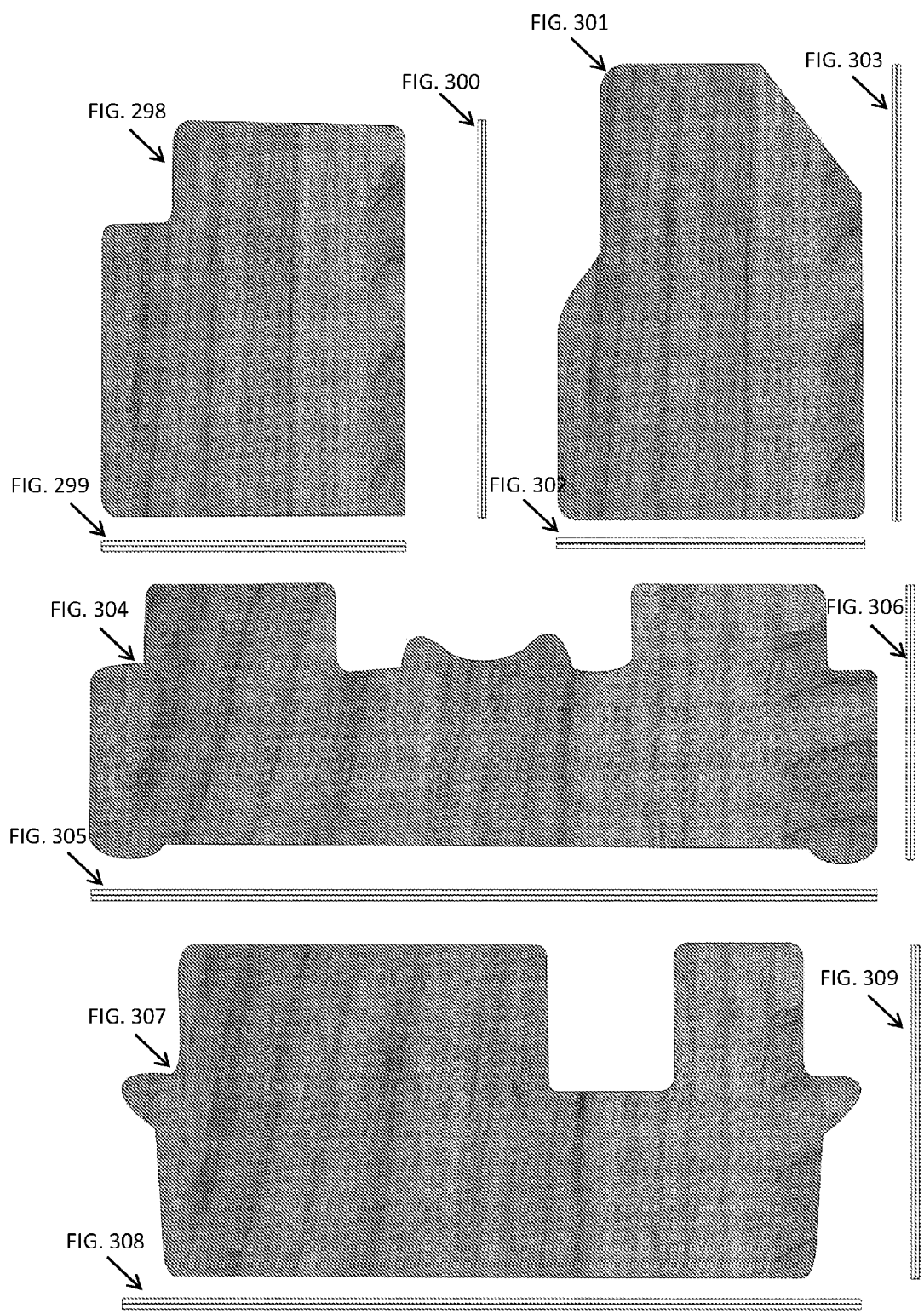

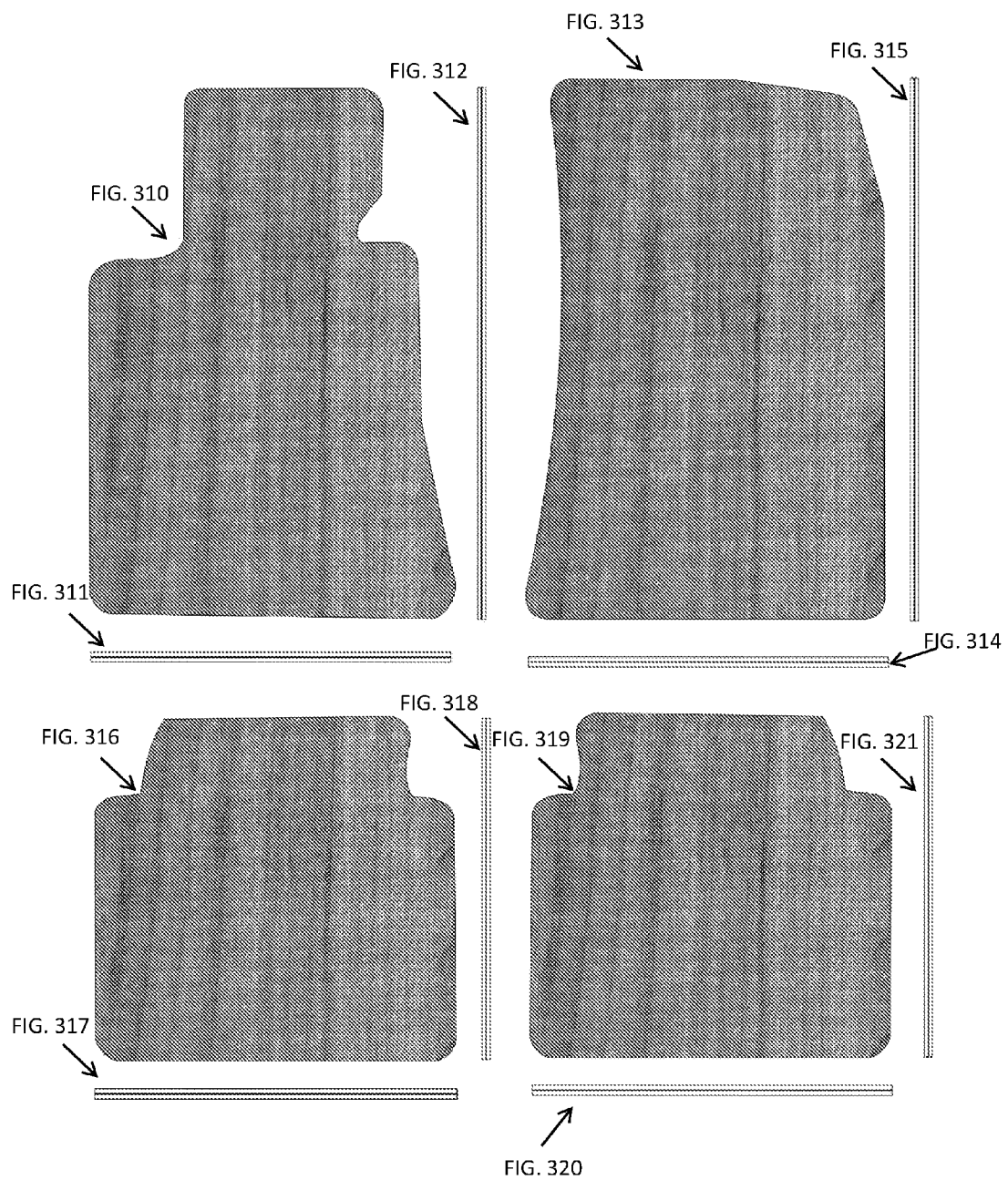

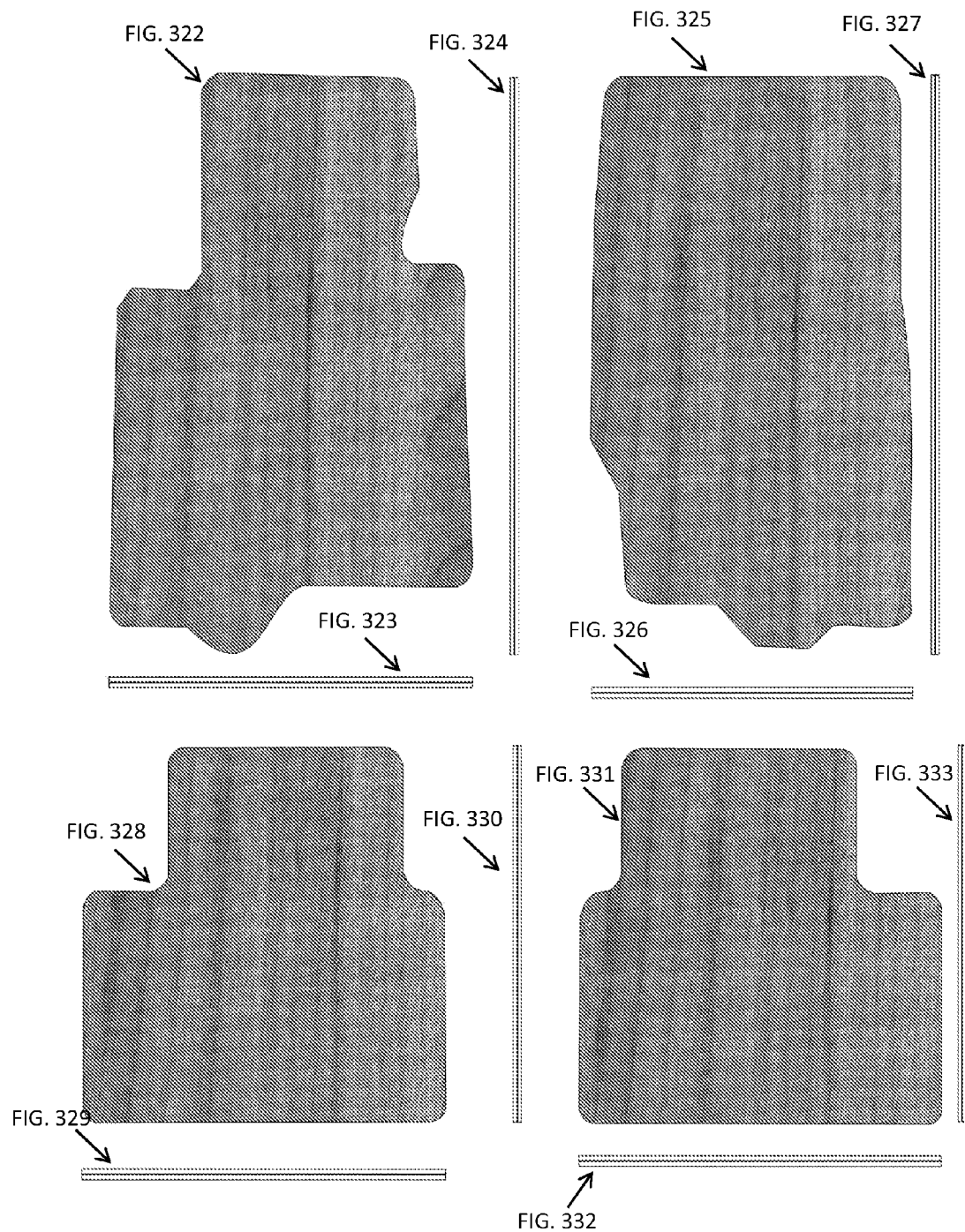

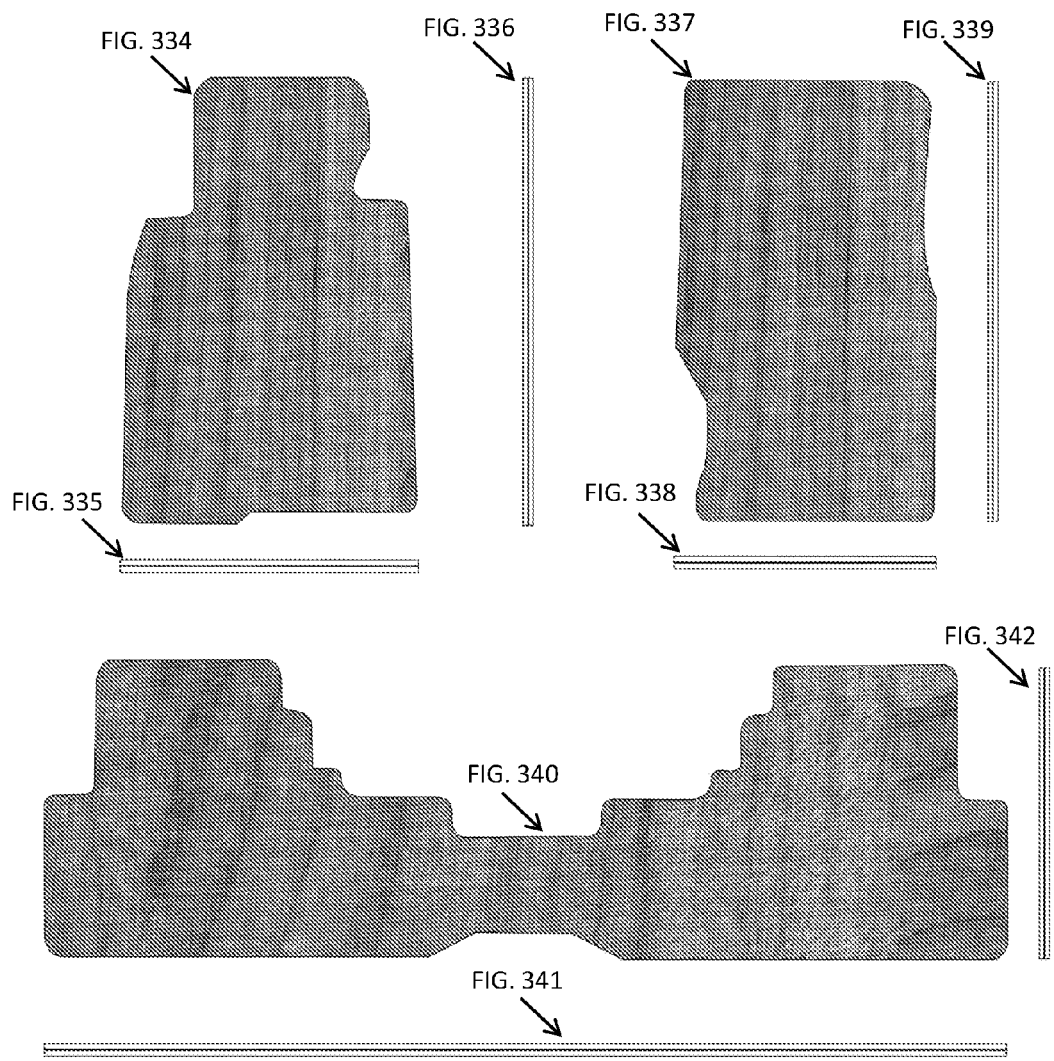

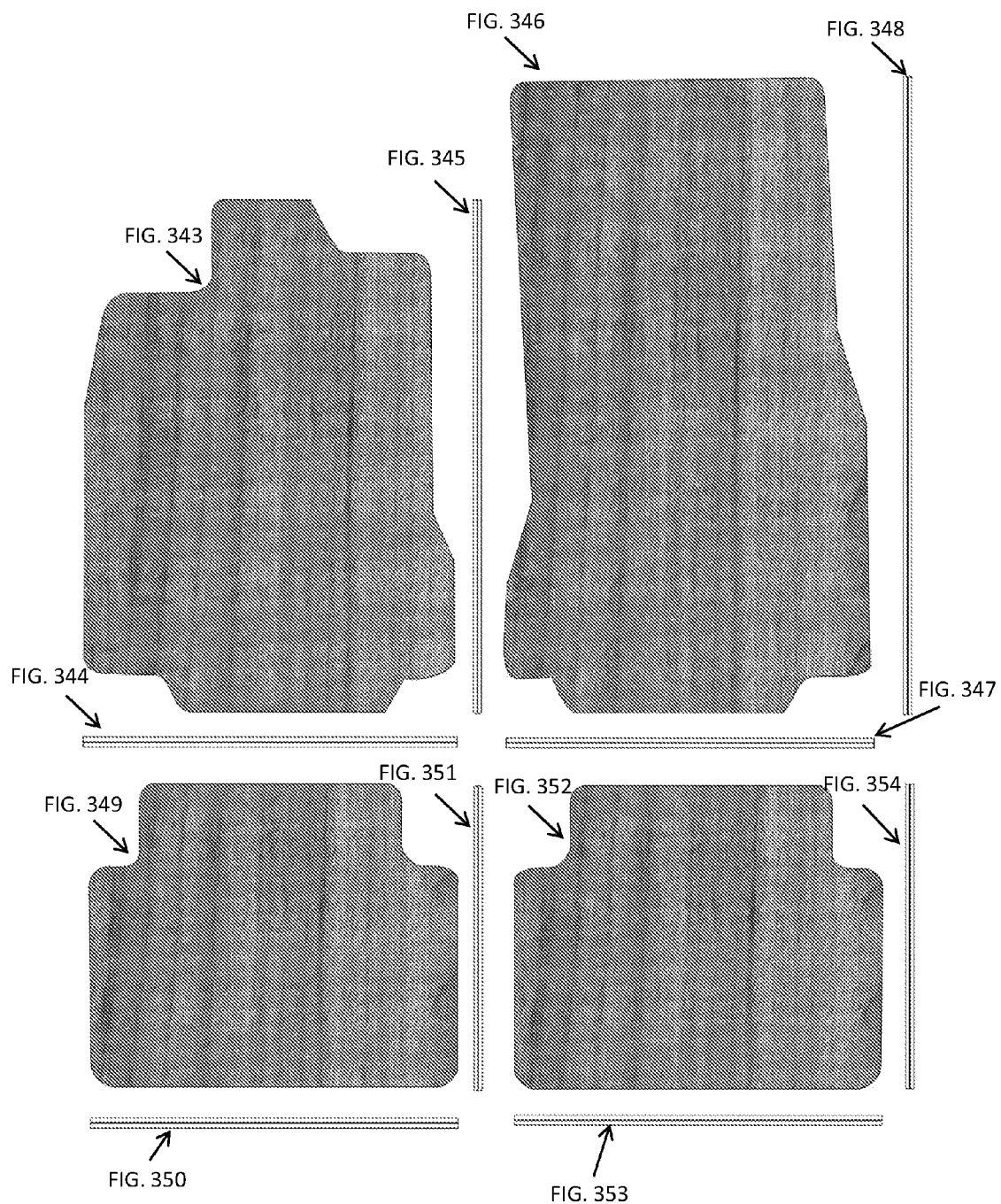

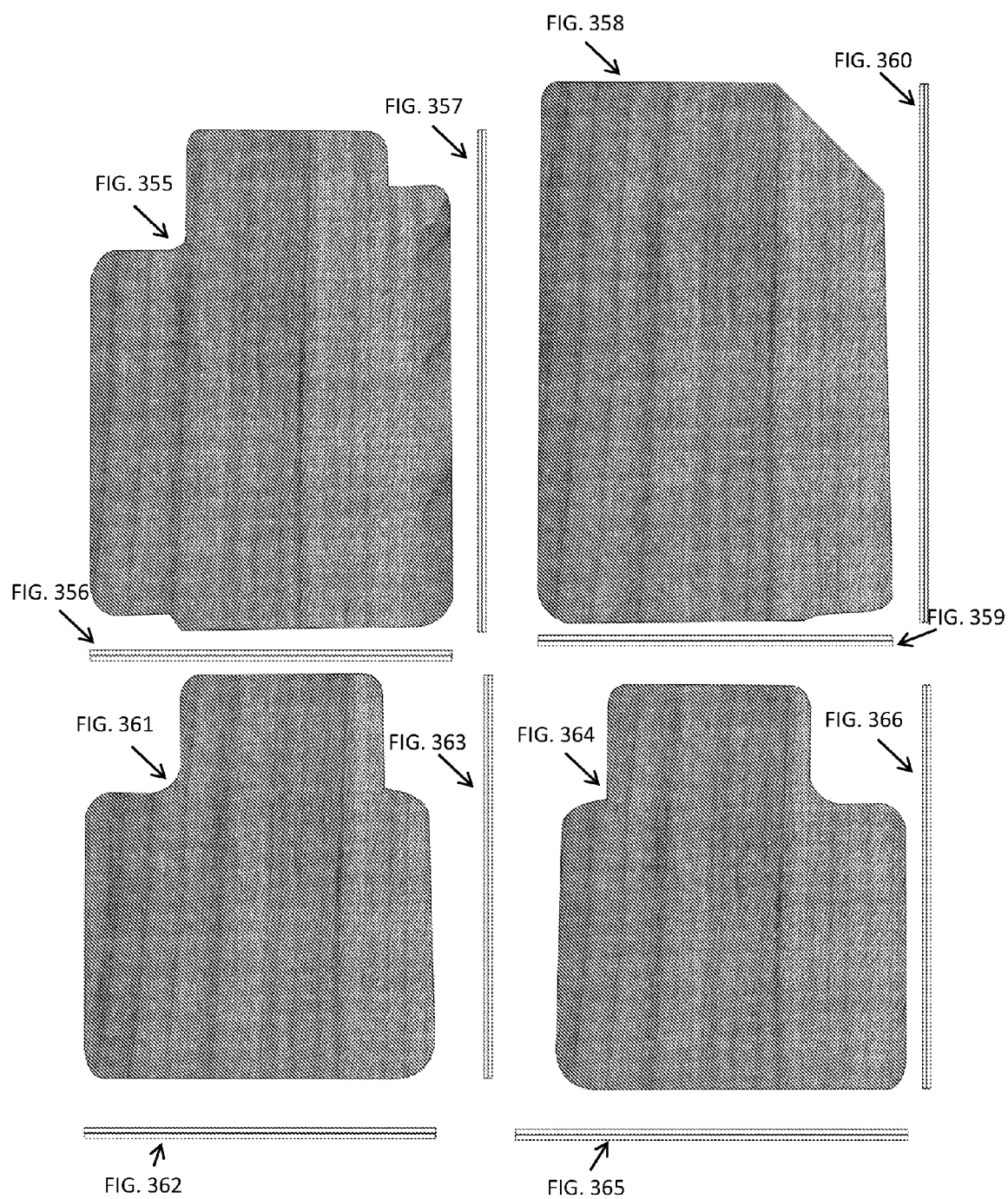

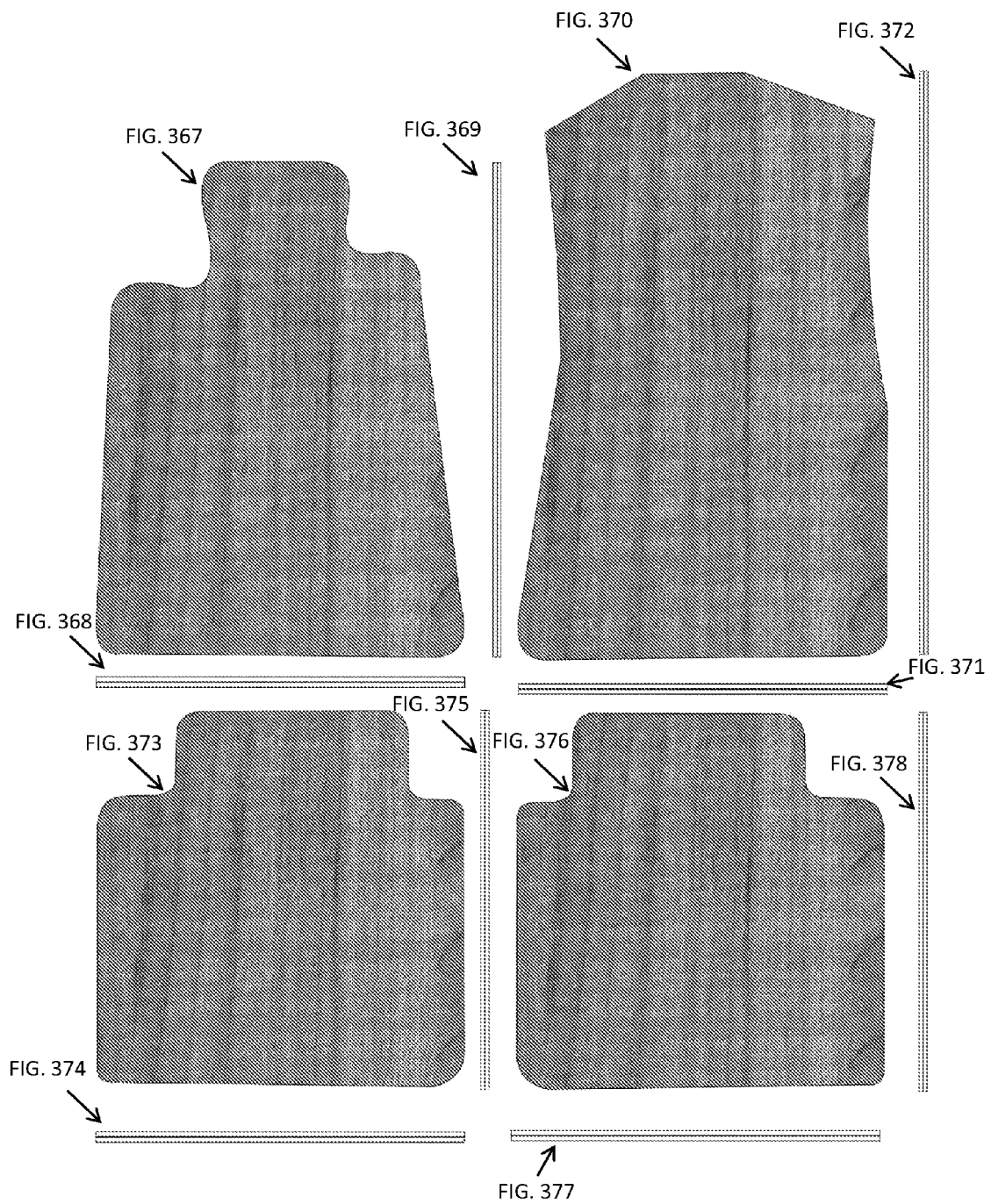

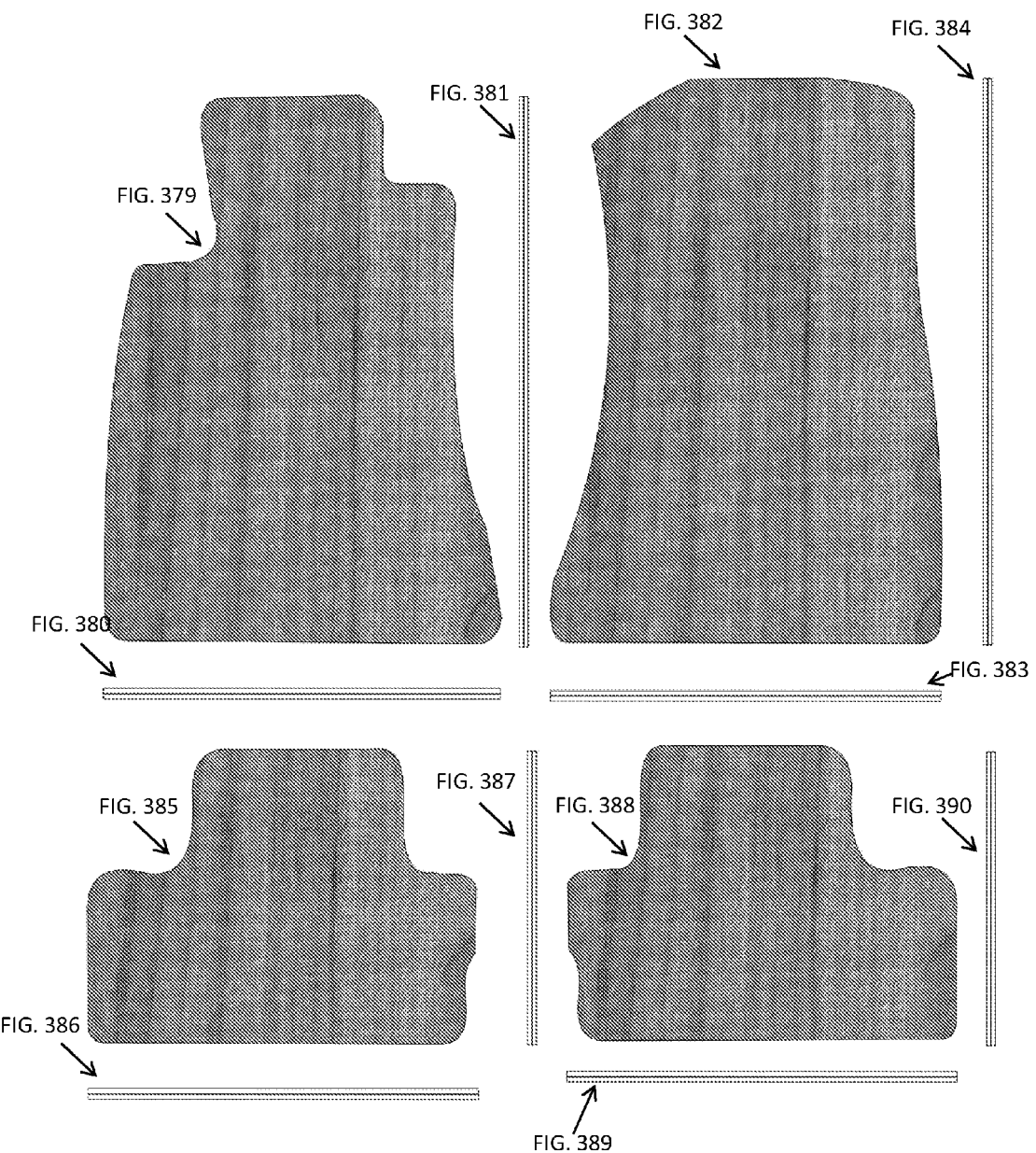

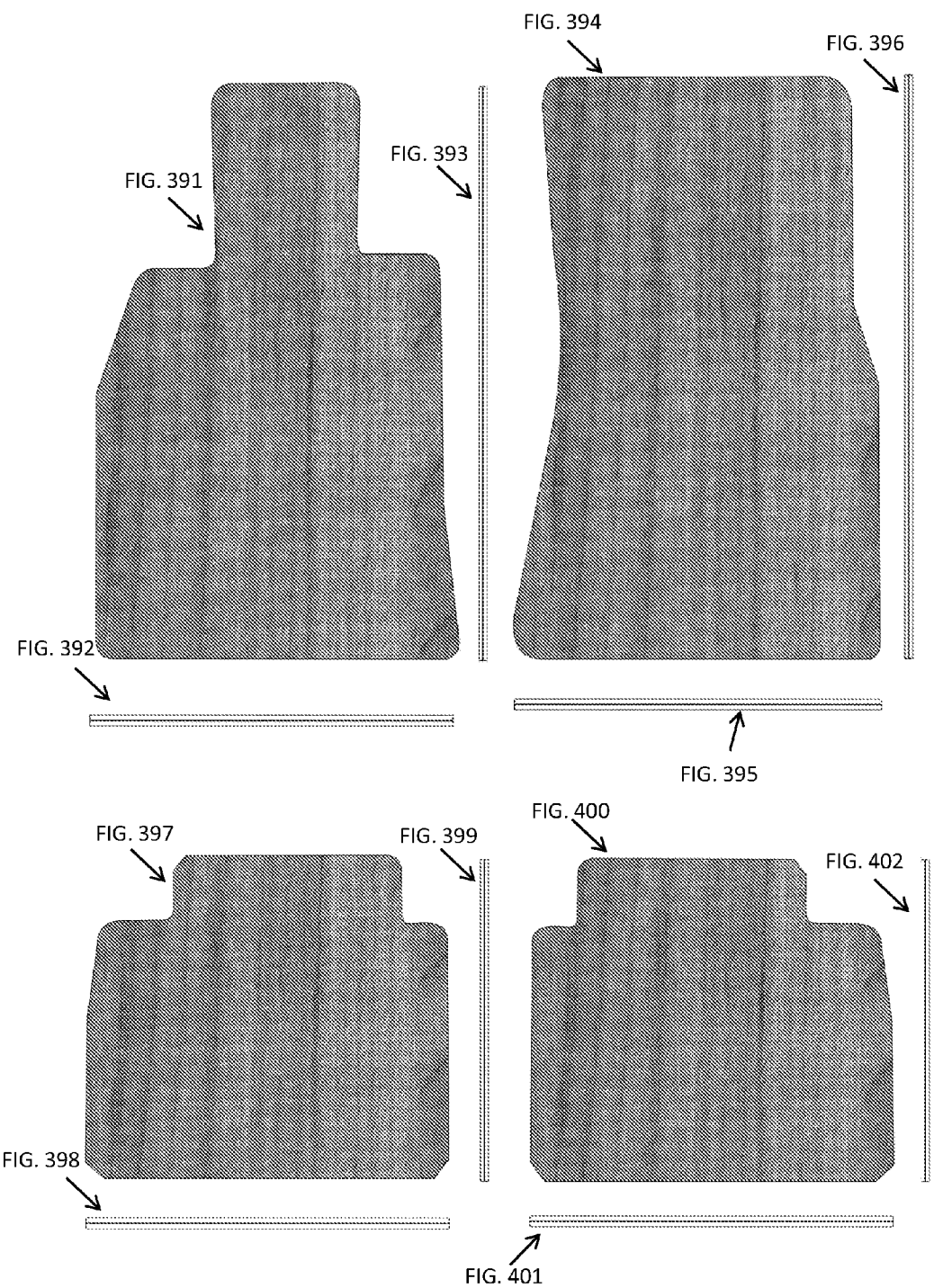

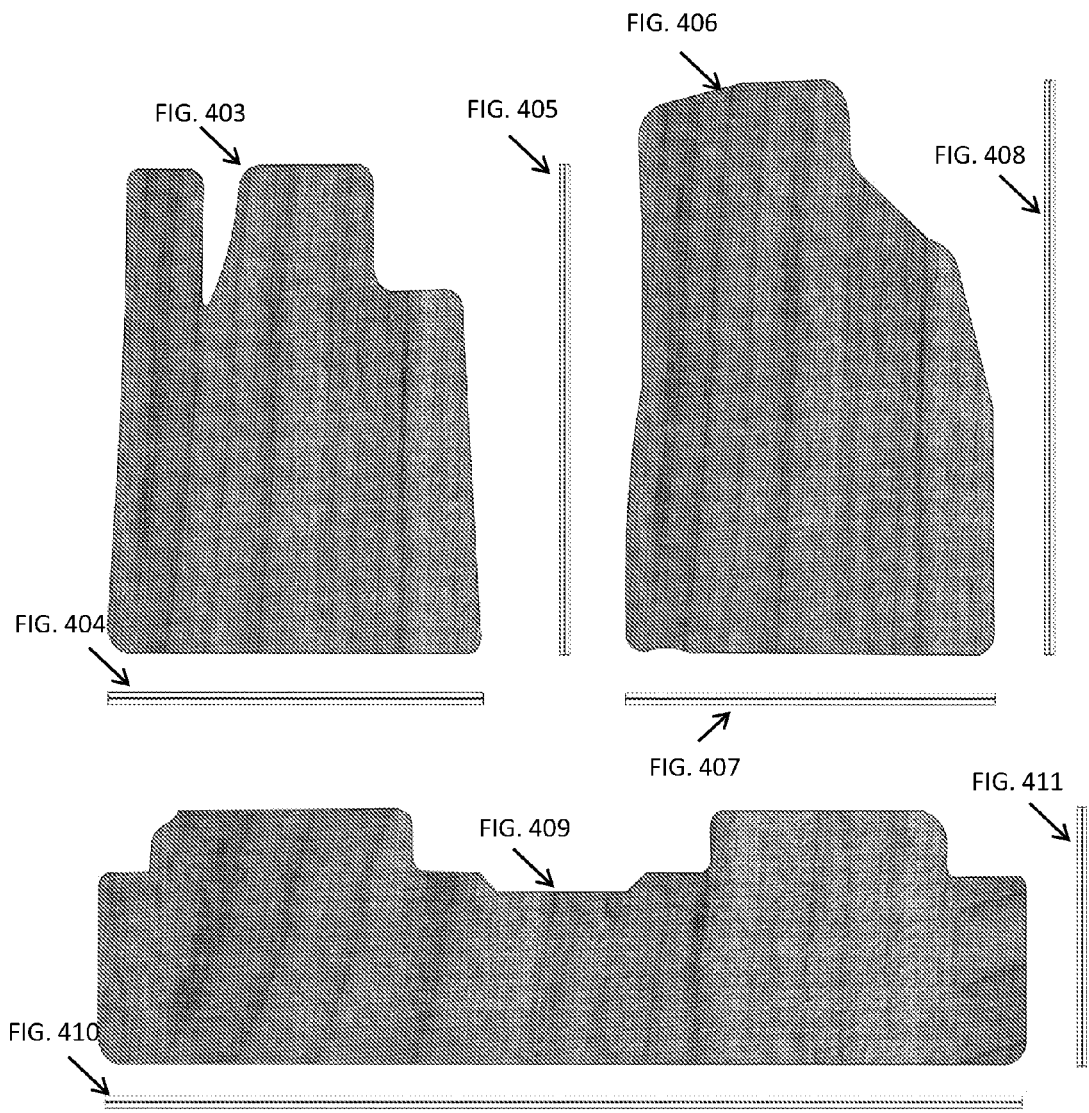

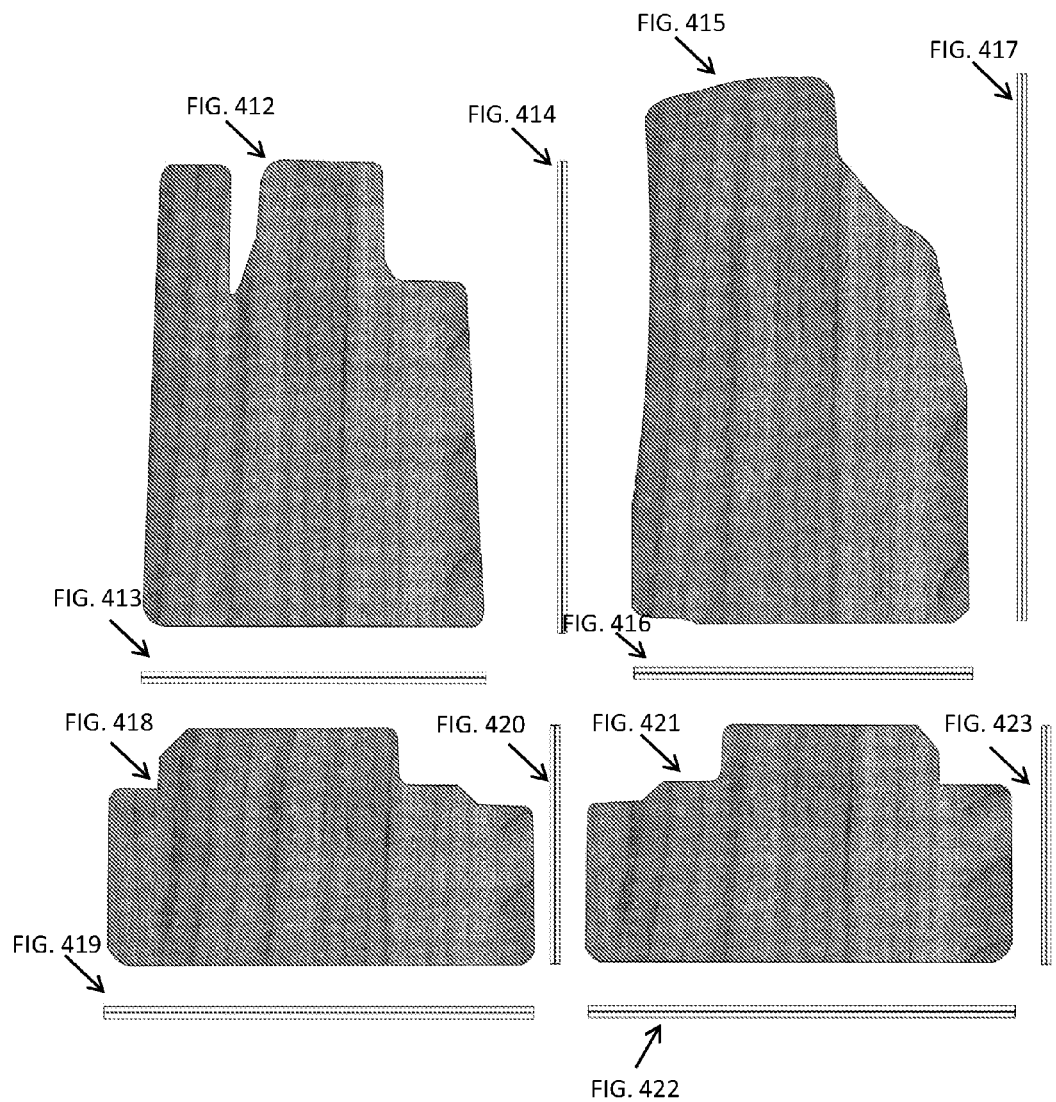

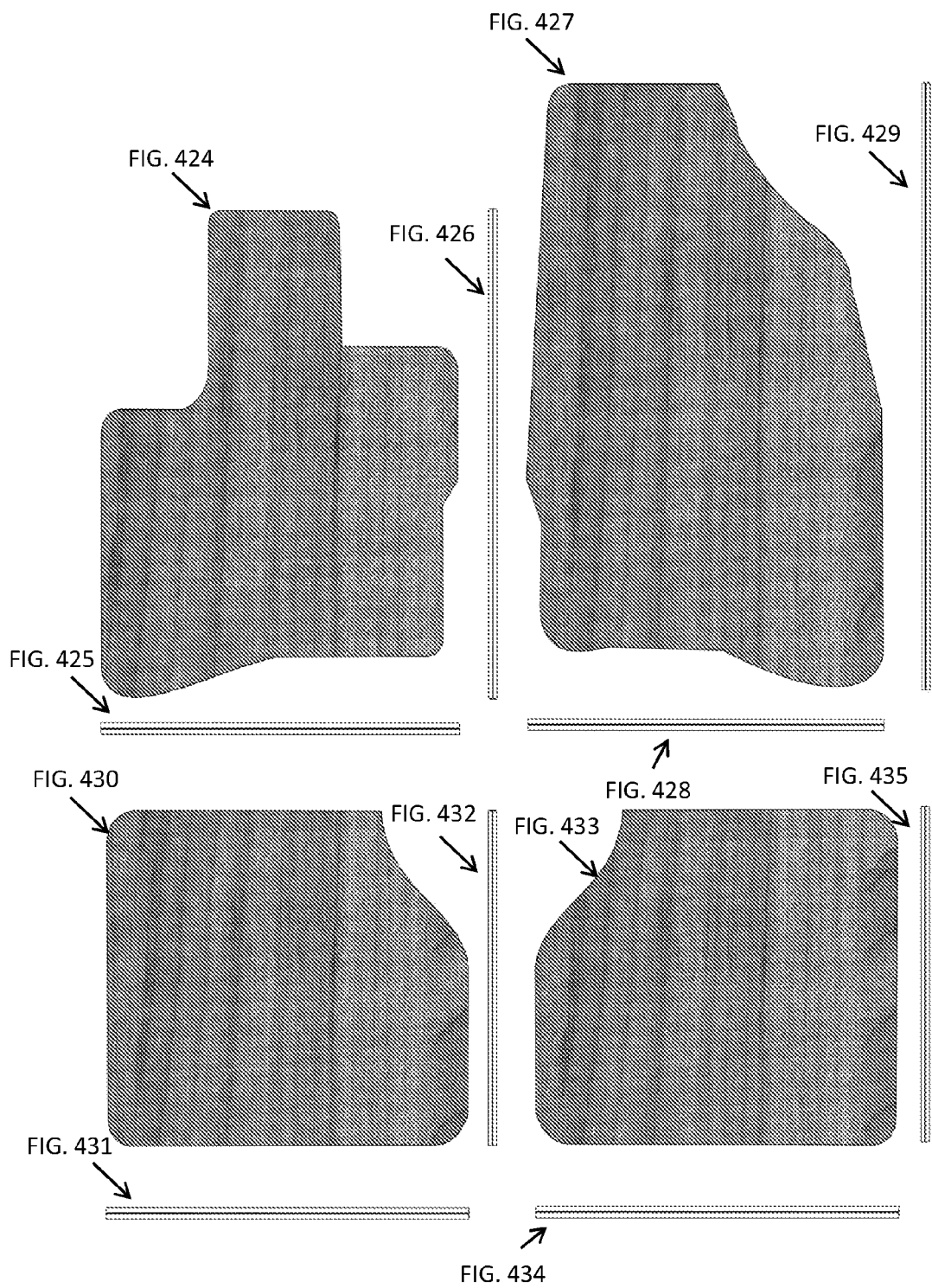

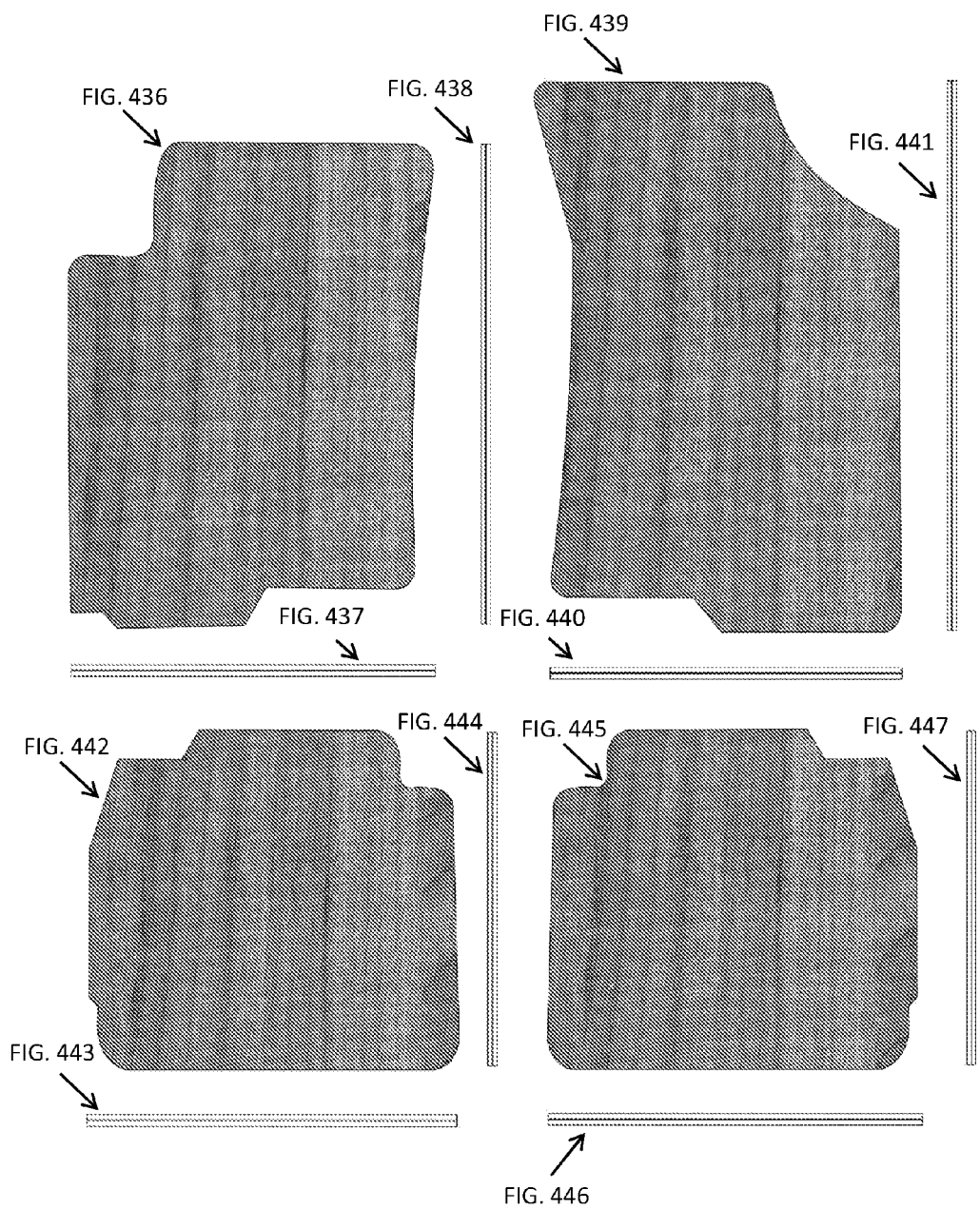

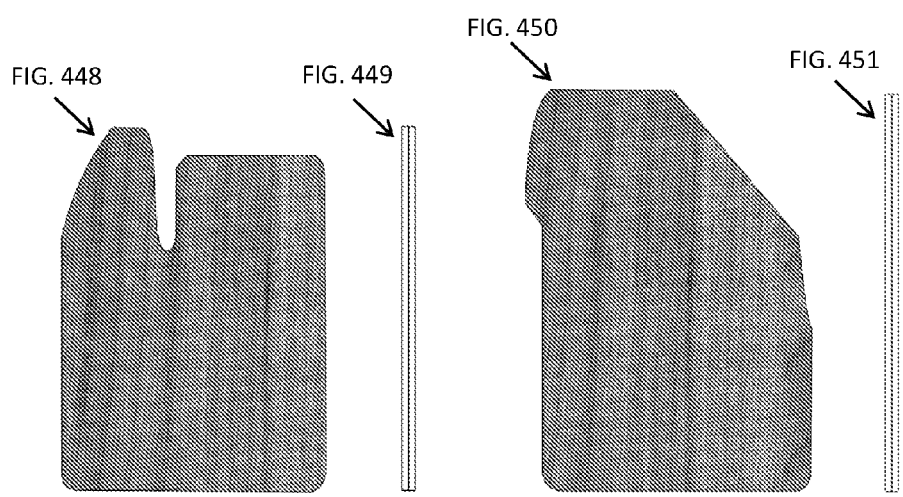
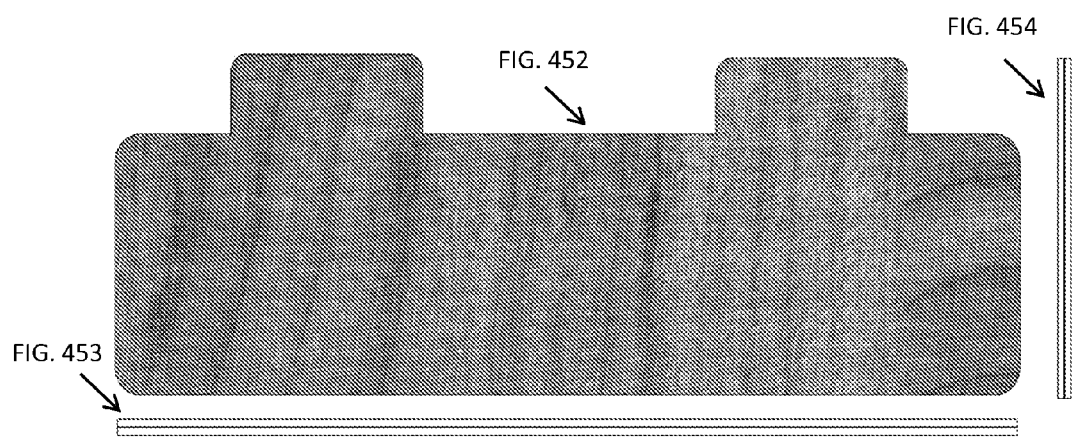
FIG. 448  FIG. 449  FIG. 450  FIG. 451  FIG. 452  FIG. 453  FIG. 454

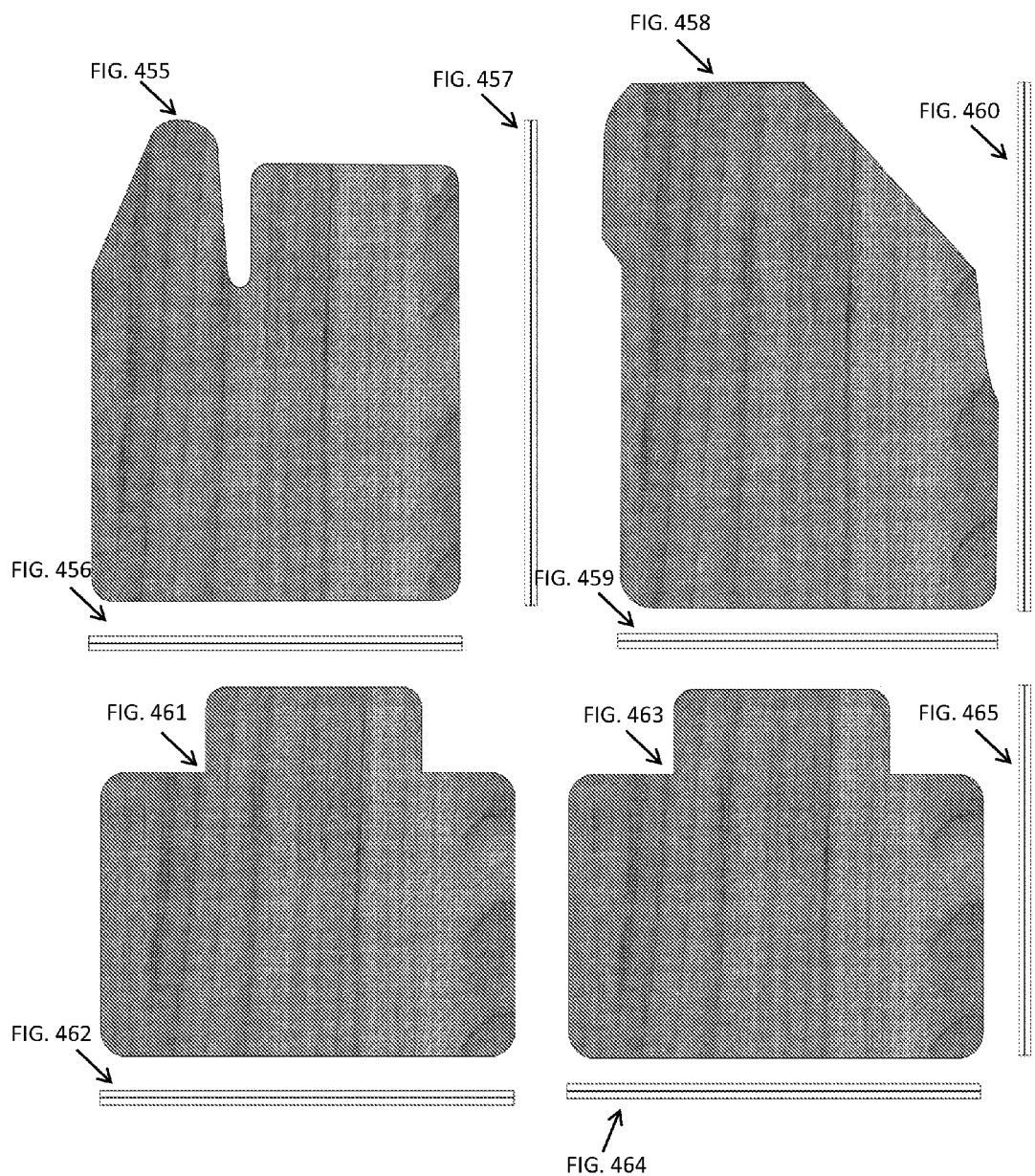

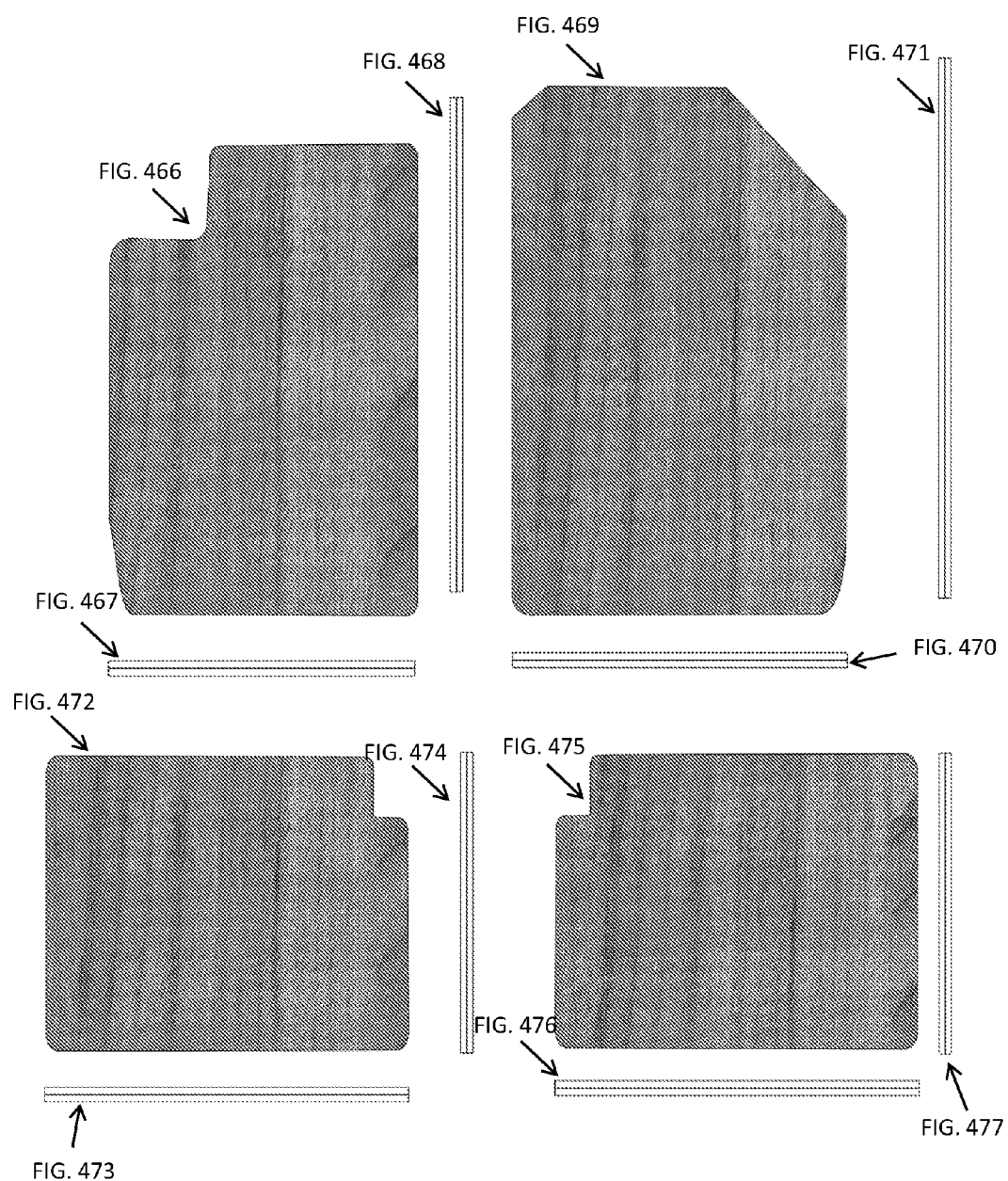

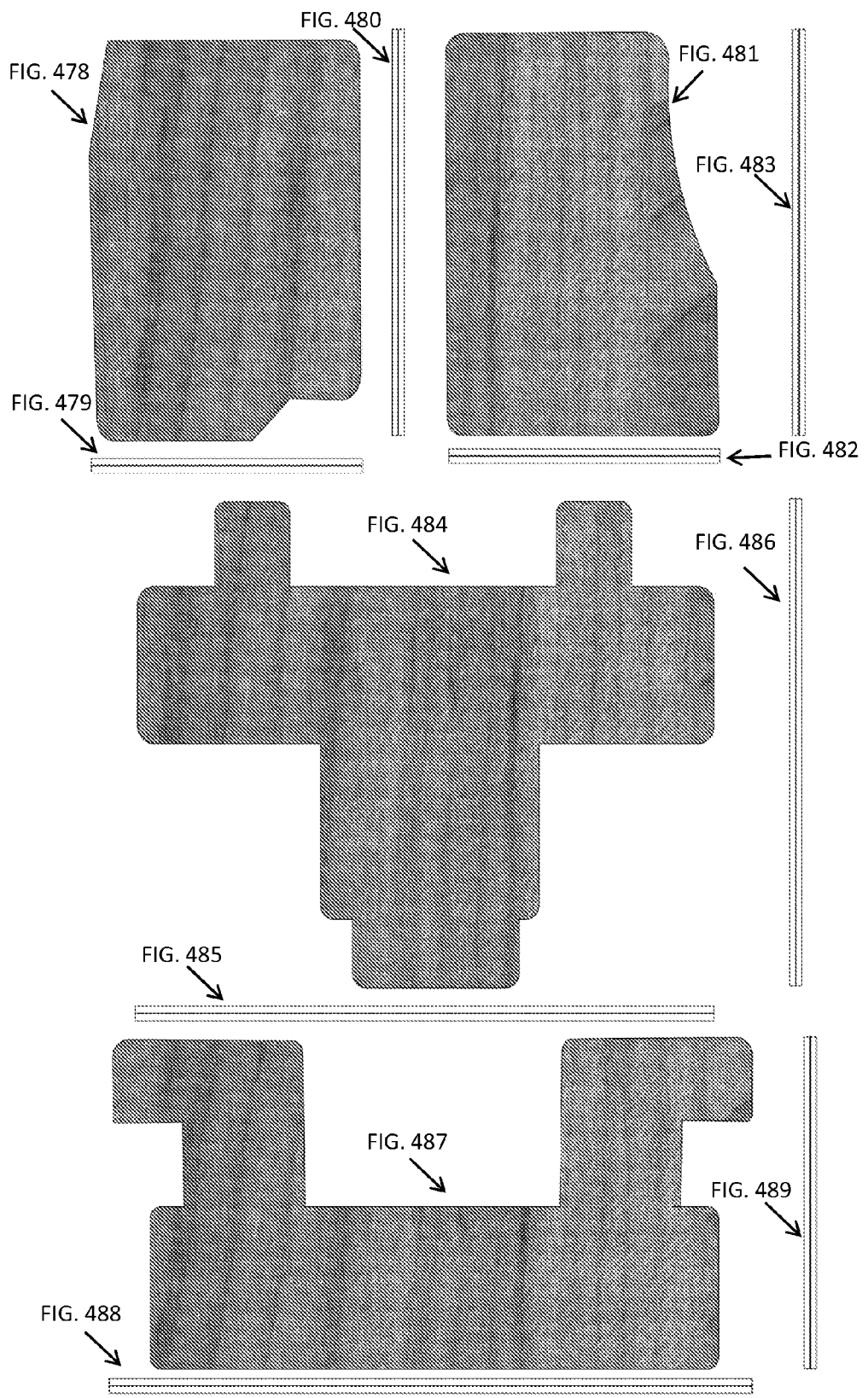

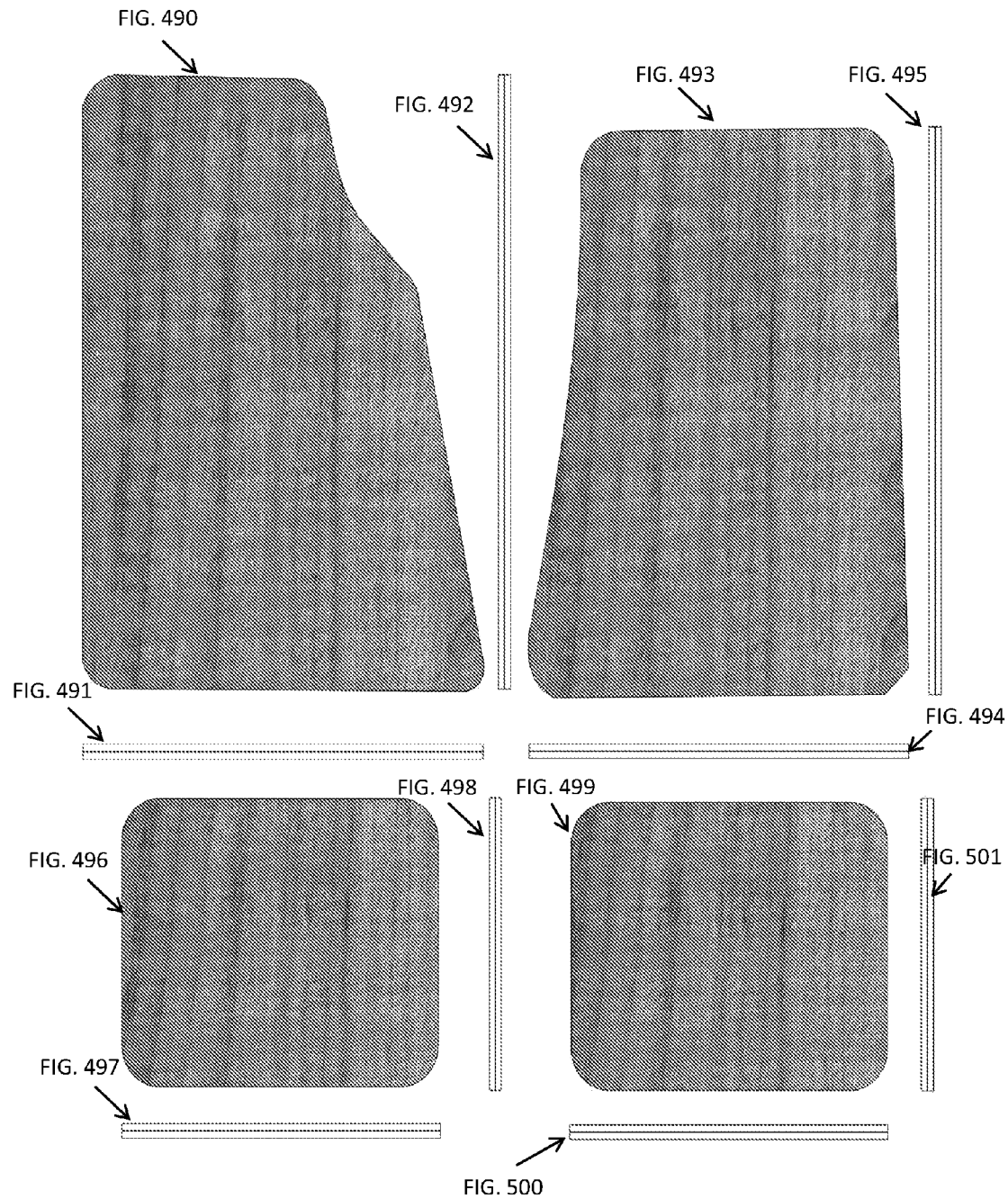

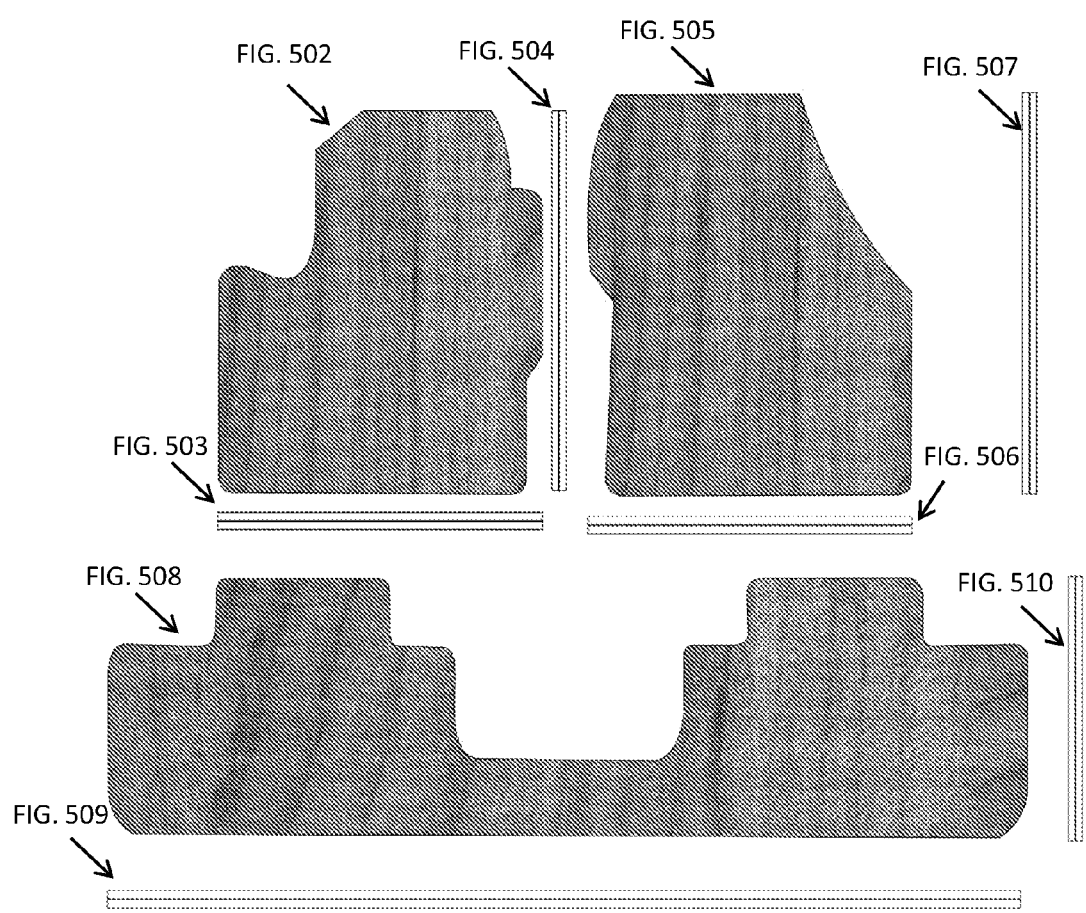

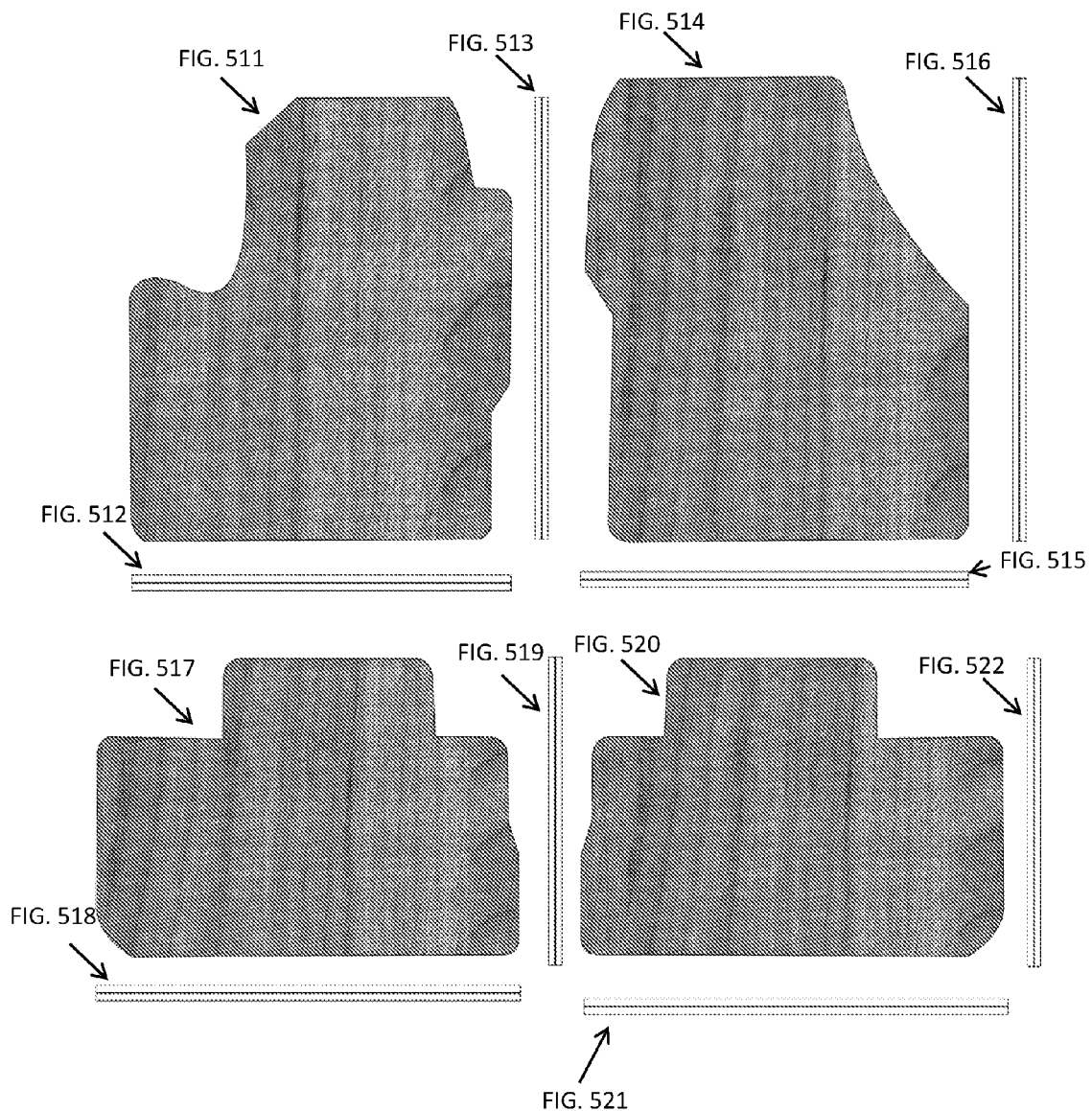

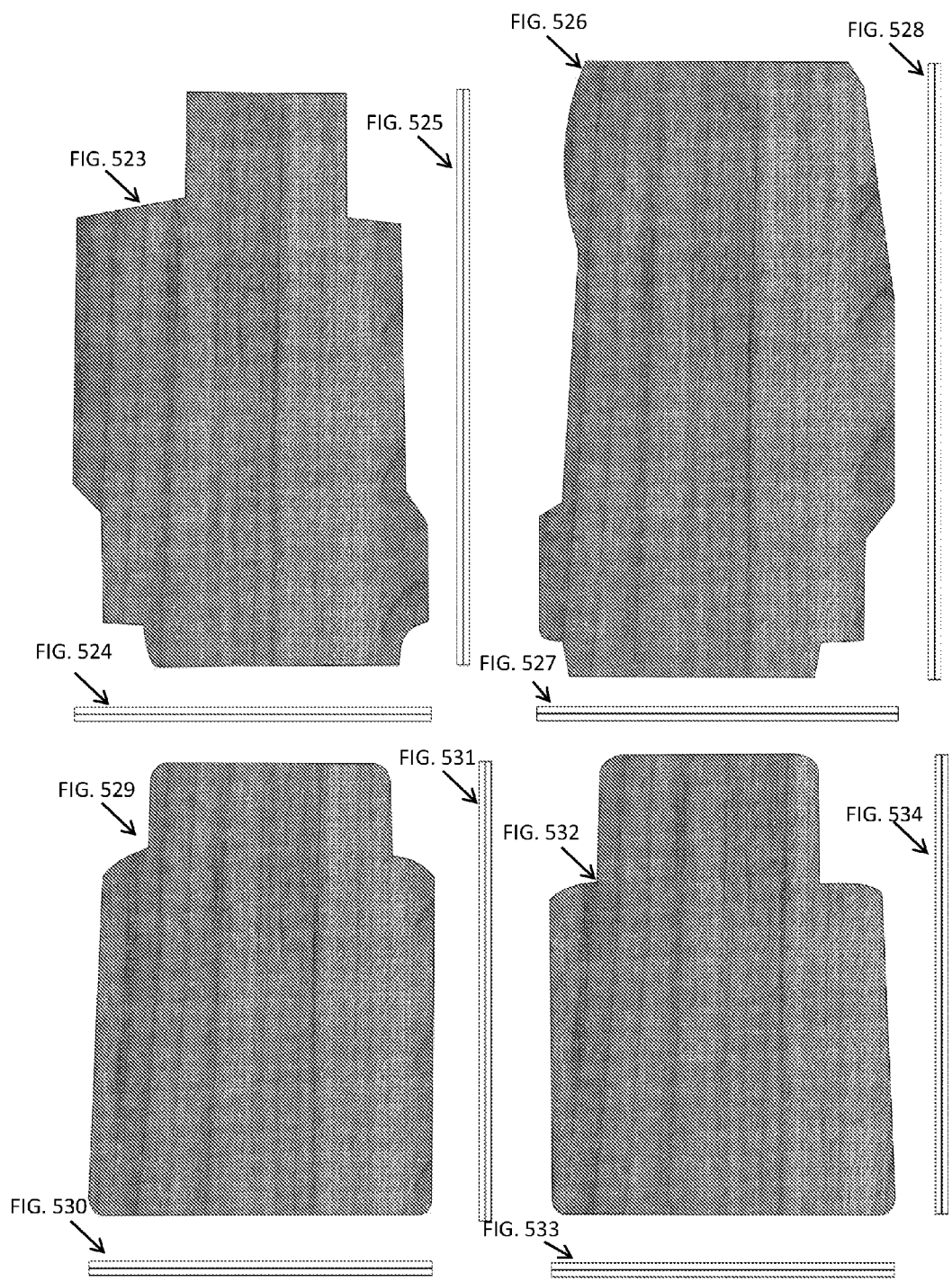

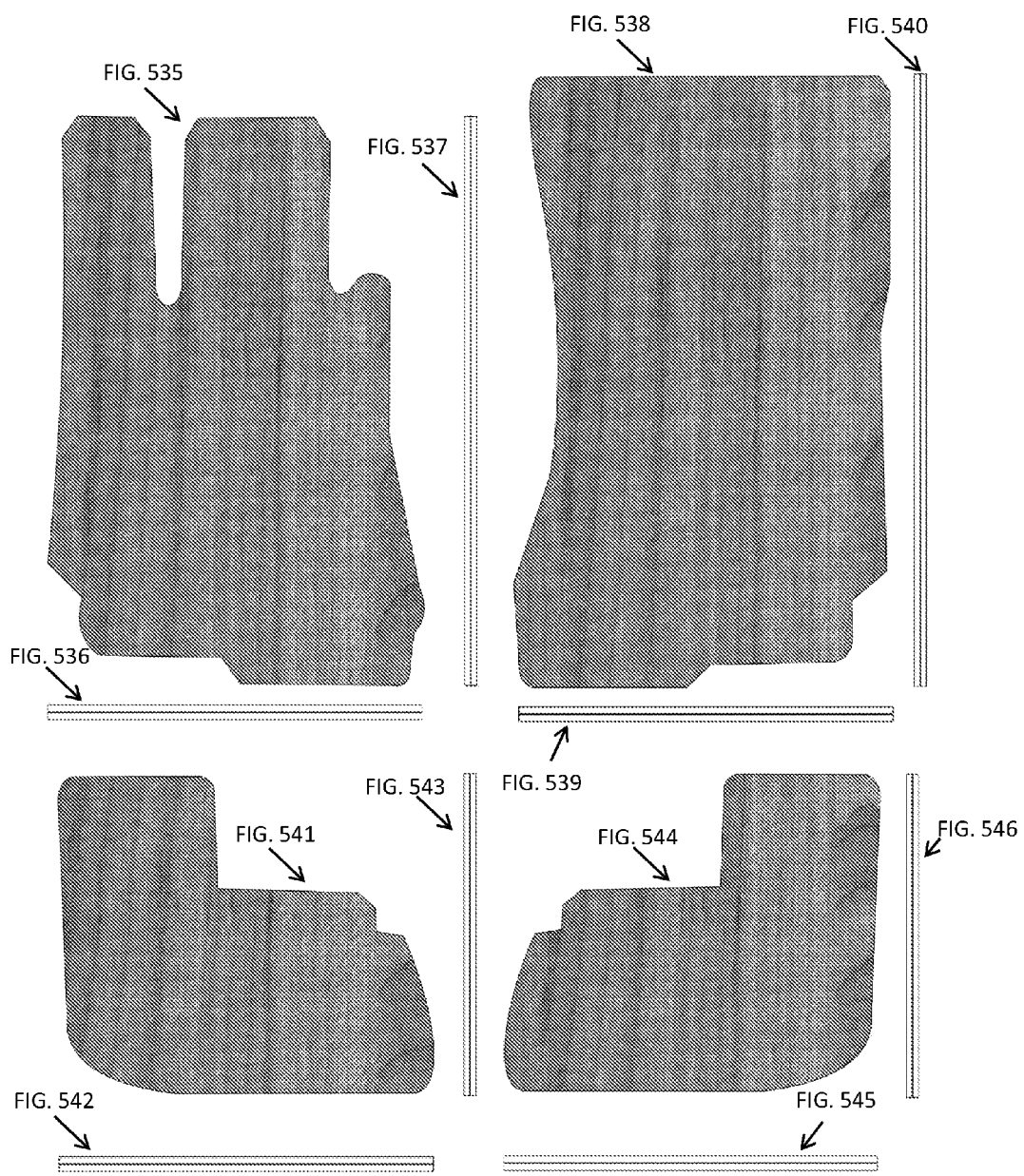

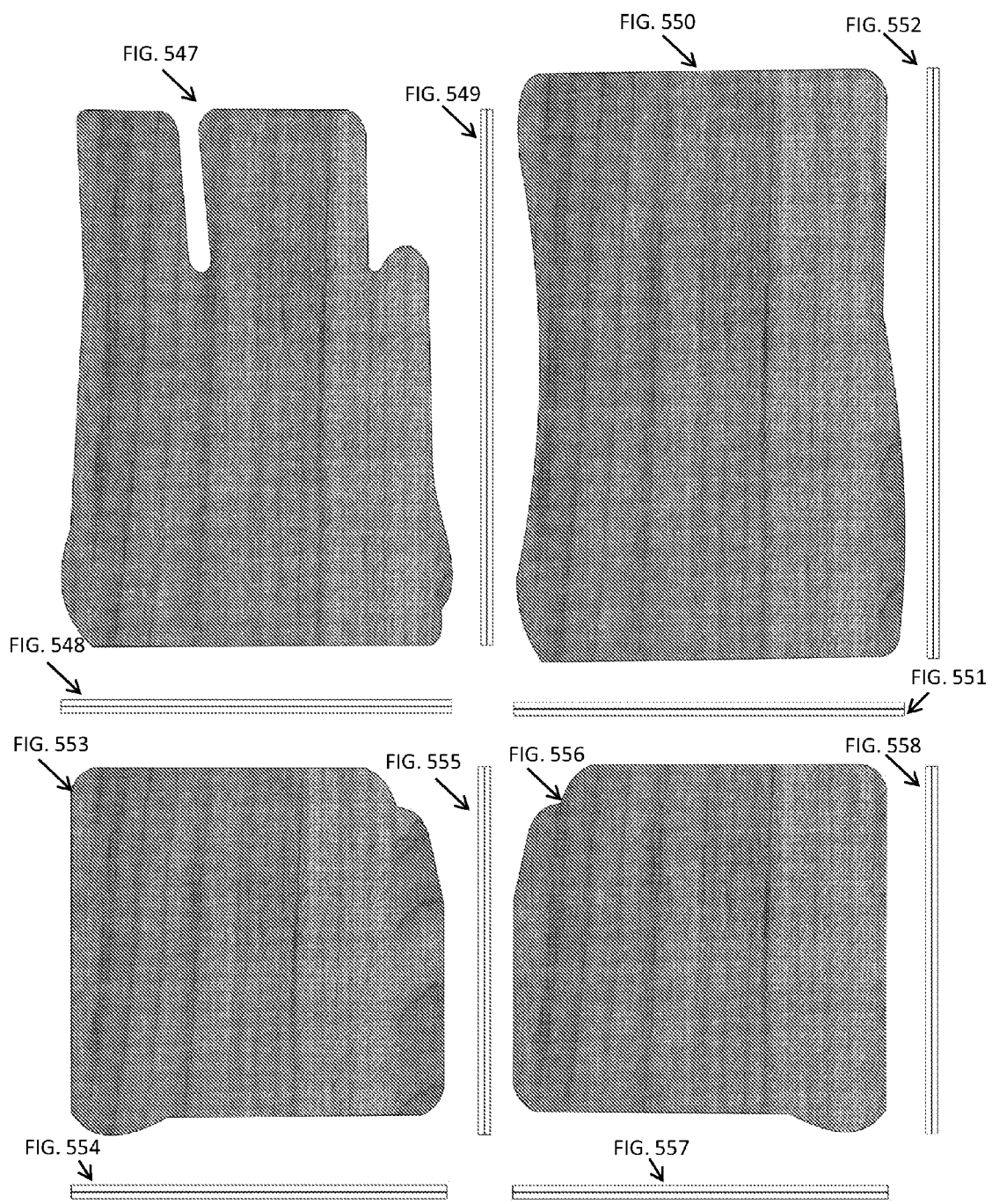

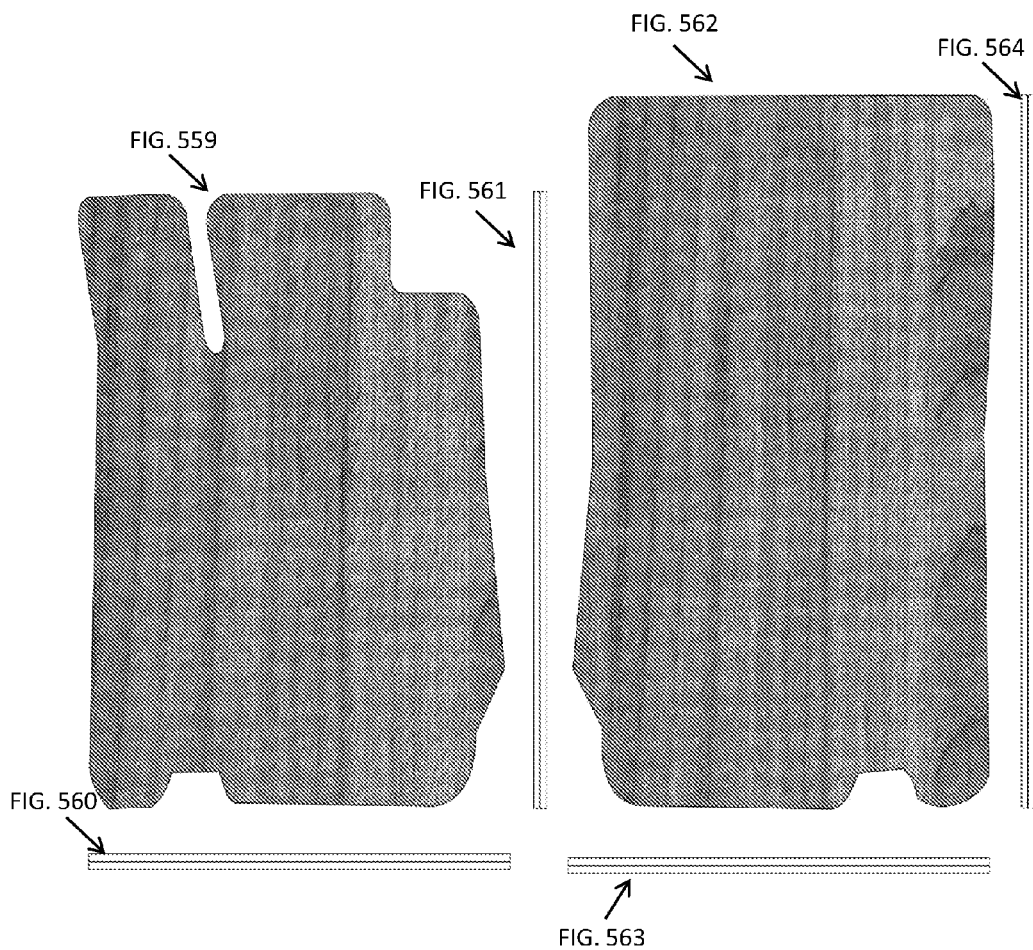

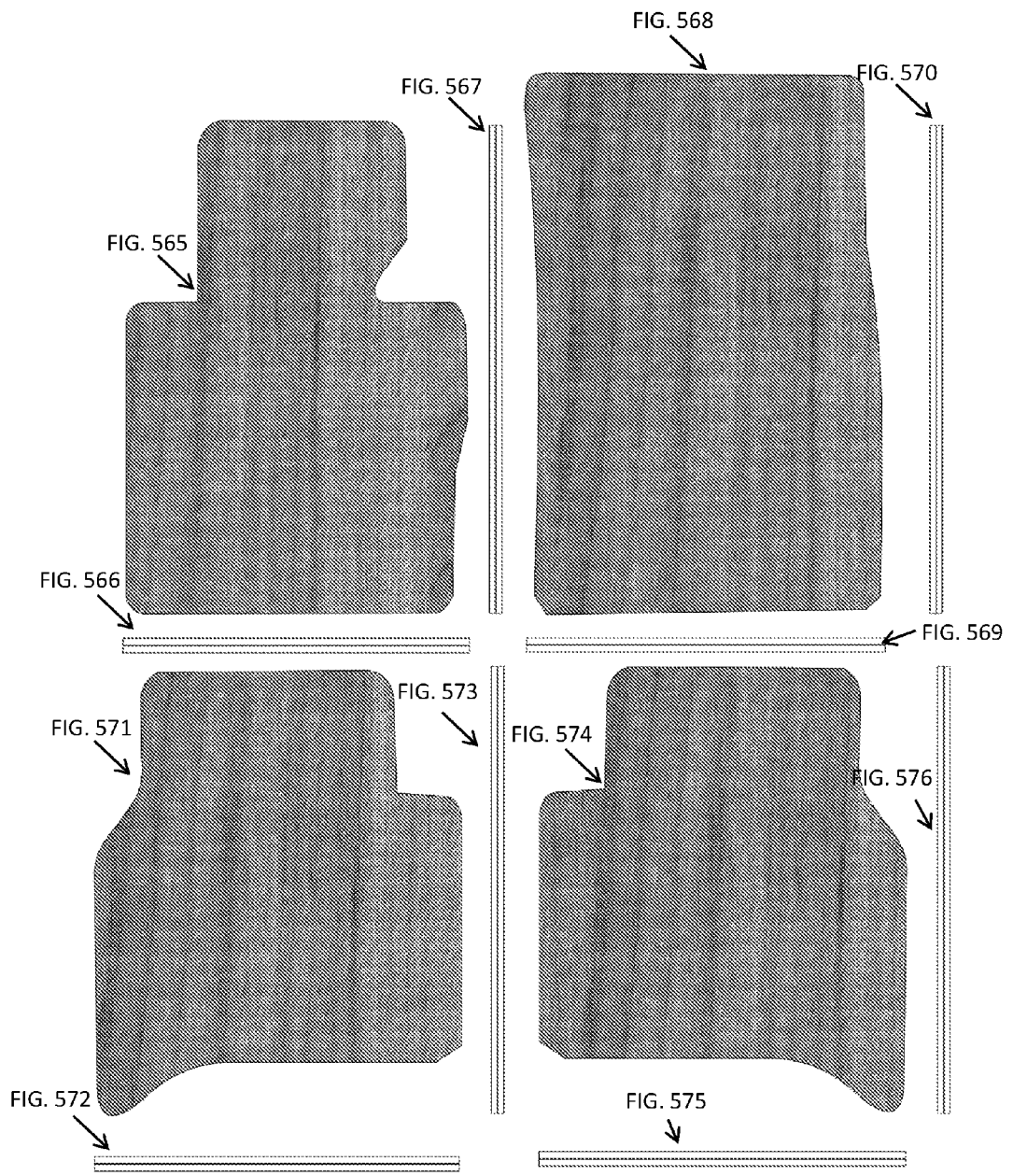

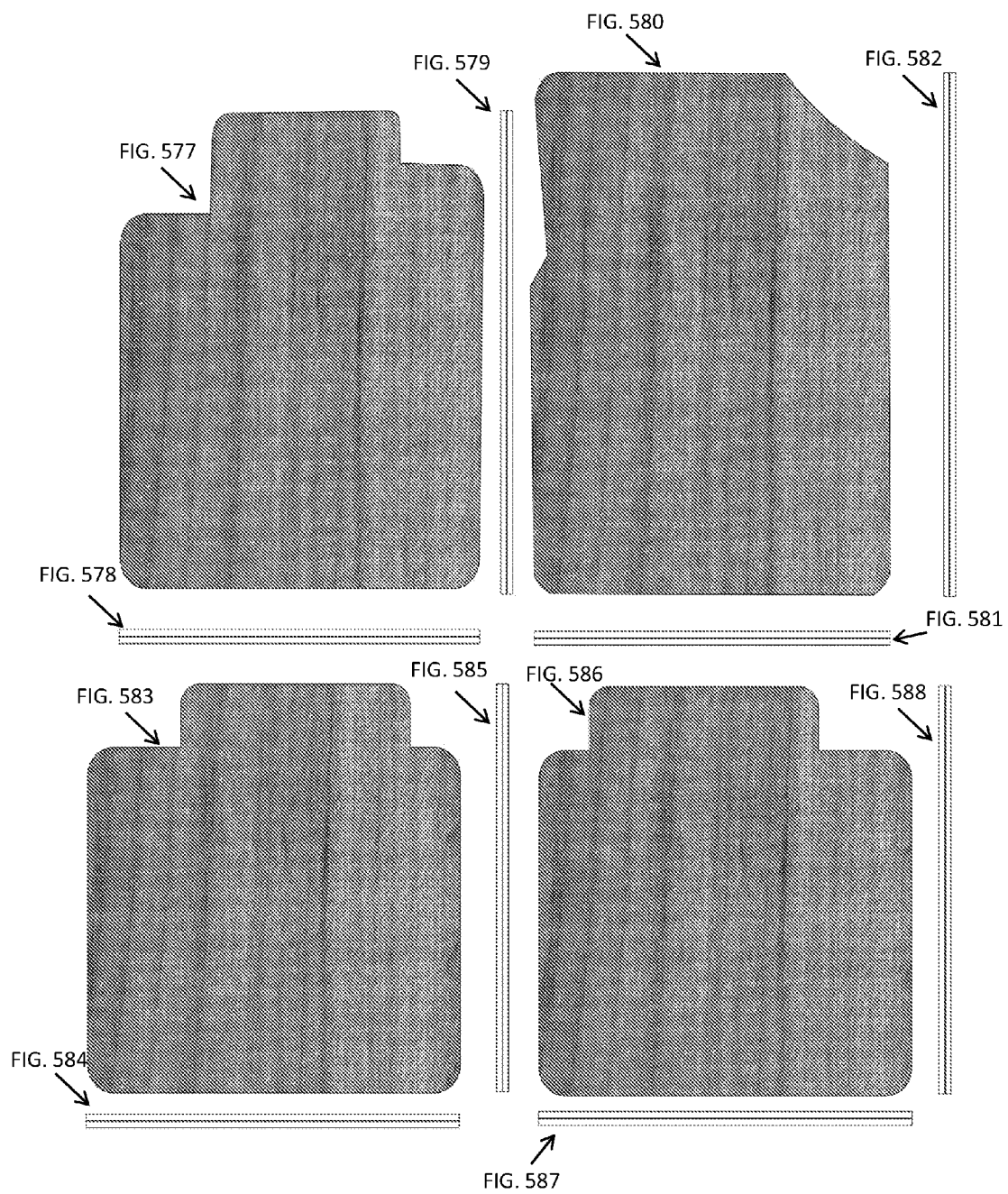

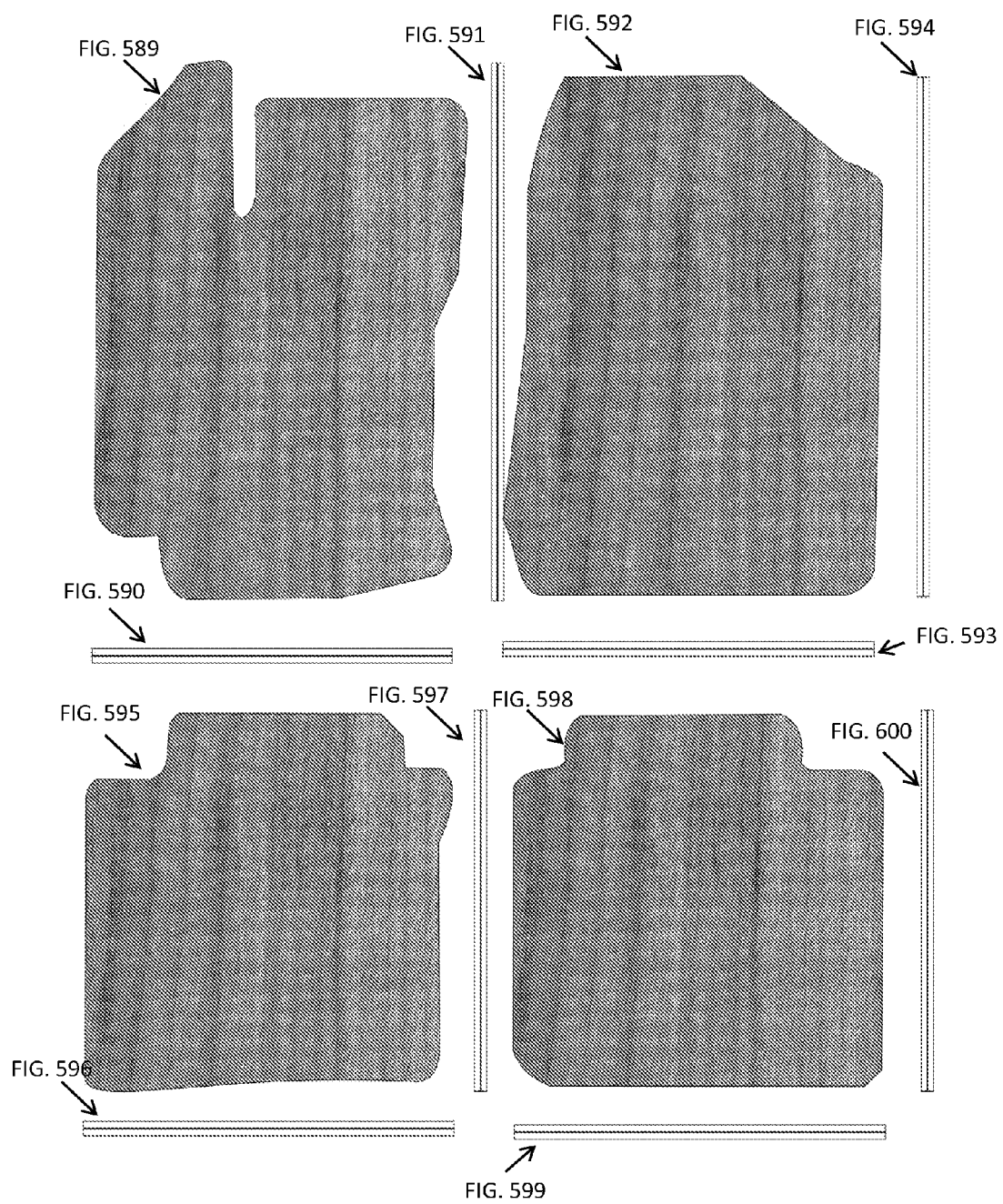

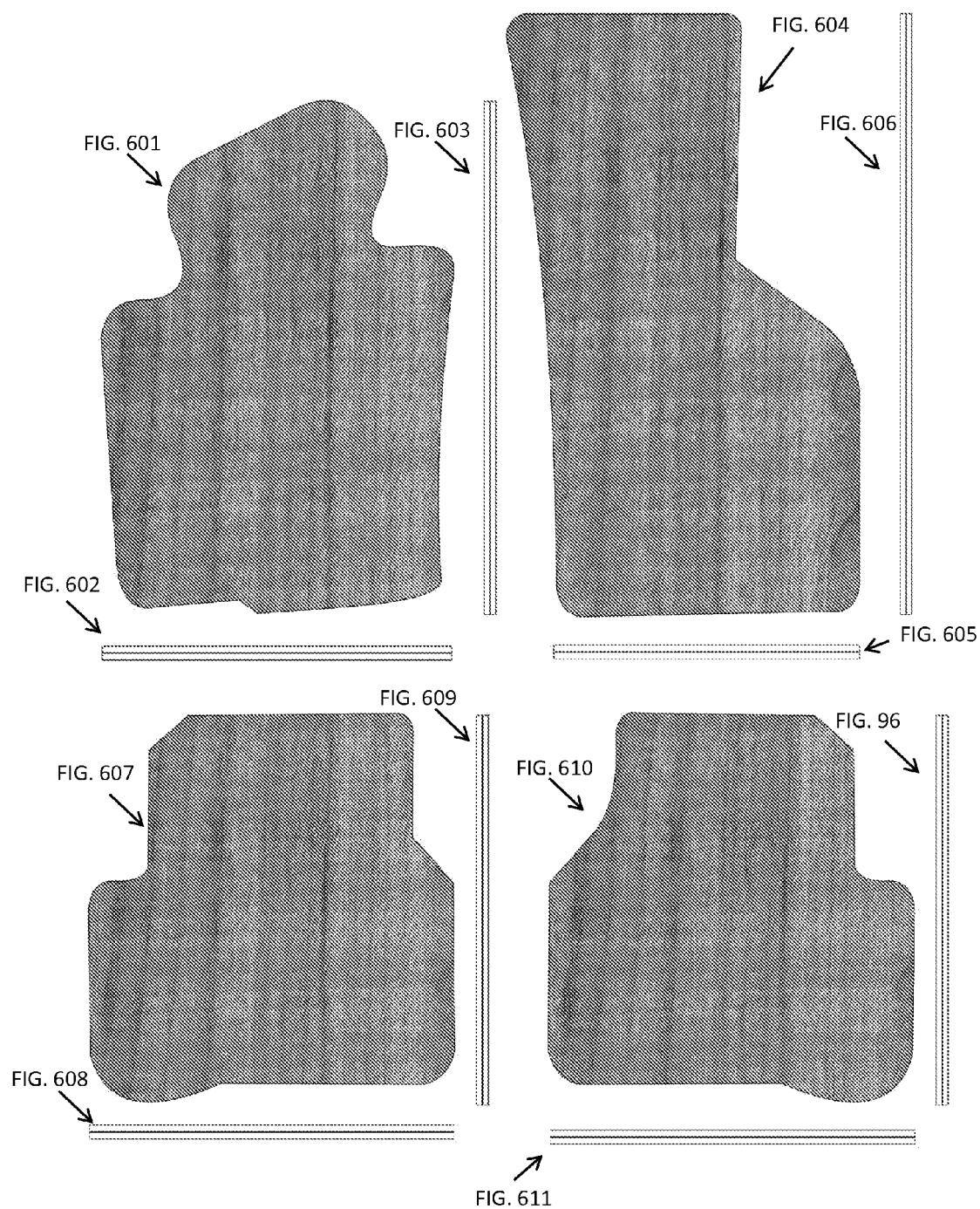

FLOOR MAT AND METHOD FOR MANUFACTURING A FLOOR MAT

FIELD OF THE INVENTION

The present invention relates generally to floor mats, and more particularly, relates to floor mats for vehicles, the floor mats having a faux-wood visible surface and an anti-slip bottom surface.

BACKGROUND OF THE INVENTION

Virtually every vehicle, from high-traffic commercial vehicles to the most expensive exotic cars, is equipped with some type of a floor mat on the foot area in front of each of the seats with in the vehicle. The floor mats, which are generally easily and quickly removable for cleaning, serve to protect the vehicle's permanent flooring material from normal wear and tear.

In most cases, the floor mats of a vehicle are made of a material that matches the permanent or semi-permanent flooring material installed within the vehicle during manufacturing thereof. Not only do these mats typically match the interior of the vehicle, they are usually made of the same material. For instance, if the floorboards of the vehicle are covered in carpet, the floor mats are usually made of the very same carpet material. Because most interior floor areas are covered in carpet, most floor mats are also manufactured from a carpet-type material. Alternatively, the floor-mat material can be, for instance, a lower-cost plastic, or other materials.

Carpet-type material suffers from the disadvantage of being easily stained. Because the carpet-type material is of a fiber, the material easily absorbs dirt and other staining substances that come in contact with the fibers. Although stain-resistant chemicals have been developed that help protect the carpet-type material, eventual staining is inevitable. Plastic floor mats have the advantage of being easily cleaned. However, plastic floor mats simply do not offer a visual appearance that is acceptable for use with higher-priced cars or in other applications where an owner or user is conscientious about appearance.

One known floor mat that attempts to avoid the disadvantages of both fiber-type floor mats and plastic-type floor mats is a wooden board described in U.S. Design Pat. No. D424,497. Although the wooden boards provide improved visual aesthetics, the wooden floor mats in U.S. Design Pat. No. D424,497 are described and shown as being entirely planar. This can, of course, be attributed to the fact that wood is generally inflexible. This floor mat is disadvantageous as very few vehicles have an entirely planar, i.e., flat, foot area. For this reason, a flat wooden floor mat is unacceptable for use in most vehicles.

In addition, during the life of a car, the floor mats must be removed each time the car is cleaned, which is usually quite frequently, e.g., once a week. Even if the wooden floor mats were to be provided in a particular shape that would conform to the shape the foot area within a vehicle, these wooden floor mats would be susceptible to damage once they are removed from the car. For example, if a curved wooden floor mat were placed on the ground during a cleaning process, any pressure placed on top of that floor mat would have a high likelihood of causing the floor mat to crack and/or break. Furthermore, shaped wooden floor mats, which, notably, are not described in the known prior-art, would be prohibitively expensive.

In addition, a flat wooden board resting on the vehicle's permanent flooring material, e.g., carpet, is prone to undesired and unexpected sliding along the surface. This can be dangerous in most driving situations. Also, wood is known to be highly susceptible to water damage, which renders them a poor choice for use in automobile floors, where moisture is frequently present. Furthermore, the upper surface of the wooden floor mat is prone to being slippery, creating a dangerous situation. For example, the driver's foot can accidentally slide along the surface of the mat and into the gas pedal.

Therefore, a need exists to overcome the problems with the prior art as discussed above.

SUMMARY OF THE INVENTION

The invention provides a floor mat and method for manufacturing a floor mat that overcomes the hereinafore-mentioned disadvantages of the heretofore-known devices and methods of this general type and that provide improved aesthetics and durability within a vehicle.

With the foregoing and other objects in view, there is provided, in accordance with the invention, a vehicle floor mat that includes a flexible upper layer having a non-wood surface with a visible wood-grain pattern on substantially the entire non-wood surface, the non-wood surface being of a scratch-resistant and water-resistant material and able to repeatedly flex at least 70 degrees from planar at least 100 times without exhibiting a change in the visible wood-grain pattern. A flexible non-wood underlayer is coupled to an underside of the flexible upper layer and has a slip-resistant surface that is able to repeatedly flex at least 70 degrees from planar. The flexible upper layer and the flexible non-wood underlayer have a shared non-uniform outer-edge shape that corresponds to a non-planar foot area of a vehicle.

In accordance with a feature of the present invention, the flexible upper layer is of a PVC material.

In accordance with a further feature of the present invention, the flexible non-wood underlayer is of one of a rubber nib backing material and an open cell foam backing material.

In accordance with yet another feature of the present invention, the scratch-resistant non-wood surface has a scratch-resistance that exceeds a scratch-resistance of a natural wood.

In accordance with an additional feature of the present invention, the non-planar foot area of the vehicle is a driver's-side foot area and includes at least one raised element.

In accordance with one more feature of the present invention, the change in the visible wood-grain pattern is a change that can be seen without a use of a vision-enhancement instrument.

In accordance with another feature, an embodiment of the present invention includes a slip-resistant material on the scratch-resistant non-wood surface.

In accordance with the present invention, a method for manufacturing decorative vehicle floor mats includes applying a replica of a wood-grain pattern on a surface of a first flexible layer, the surface being of a scratch-resistant and water-resistant material and able to repeatedly flex at least 70 degrees from planar at least 100 times without exhibiting a change in the wood-grain pattern. The method also includes fixedly coupling a second flexible layer to an underside of the first flexible layer, where the second flexible layer is a non-wood material and has a slip-resistant surface. The method also includes defining a shared non-uniform outer-edge shape of the coupled first and second layers, where the shape corresponds to a non-planar foot area of a vehicle.

In accordance with another feature, an embodiment of the present invention also includes, in combination with a vehicle having at least one non-planar area for resting a passenger's feet, a floor mat that includes a flexible upper layer having a non-wood surface with a visible wood-grain pattern on substantially the entire non-wood surface, the non-wood surface being of a scratch-resistant and water-resistant material and able to repeatedly flex at least 70 degrees from planar at least 100 times without exhibiting a change in the visible wood-grain pattern. A flexible non-wood underlayer is coupled to an underside of the flexible upper layer and has a slip-resistant surface able to repeatedly flex at least 70 degrees from planar. The flexible upper layer and the flexible non-wood underlayer have a shared non-uniform outer-edge shape that corresponds to the non-planar foot area of the vehicle.

Although the invention is illustrated and described herein as embodied in a floor mat and method for manufacturing a floor mat, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 1 is a top plan view of a decorative driver-side front floor mat for a vehicle in accordance with the present invention;

FIG. 2 is an elevational rear edge view of the decorative floor mat of FIG. 1;

FIG. 3 is an elevational right-side edge view of the decorative floor mat of FIG. 1;

FIG. 4 is a top plan view of a decorative passenger-side front floor mat for a vehicle in accordance with the present invention;

FIG. 5 is an elevational rear edge view of the decorative floor mat of FIG. 4;

FIG. 6 is an elevational right-side edge view of the decorative floor mat of FIG. 4;

FIG. 7 is a top plan view of a decorative driver-side backseat floor mat for a vehicle in accordance with the present invention;

FIG. 8 is an elevational rear edge view of the decorative floor mat of FIG. 7;

FIG. 9 is an elevational right-side edge view of the decorative floor mat of FIG. 7;

FIG. 10 is a top plan view of a decorative passenger-side front floor mat for a vehicle in accordance with the present invention;

FIG. 11 is an elevational rear edge view of the decorative floor mat of FIG. 10;

FIG. 12 is an elevational right-side edge view of the decorative floor mat of FIG. 10;

FIG. 18 is a top plan view of a decorative driver-side front floor mat for a vehicle in accordance with the present invention;

FIG. 19 is an elevational rear edge view of the decorative floor mat of FIG. 18;

FIG. 20 is an elevational right-side edge view of the decorative floor mat of FIG. 18;

FIG. 21 is a top plan view of a decorative passenger-side front floor mat for a vehicle in accordance with the present invention;

FIG. 22 is an elevational rear edge view of the decorative floor mat of FIG. 21;

FIG. 22.5 is an elevational right-side edge view of the decorative floor mat of FIG. 21;

FIG. 23 is a top plan view of a decorative middle-seat floor mat for a vehicle in accordance with the present invention;

FIG. 24 is an elevational rear edge view of the decorative floor mat of FIG. 23;

FIG. 25 is an elevational right-side edge view of the decorative floor mat of FIG. 23;

FIG. 26 is a top plan view of a decorative rear-seat floor mat for a vehicle in accordance with the present invention;

FIG. 27 is an elevational rear edge view of the decorative floor mat of FIG. 26; and FIGS. 28-612 provide various alternative shapes for decorative vehicle floor mats in accordance with the present invention.

FIG. 612 is a process flow diagram of a method for manufacturing decorative vehicle floor mats in accordance with the present invention.

DETAILED DESCRIPTION

Figure 13:
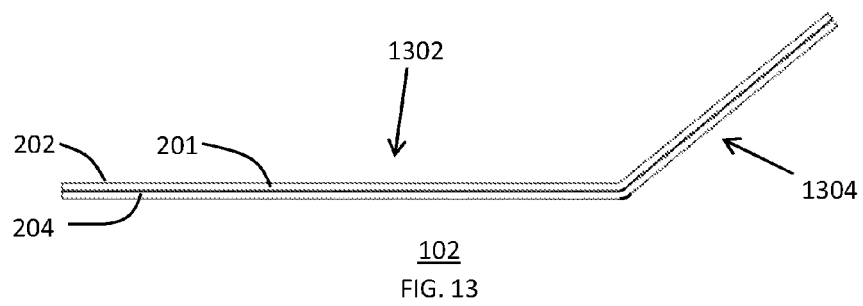
FIG. 13 is an elevational edge view of the decorative floor mat of FIG. 1 showing a flex range of the floor mat in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient decorative floor mat for a vehicle. Embodiments of the invention provide a floor mat with an upper surface that resembles a natural wood material. In addition, embodiments of the invention provide the floor mats with flexibility that allows them to conform to the non-planar foot area defined by the floorboards within a vehicle.

Referring now to FIG. 1, one embodiment of the present invention is shown in a planar top view. FIG. 1 shows several advantageous features of the present invention, but, as will be described below and shown in the accompanying drawings, the invention can be provided in several shapes, sizes, combinations of features and components, and varying numbers and functions of the components.

A first example of a set of decorative vehicle floor mats, as shown in FIGS. 1-12, includes a driver-side front floor mat 102, a passenger-side front floor mat 402, a driver-side back-seat floor mat 702, and a passenger-side back-seat floor mat 1002. Each of the floor mats 102, 402, 702, 1002 is also shown in FIGS. 1-12 in elevational edge views. Specifically, FIGS. 2 and 3 show rear and right-side elevational edge views, respectfully, of the driver-side front floor mat 102; FIGS. 5 and 6 show rear and right-side elevational edge views, respectively, of the passenger-side front floor mat 402; FIGS. 8 and 9 show rear and right-side elevational edge views, respectively, of the driver-side back-seat floor mat 702; and FIGS. 11 and 12 show rear and right-side elevational edge views, respectively, of the passenger-side back-seat floor mat 1002.

As shown in FIGS. 1-12 and the additional accompanying figures, embodiments of the present invention provide floor mats that feature a wood-like pattern 101 on an upper visible surface thereof. The wood-like pattern provides an aesthetically pleasing floor mat that produces an upgraded appearance to the vehicle in which they are installed. The invention is not restricted to any particular wood pattern and the wood-like pattern 101 shown in the drawings in merely exemplary. Advantageously, embodiments of the present invention do not utilize actual wood but, instead, feature faux wood materials that resemble actual wood to the user. Faux wood materials, in a vehicle floor mat application, provide many advantages over the use of actual wood without sacrificing improved aesthetics. For one, faux wood can be manufactured with an anti-scratch or scratch-resistant surface. Faux wood materials can also be provided on flexible surfaces that can bend to conform with non-planar surfaces upon which they are placed. Although actual wood can be coated with protective materials that resist scratching, there is no known actual wood product that is both scratch resistant and flexible. It should be noted, that the term "flexible," as used herein is intended to describe a material that can be repeatedly bent from a planar shape to having an approximately 70° bend without suffering any visible changes to the material. In contrast, a planar piece of wood that is bent to a 70° bend would most likely crack, split, or break. Furthermore, the terms "anti-scratch" and "scratch-resistance," as used herein, is intended to refer to materials that will not show visible signs of damage when subjected to the normal repeated sliding contact with the underside of a driver or passenger's shoe.

According to an embodiment of the present invention, as shown in FIGS. 2 and 3, the inventive floor mats 102 feature a flexible upper layer 201 having a non-wood (i.e., faux wood) surface 202 supported by a flexible non-wood underlayer 204 coupled to an underside of the flexible upper layer 201. The upper faux wood surface 202 can be, for example, Polyvinylchloride (PVC), flexible vinyl, rubber, ethylene vinyl acetate (EVA) foam, synthetic composite, polymers, synthetic fibers, and others. The invention, however, is not limited to these materials and can be any surface capable of maintaining a faux wood finish. The faux wood finish can include printing, painting, staining, drawings, strips or pieces of actual wood, and others.

In accordance with an embodiment of the present invention, the upper layer 201 can have a slip-resistant coating that prevents a passenger or driver's feet from sliding along the upper surface 202. The coating provides an advantage over the use of, for instance, actual wood along the floor of the vehicle, as the presence of moisture on one's foot is a common occurrence. The coating can be any material that provides resistance to lateral movement, such as rubber, plastic, and others. Embodiments of the present invention provide slip-resistant materials that are transparent and do not obscure the wood pattern on the upper surface 202.

The underlayer 204 can be, for example, rubber nib backing, open cell foam backing, and many others. The invention, however, is not limited to these materials and can be any material upon which a faux wood image can be placed.

According to embodiments of the present invention, the underlayer 204 is a slip-resistant material. The slip-resistant material prevents the inventive floor mats from shifting or sliding with reference to the floor of the vehicle. As is known in the art, floor mats that shift or slide along the floor of the vehicle can create a significant safety hazard. For instance, if the drivers-side floor mats were to move, it can interfere with the foot pedals of the vehicle. The most significant concerns are situations where the accelerator can be unintentionally depressed or where the brake pedal is prevented from being fully depressed. Therefore, the underlayer 204 provides advantages over prior-art wooden floor mats, which, as described above are simply flat boards placed in vehicles without features for preventing movement.

Furthermore, the materials forming embodiments of the present invention, i.e., the upper faux wood surface 202 and the underlayer 204, provided advantages over actual wooden floor mats in that they are durable and can withstand repeated cleaning operations with, for instance, water and soap.

As FIGS. 1, 4, 7, and 10 clearly show, each mat in the set of floor mats 102, 402, 702, 1002 is provided in a shape that differs from that of the other floor mats in the set. The varying shapes reflect differences in the foot area defined by the floorboard for each seat in the vehicle to which the floor mats 102, 402, 702, 1002 are intended to be installed. These differences and shapes are due to factors such as, for the driver's seat, the presence of foot pedals, wheel wells, driveshaft pathways, transmission areas, firewall shapes, and others. Many of these elements also play a role in defining the shape of the passenger-side front floor mat 402. Back-seat floor mats 702, 1002 are generally shaped to allow the mats 702, 1002 to fit at least partially under the driver's seat and the passenger's seat. For this reason the outer edge of the two-layer floor mats feature non-uniform cutouts, notches, chamfered edges, rounded edges, and other features that correspond to a non-planar foot area of the vehicle and provide a satisfactory fit in the space provided for the passenger's feet.

In addition to having differing shapes, as shown in the planar views of the accompanying figures, the foot area of vehicles, particularly in front of the driver's seat and the passenger's seat, has varying curvatures, raised elements, indented areas, and other non-uniform non-planar features that floor mats are intended to conform to. For this reason, embodiments of the present invention provide floor mats that are flexible, that is, they are able to bend and flex so as to conform to the non-uniform, non-planar features of the vehicle's floor. In fact, in accordance with one embodiment of the present invention, the floor mats are able to repeatedly flex at least 70 degrees from planar at least 100 times without exhibiting a negative change in the visible wood-grain pattern or the layers 201 and 202. That is, as shown in FIG. 13, while a first portion 1302 of the mat 102 is maintained in a planar position, the mat 102 can be bent so that a second portion 1304 of the mat 102 can reach an angle that is at least 70 degrees from the first portion 1302.

Figures 14, 15, 16, 17:
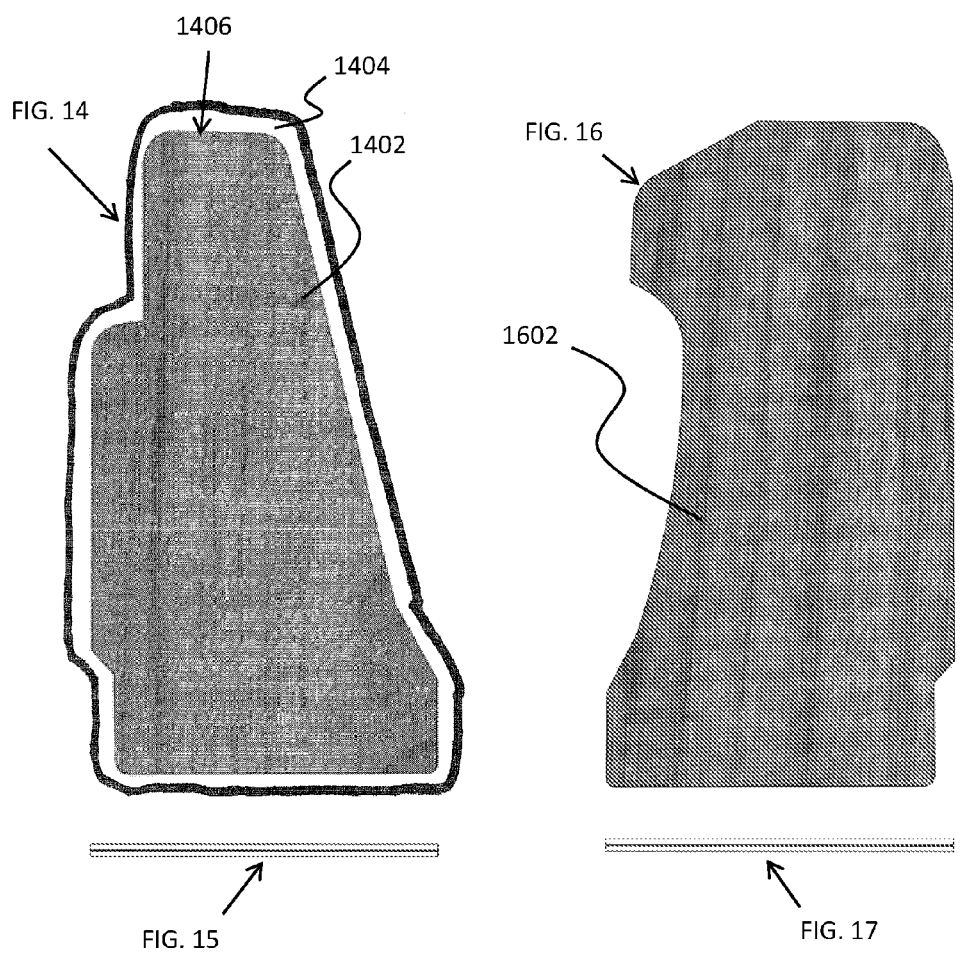
FIG. 14 is a top plan view of a decorative driver-side front floor mat for a vehicle in accordance with the present invention.
FIG. 15 is an elevational rear edge view of the decorative floor mat of FIG. 14.
FIG. 16 is a top plan view of a decorative passenger-side front floor mat for a vehicle in accordance with the present invention.
FIG. 17 is an elevational rear edge view of the decorative floor mat of FIG. 16.
Figure 40:
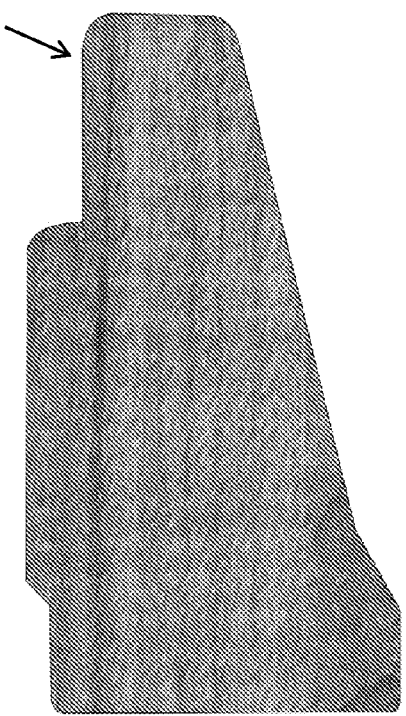
Figure 41:
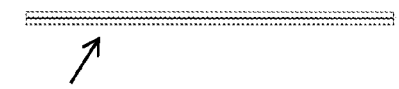
Figure 42:
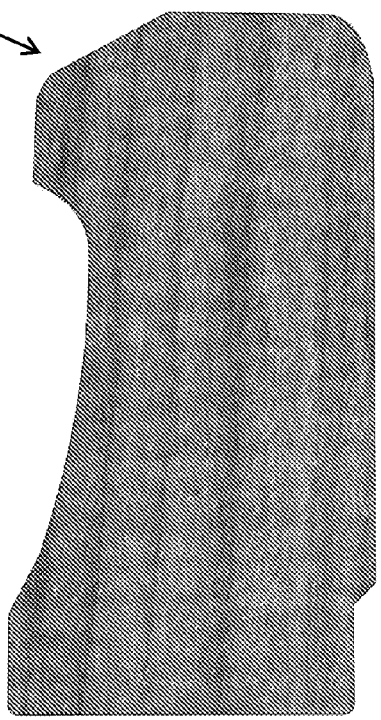
Figure 43:
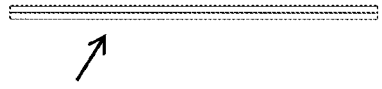

In addition, embodiments of the present invention provide inventive floor mats with a decorative border edging attached to and surrounding substantially an entire outer edge of one or more floor mats in a set of floor mats. FIG. 14 shows an exemplary mat 1402 with an outer border edging 1404 surrounding the outer edge 1406 of the mat 1402. The outer border edging 1404 is decorative and can also provide a cloth-type material that serves several useful purposes. For example, a cloth-type border edging 1404 can absorb moisture that comes into contact with a central area 1408 of the mat 1402. The cloth-type border edging 1404 can also absorb dust and dirt either from the central area 1408 of the mat 1402 or from the bottom surface of a driver or passenger's shoe. In addition, the cloth-type border edging 1404 can provide frictional resistance against whatever material is present on the floor board of the vehicle and can, therefore, assist the mat 1402 in remaining stationary in a position on the floor board of a vehicle. Of course, the border edging 1404 does not necessarily have to be from a cloth-type material. A few exemplary materials are wool pile and tufted carpet, sheepskin, leather binding, and others. Although the mat 1402 of FIG. 14 is the only mat in the figures showing a border edging 1404, any of the embodiment of the floor mats shown in the figures can be provided with border edging the corresponds to the shape of that particular mat embodiment.

Figure 612:
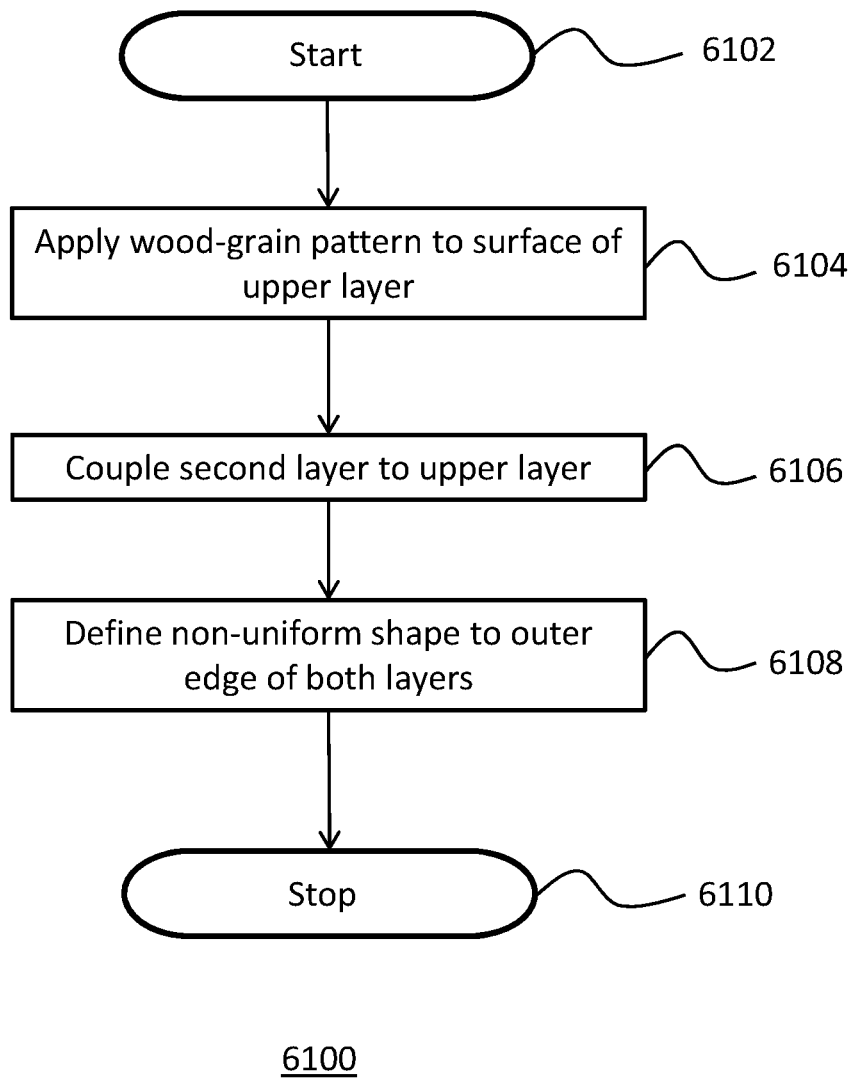

The present invention further includes a method for manufacturing decorative vehicle floor mats. As show in FIG. 612, the method 6100 starts at step 6102 and moves directly to step 6104 where a replica of a wood-grain pattern is applied to a surface of a first flexible layer of a scratch-resistant and water-resistant material. In step 6106 a second flexible layer is fixedly coupled to an underside of the first flexible layer, where the second flexible layer is a non-wood material and has a slip-resistant surface. The coupling can be affected with adhesive, stitching, interlocking parts, or any other way of coupling one object to another. In step 6108, a shared non-uniform outer-edge shape of the coupled first and second layers is defined, where the shape corresponds to a non-uniform, non-planar foot area of a vehicle. The process ends at step 6110.

A decorative floor mat has been disclosed that provides improved interior visual effects over prior-art floor mats, as well as advanced materials that allow the decorative floor mat to conform to non-planar floor board areas of a vehicle.

What is claimed is:

1. A vehicle floor mat comprising:
   a flexible upper layer having a non-wood surface with a visible wood-grain pattern on substantially the entire non-wood surface, the non-wood surface being of a scratch-resistant and water-resistant material and able to repeatedly flex at least 70 degrees from planar at least 100 times without exhibiting a change in the visible wood-grain pattern;
   a flexible non-wood underlayer coupled to an underside of the flexible upper layer and having a slip-resistant surface able to repeatedly flex at least 70 degrees from planar; and
   a non-wood border coupled to the non-wood underlayer and substantially surrounding the flexible upper layer, the non-wood border being of a material different from, and more fluid absorbent than, the non-wood underlayer and the non-wood surface of the flexible upper layer,
   wherein the non-wood border and the flexible non-wood underlayer have a shared non-uniform outer-edge shape that corresponds to a non-planar foot area of a vehicle.

2. The vehicle floor mat according to claim 1, wherein the flexible upper layer is of a PVC material.

3. The vehicle floor mat according to claim 1, wherein the flexible non-wood underlayer is of one of a rubber nib backing material and an open cell foam backing material.

4. The vehicle floor mat according to claim 1, wherein the scratch-resistant non-wood surface has a scratch-resistance that exceeds a scratch-resistance of a natural wood.

5. The vehicle floor mat according to claim 1, wherein the non-planar foot area of the vehicle is a driver's-side foot area and includes at least one raised element.

6. The vehicle floor mat according to claim 1, wherein the change in the visible wood-grain pattern is a change that can be seen without a use of a vision-enhancement instrument.

7. The vehicle floor mat according to claim 1, wherein the non-wood border is raised above the non-wood surface of the flexible upper layer.

8. A method for manufacturing decorative vehicle floor mats, the method comprising:
   applying a replica of a wood-grain pattern on a surface of a first flexible layer, the surface being of a scratch-resistant and water-resistant material and able to repeatedly flex at least 70 degrees from planar at least 100 times without exhibiting a change in the wood-grain pattern;
   fixedly coupling a second flexible layer to an underside of the first flexible layer, the second flexible layer being of a non-wood material and having a slip-resistant surface;
   fixedly coupling a non-wood border to the second flexible layer, the non-wood border substantially surrounding the second flexible layer and being of a material different from, and more fluid absorbent than, the second flexible layer and the surface of the first flexible layer; and
   defining a shared non-uniform outer-edge shape of the coupled second flexible layer and the non-wood border, the shape corresponding to a non-planar foot area of a vehicle.

9. The method according to claim 8, further comprising applying the replica of a wood-grain pattern on the surface of the first flexible layer that is of a PVC material.

10. The method according to claim 8, further comprising fixedly coupling the second flexible layer to the underside of the first flexible layer where the second flexible layer is of one of a rubber nib backing material and an open cell foam backing material.

11. The method according to claim 8, further comprising applying the replica of the wood-grain pattern on the surface of the first flexible layer, with the surface of the first flexible layer having a scratch-resistance that exceeds a scratch-resistance of a natural wood.

12. The method according to claim 8, wherein the non-planar foot area of the vehicle is a driver's-side foot area and includes at least one raised element.

13. The method according to claim 8, further comprising applying the replica of the wood-grain pattern on the surface of the first flexible layer, the change in the wood-grain pattern is a change that can be seen without a use of a vision-enhancement instrument.

14. In combination with a vehicle having at least one non-planar area for resting a passenger's feet, a floor mat comprising:
- a flexible upper layer having a non-wood surface with a visible wood-grain pattern on substantially the entire non-wood surface, the non-wood surface being of a scratch-resistant and water-resistant material and able to repeatedly flex at least 70 degrees from planar at least 100 times without exhibiting a change in the visible wood-grain pattern;
- a flexible non-wood underlayer coupled to an underside of the flexible upper layer and having a slip-resistant surface able to repeatedly flex at least 70 degrees from planar; and
- a non-wood border coupled to the flexible non-wood underlayer, being raised above the non-wood surface of the flexible upper layer, and substantially surrounding the flexible upper layer, the non-wood border being of a material different from the flexible non-wood underlayer and the flexible upper layer, wherein the non-wood border and the flexible non-wood underlayer have a shared non-uniform outer-edge shape that corresponds to the non-planar foot area of the vehicle.

* * * * *